United States Patent [19]
Madabhushi

[11] Patent Number: 6,021,232
[45] Date of Patent: Feb. 1, 2000

[54] WIDE BAND AND LOW DRIVING VOLTAGE OPTICAL MODULATOR WITH AN IMPROVED DIELECTRIC BUFFER LAYER

[75] Inventor: Rangaraj Madabhushi, Tokyo, Japan

[73] Assignee: NEC Corporation, Tokyo, Japan

[21] Appl. No.: 08/854,704

[22] Filed: May 12, 1997

[30] Foreign Application Priority Data

May 10, 1996 [JP] Japan ................................. 8-115944

[51] Int. Cl.[7] ................................................. G02F 1/035
[52] U.S. Cl. ................................... 385/3; 385/14; 385/2; 385/40; 385/131
[58] Field of Search .................................. 385/3, 1, 2, 8, 385/9, 14, 15, 39, 40, 41, 43, 130, 131, 132

[56] References Cited

U.S. PATENT DOCUMENTS 5,764,822  6/1998  Madabhushi ............................. 385/14

FOREIGN PATENT DOCUMENTS

| | | |
|---|---|---|
| 56-165122 | 12/1981 | Japan . |
| 4-149408 | 5/1992 | Japan . |
| 4-172316 | 6/1992 | Japan . |
| 4-190322 | 7/1992 | Japan . |
| 7-306324 | 11/1995 | Japan . |
| 9-197358 | 7/1997 | Japan . |

OTHER PUBLICATIONS

M. Rangaraj et al., "A Wide–Band Ti:LiNbO$_3$ Optical Modulator with a Conventional Coplanar Waveguide Type Electrode", pp. 1020–1022, IEEE Photonics Technology Letters, vol. 4, No. 9, Sep. 1992.

G.K. Gopalakrishnan et al., "40 GHz Low Half–Wave Voltage Ti:LiNbO$_3$ Intensity Modulator", pp. 826–827, Electronics Letters, vol. 28, No. 9, Apr. 23, 1992.

Primary Examiner—Phan T. H. Palmer
Attorney, Agent, or Firm—Young & Thompson

[57] ABSTRACT

An optical modulator has a dielectric buffer layer extending over an optical waveguide and extending under an electrode which applies an electric field through the dielectric buffer layer to the optical waveguide for causing the optical waveguide to vary in refractive index profile in linear-proportion to an intensity of the electric field thereby causing a phase shift of a light which is on propagation in the optical waveguide, wherein the dielectric buffer layer varies in thickness whereby an overlap integral of a profile of the electric field and an optical mode field profile at a thinner portion of the dielectric buffer layer is larger than that at a thicker portion of the dielectric buffer layer, and whereby a difference of an effective microwave refractive index from an optical refractive index at the thicker portion is smaller than that at the thinner portion.

80 Claims, 51 Drawing Sheets

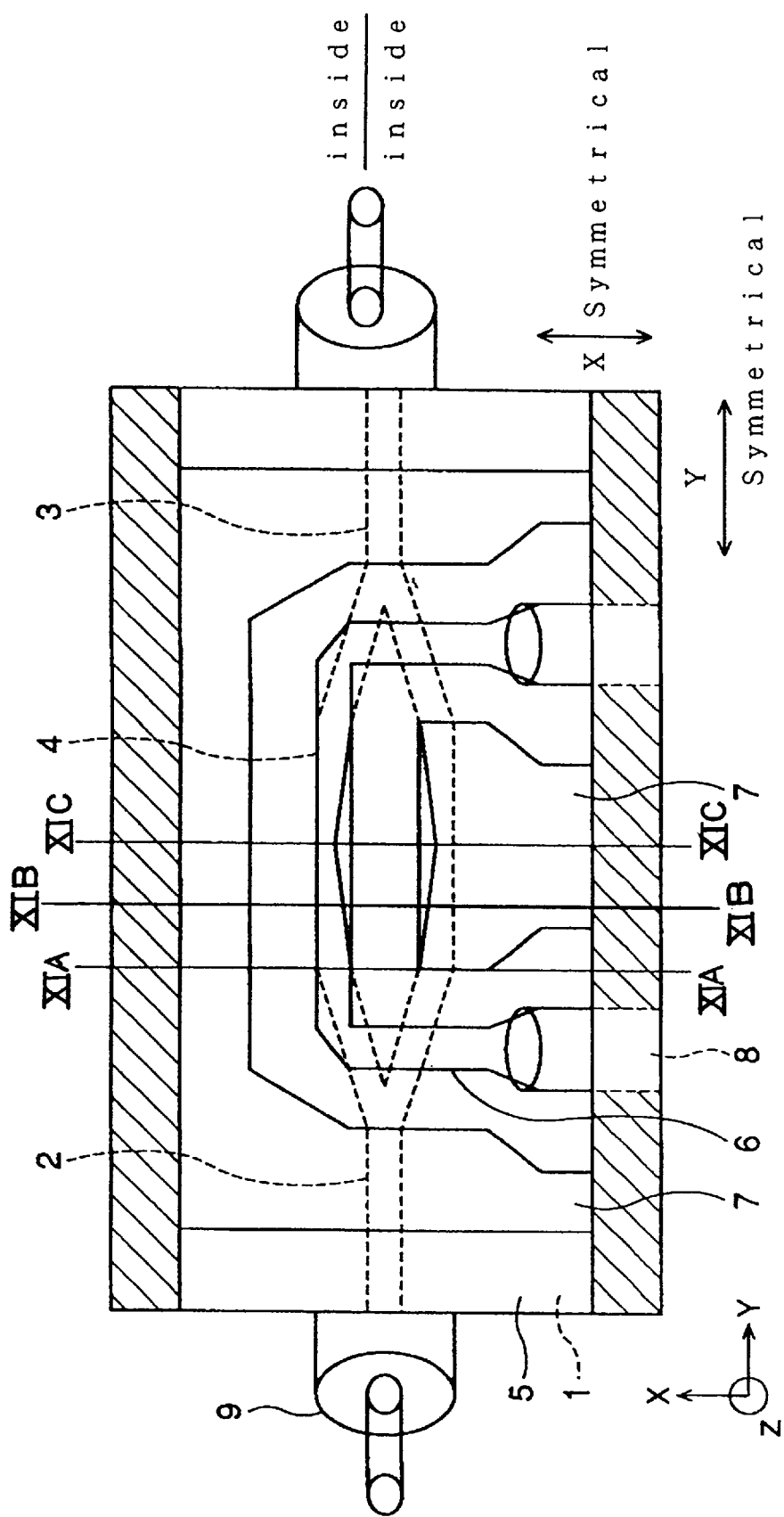

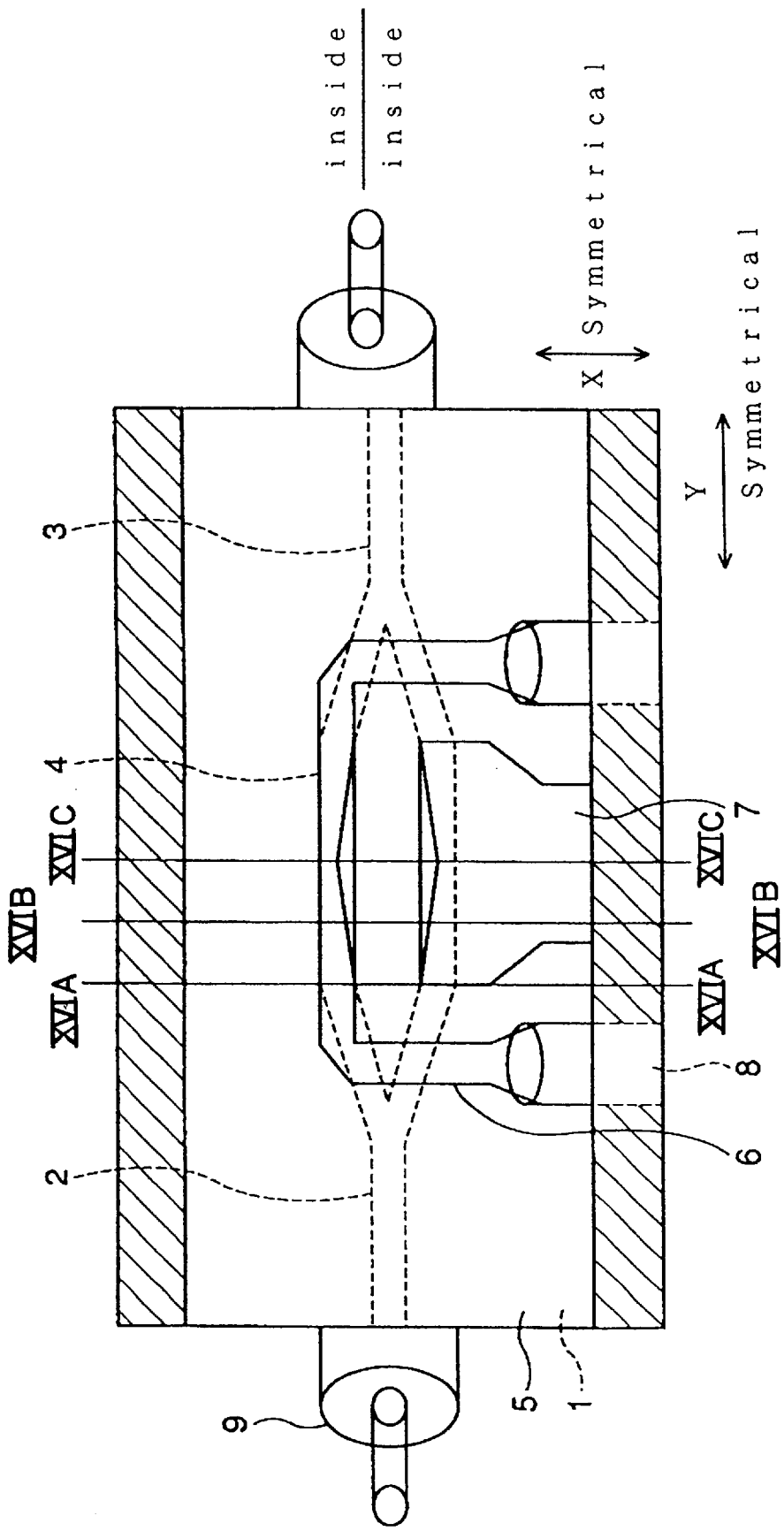

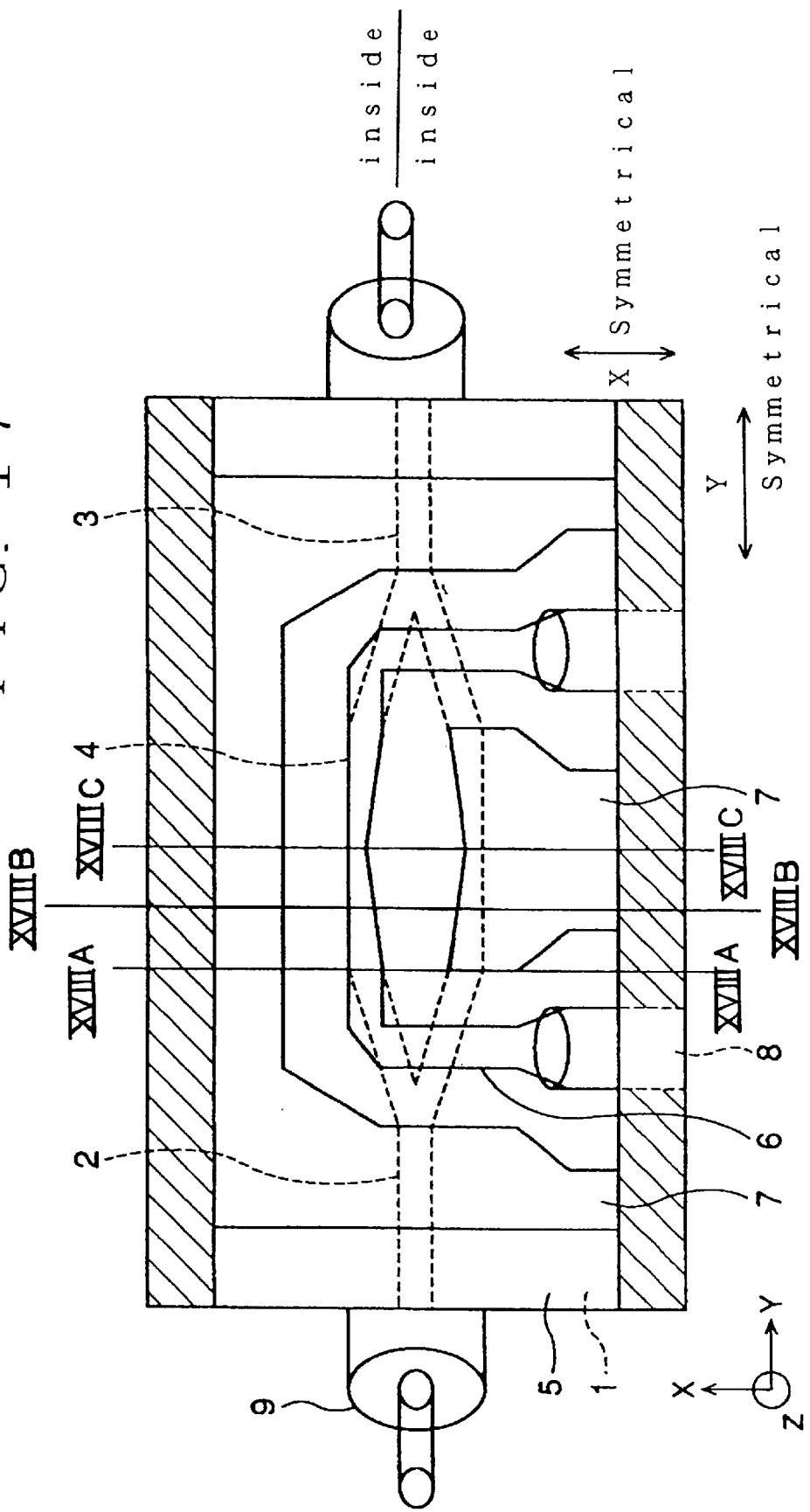

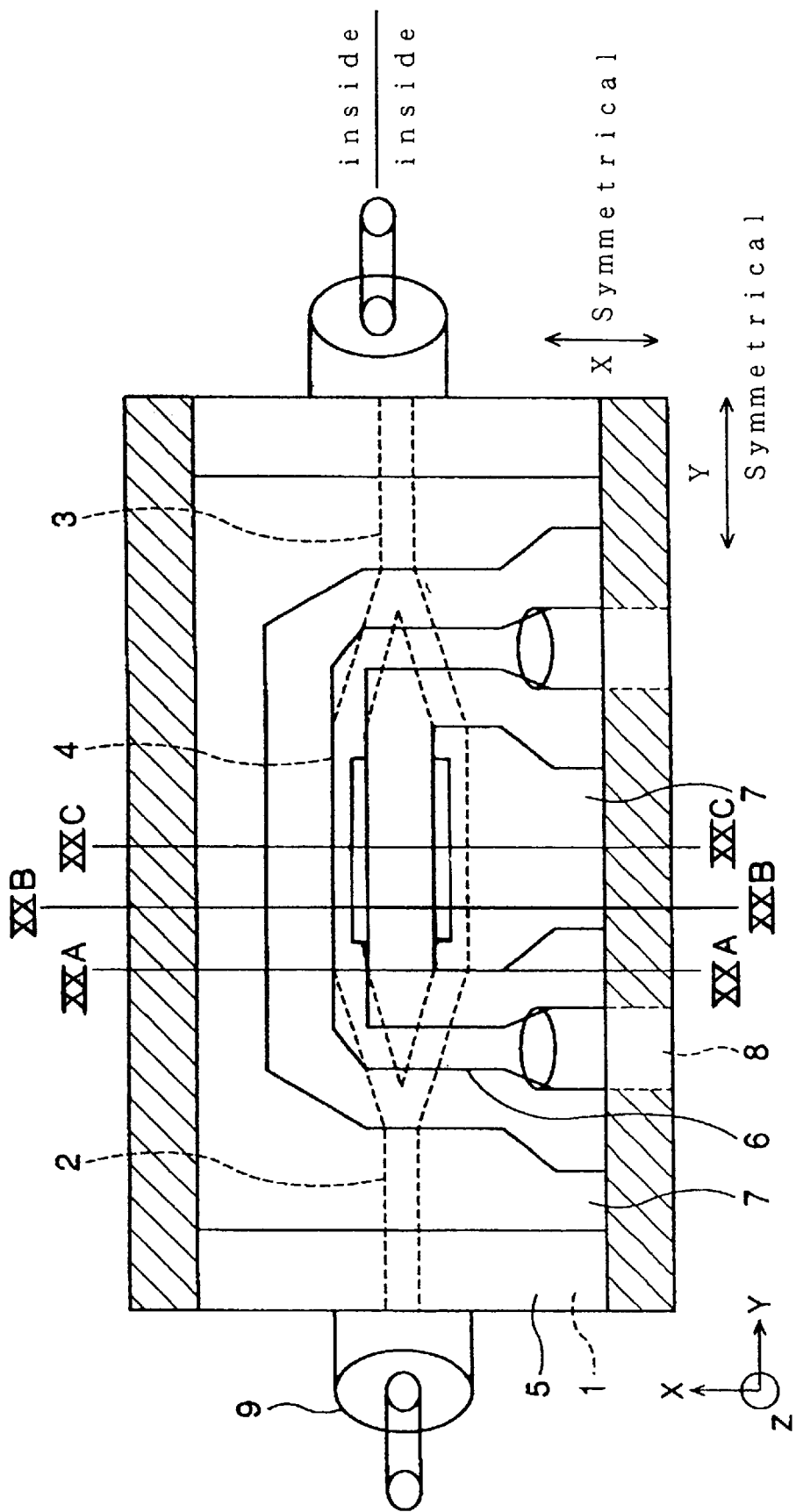

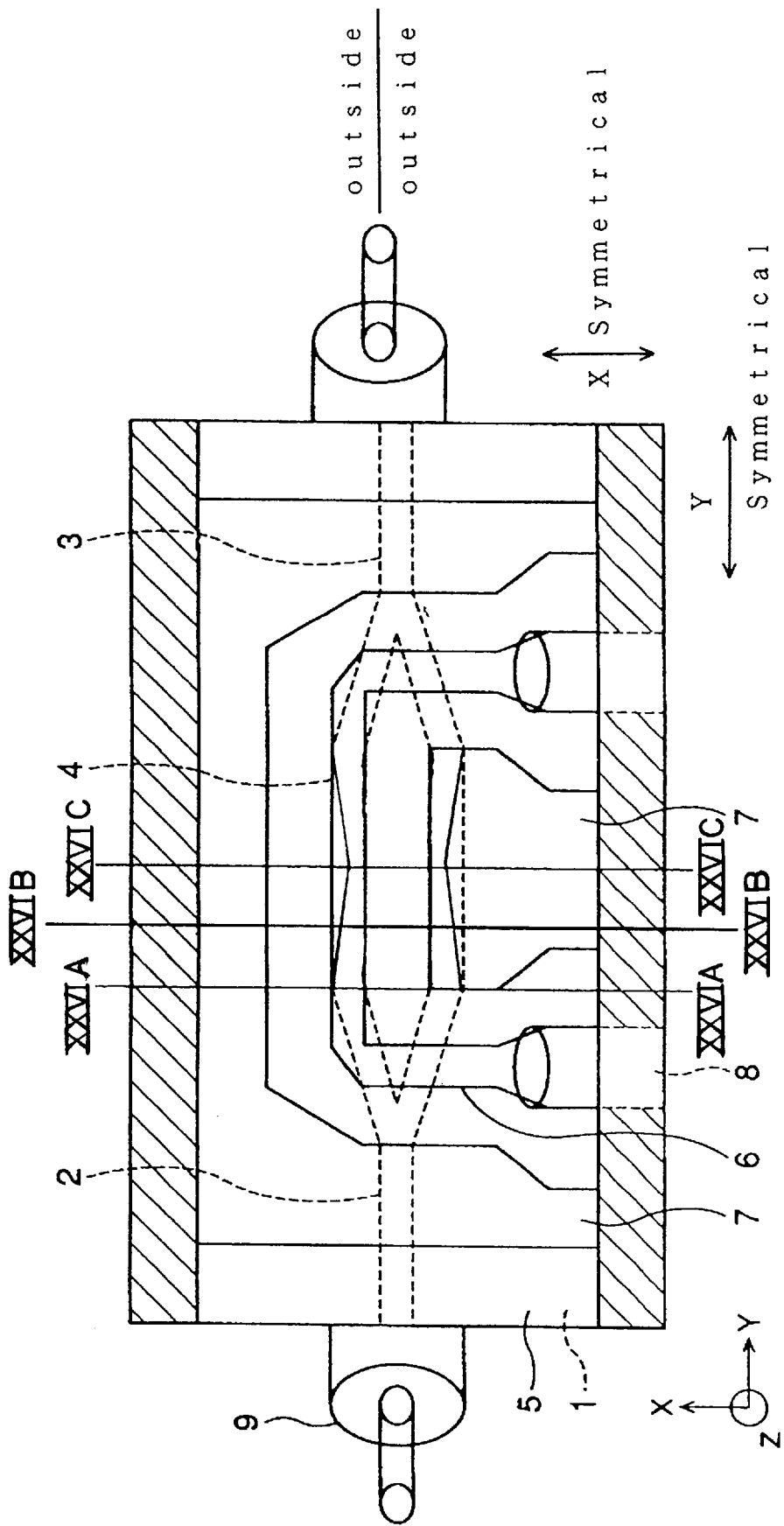

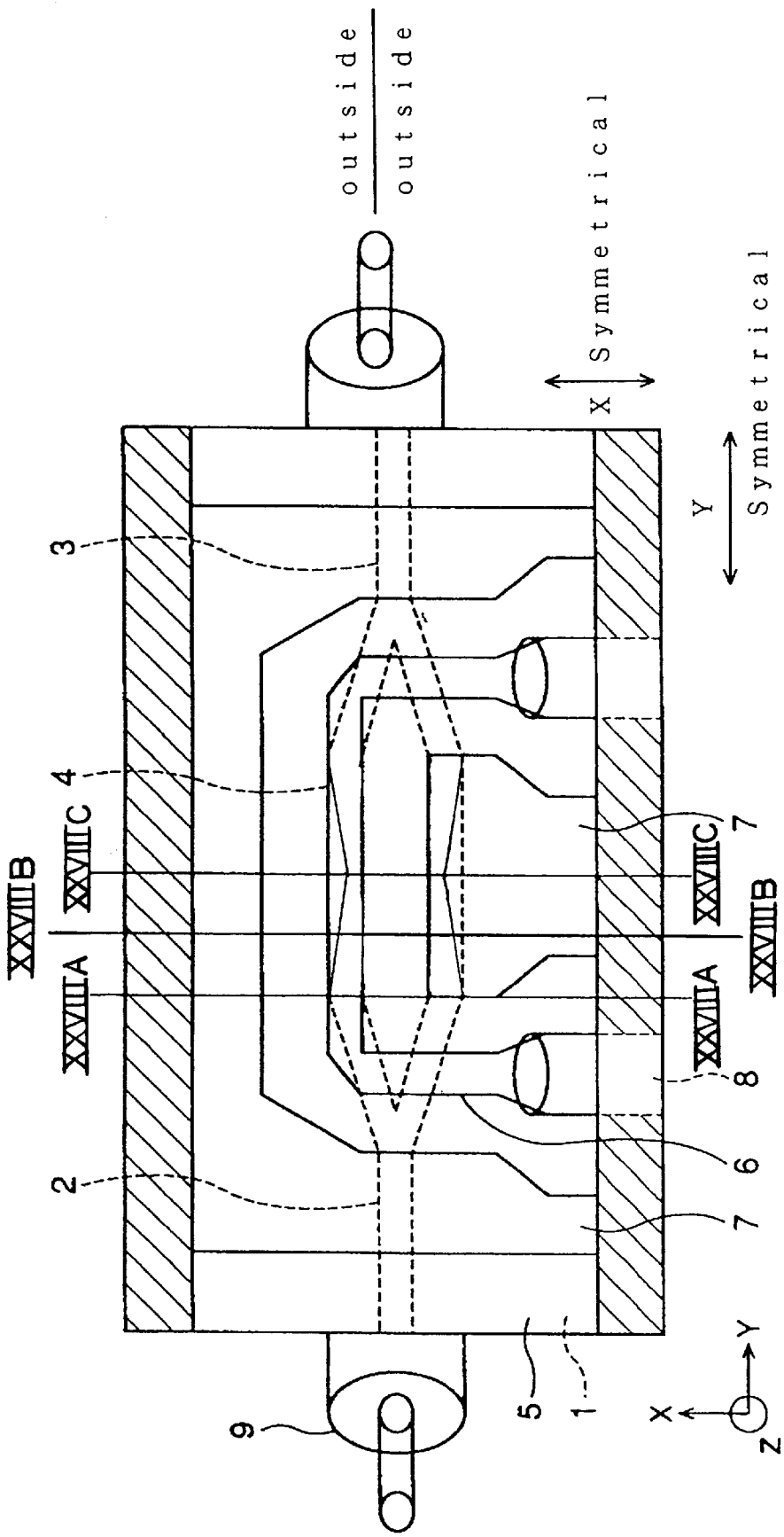

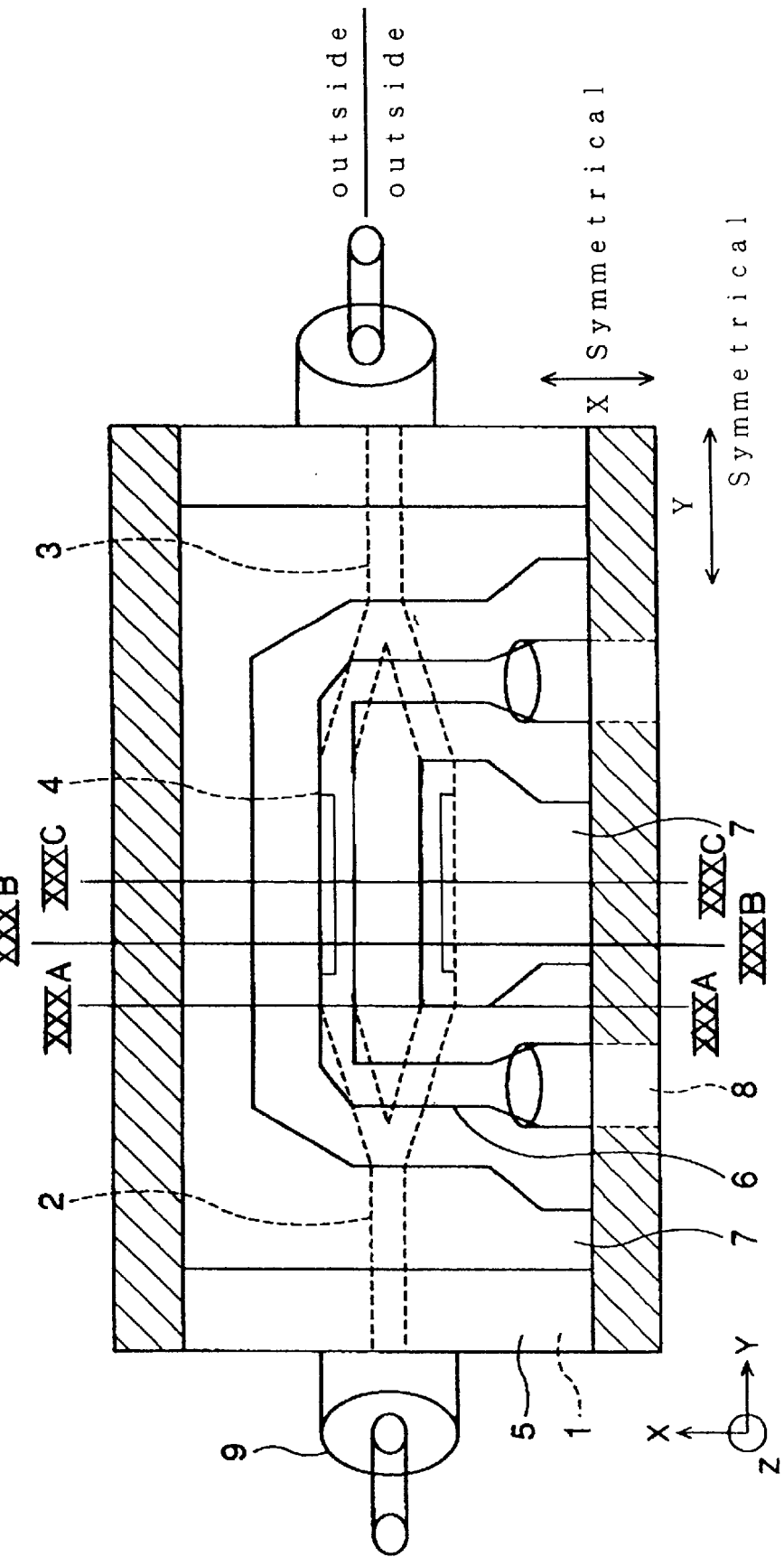

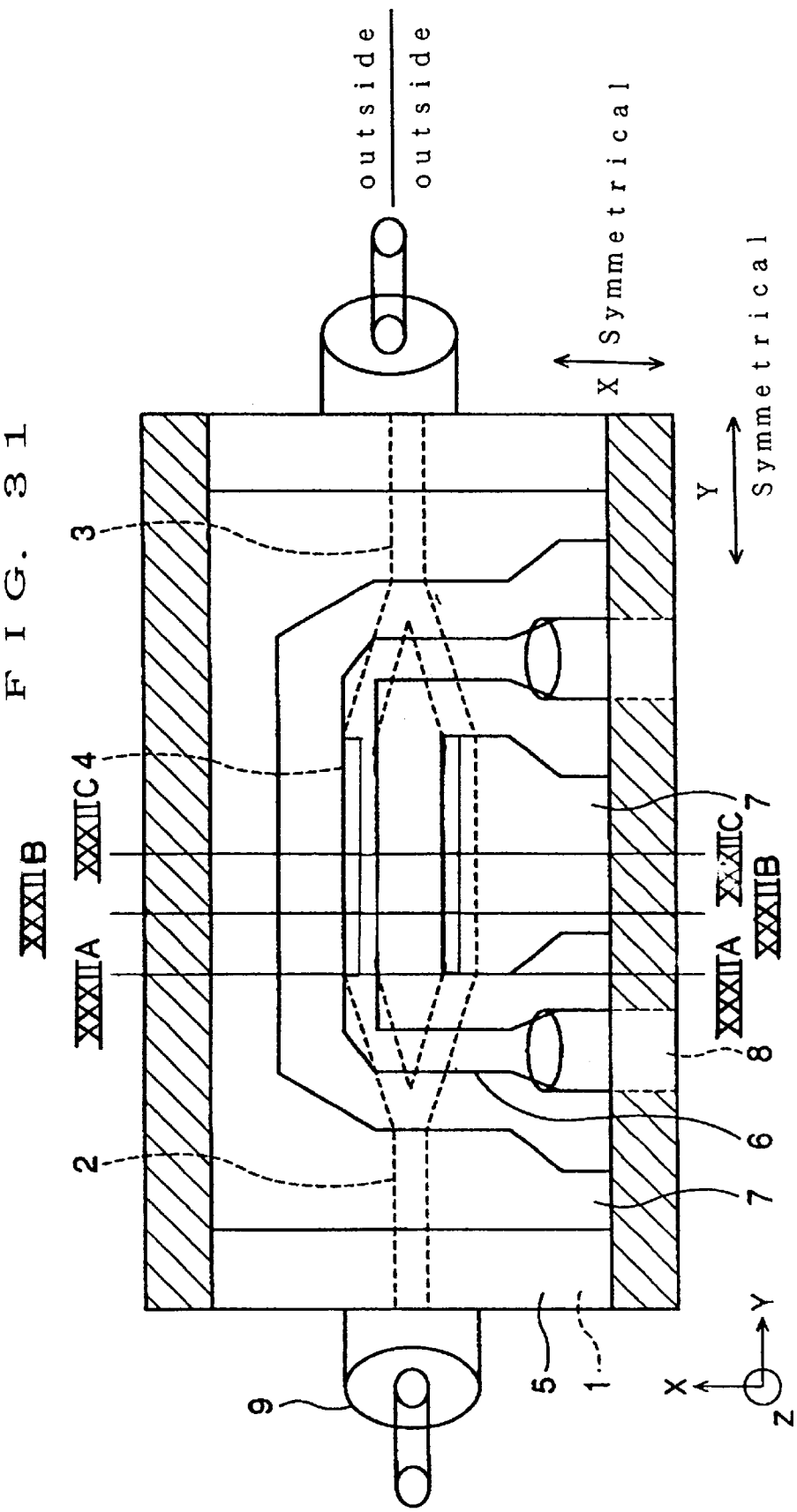

F I G. 34C
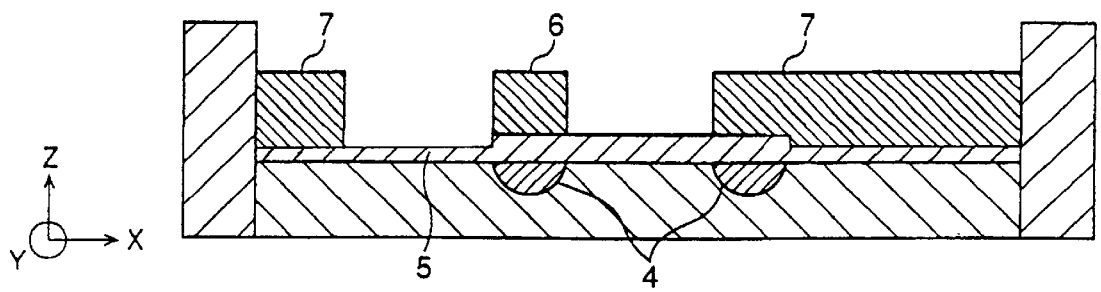

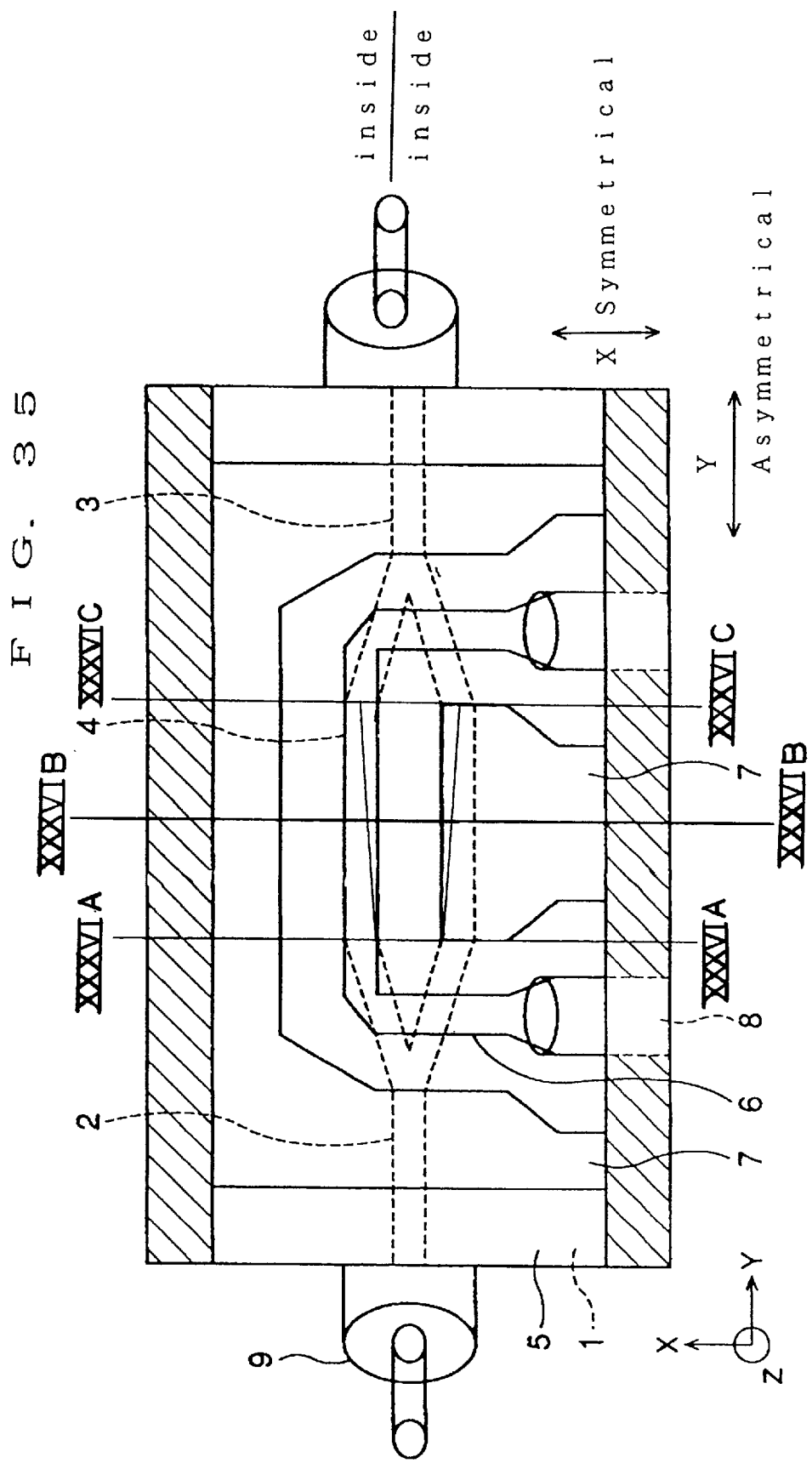

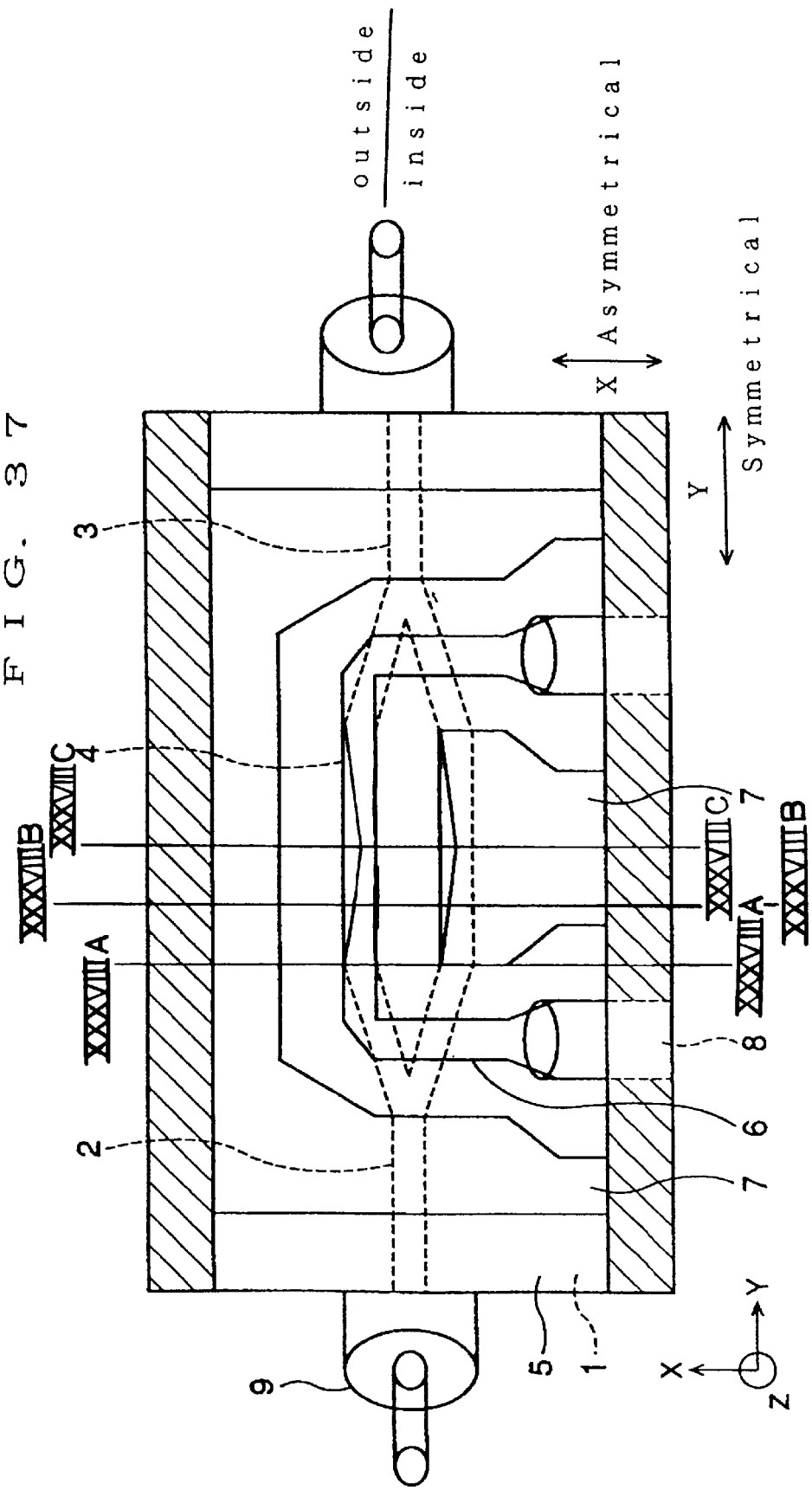

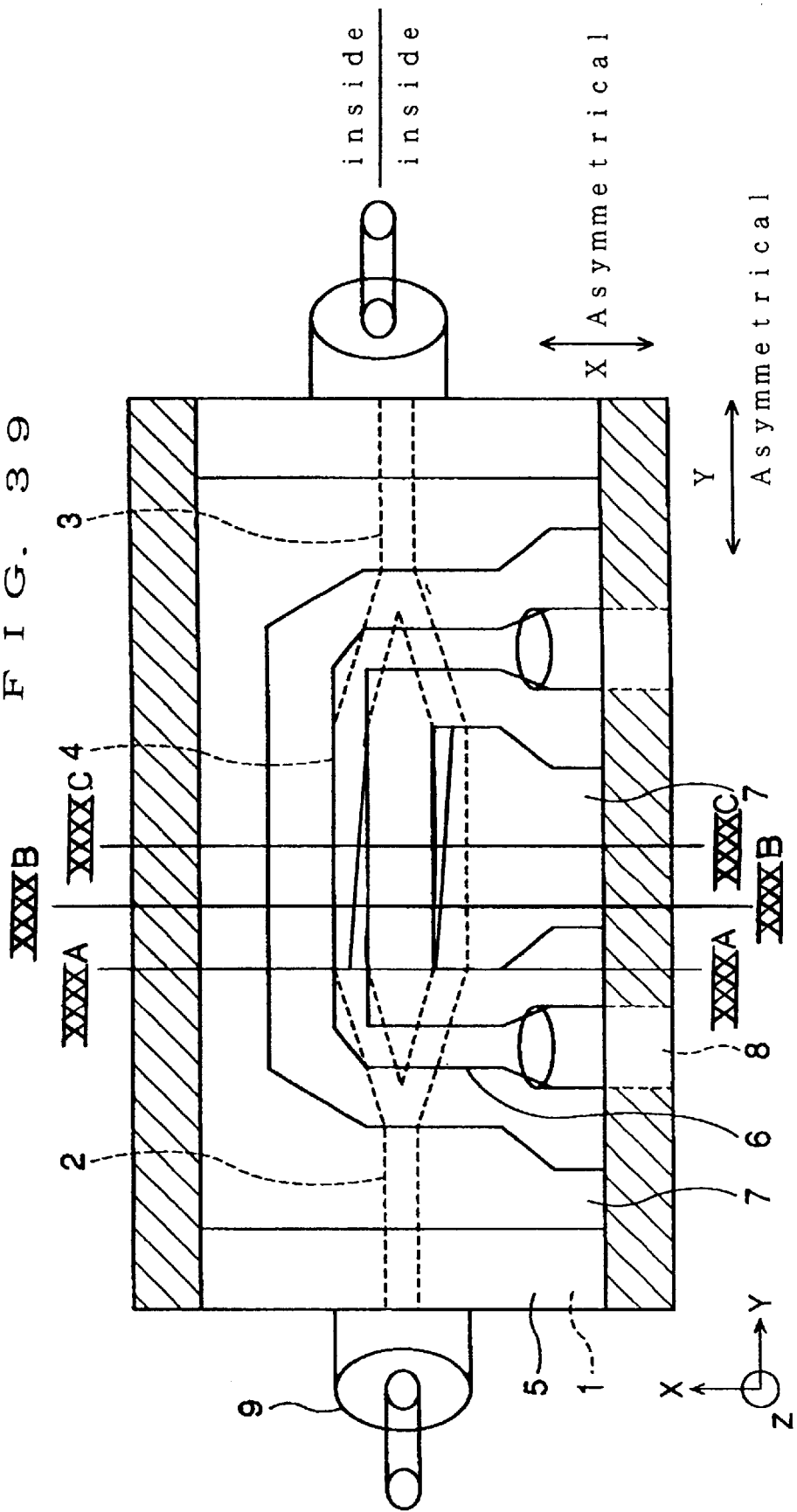

F I G. 40C
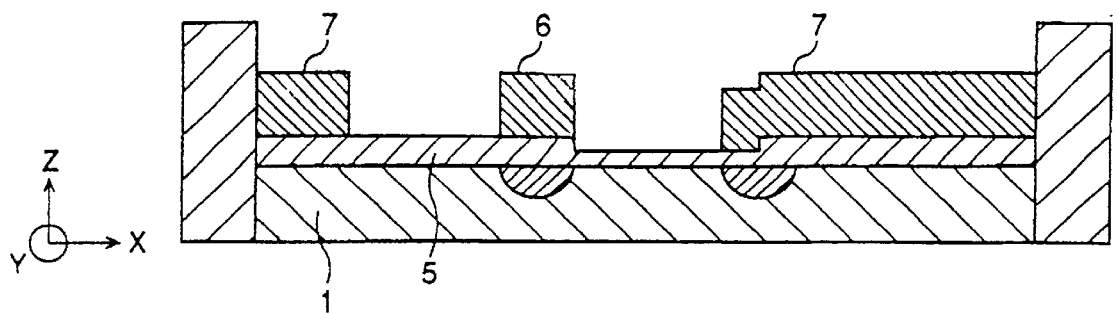

WIDE BAND AND LOW DRIVING VOLTAGE OPTICAL MODULATOR WITH AN IMPROVED DIELECTRIC BUFFER LAYER

BACKGROUND OF THE INVENTION

The present invention relates to an optical device, and more particularly to an optical device such as waveguide optical modulators and waveguide optical switches used in high speed optical communications, optical switching networks, optical information processing, image processing and other various optical systems.

The waveguide optical modulators and waveguide optical switches are extremely important for realizing the high speed optical communications, optical switching networks, optical information processing, image processing and other various optical systems.

The waveguide optical modulators may be fabricated on a few kinds of attracted substrates. The studies of the waveguide optical devices have been likely to focus on $LiNbO_3$ substrate or semiconductor substrates such as GaAs substrate. A low loss strip type optical waveguide may be formed in an upper region of the $LiNbO_3$ substrate by selective diffusion of titanium into the upper region of the $LiNbO_3$ substrate.

The most important parameters for the waveguide optical modulators are driving voltage, modulation bandwidth and insertion loss. A low driving voltage, a wide bandwidth and a low insertion loss are desired. Notwithstanding, the driving voltage and the modulation bandwidth have a relationship of trade-off each other. Namely, it was difficult to satisfy the requirements for reduction in the driving voltage and widening the bandwidth concurrently. In this circumstances, the studies of the waveguide optical modulators have been focusing on the optimization of the trade-off relationship between the driving voltage and the bandwidth.

It had been known in the technical field to which the invention pertains that the bandwidth of the waveguide optical modulators mainly depends upon the kind, material and placement of the electrode and a dielectric constant of the substrate. A traveling wave electrode is useful for wide band modulation. The traveling wave electrode is configured as an extension from a driving power transmission line, for which reason a characteristic impedance of the traveling wave electrode is required to be equal to a characteristic impedance of a power supply or a cable. In this case, a modulation speed is defined by a difference in traveling time, phase velocity or effective refractive index between optical wave and microwave. Useable traveling wave electrodes are asymmetric strip line type electrode, asymmetric coplanar strip type electrode, and coplanar waveguide type electrode.

A conventional Mach-Zehnder optical modulator as one of the typical optical modulators is illustrated in FIGS. 1, 2 and 3. FIG. 1 is a plane view illustrative of the first conventional Mach-Zehnder optical modulator including a dielectric buffer layer having a constant thickness. FIG. 2 is a cross sectional elevation view illustrative of the first conventional Mach-Zehnder optical modulator of FIG. 1. FIG. 3 is a schematic perspective view illustrative of the first conventional Mach-Zehnder optical modulator of FIGS. 1 and 2.

A crystal substrate 1, for example, a $LiNbO_3$ substrate is used. A titanium film strip is formed on a top surface of the crystal substrate 1, wherein the titanium film strip comprises two straight arms and two Y-shaped portions coupled to opposite sides of the two straight arms. The crystal substrate 1 was then subjected to a heat treatment at a temperature in the range of 900° C. to 1000° C. for 5–12 hours to cause a diffusion of titanium in the titanium film strip into an upper region of the crystal substrate 1 to form a titanium-diffused optical waveguide in the upper region of the crystal substrate 1. The titanium-diffused optical waveguide comprises a Y-shaped optical divider portion 2, two straight arm phase shifter portions 4 coupled to the Y-shaped optical divider portion 2, and a Y-shaped optical coupler portion 3 coupled to the two straight arm phase shifter portions 4. Optical fiber mounts 9 are provided at opposite end portions of the titanium-diffused optical waveguide so that the Y-shaped optical divider portion 2 and the Y-shaped optical coupler portion 3 ate coupled via the optical fiber mounts 9 to optical fibers. The top surface of the titanium-diffused optical waveguide has the same level as the top surface of the crystal substrate 1 to form a flat surface. A dielectric buffer layer 5, for example, $SiO_2$ buffer layer is provided entirely on the flat surface so that the dielectric buffer layer 5 extends over the optical waveguide and the crystal substrate 1. The dielectric buffer layer 5 has a constant thickness.

A coplanar waveguide type electrode is selectively provided on the dielectric buffer layer 5. The coplanar waveguide type electrode structure comprises a signal electrode 6 and two ground electrodes 7.

Here, a first one of the two straight arm phase shifter portions 4 is defined as having a larger value on the X-coordinate, while a second one of the two straight arm phase shifter portions 4 is defined as having a smaller value on the X-coordinate.

The signal electrode 6 extends in the Y-direction and over the dielectric buffer layer 5 over the first one of the two straight arm phase shifter portions 4 so that the signal electrode 6 entirely covers in the plane view the first one of the two straight arm phase shifter portions 4. The signal electrode 6 further extends in the X-direction toward the lower position on the X-coordinate and over the Y-shaped optical divider portion 2 and the Y-shaped optical coupler portion 3 so that the signal electrode 6 is coupled with connector packages 8 at the lower position on the X-coordinate than the position of the second one of the two straight arm phase shifter portions 4. A first one of the two ground electrodes 7 extends over the dielectric buffer layer 5 over the second one of the two straight arm phase shifter portions 4 so that the first one of the two ground electrodes 7 entirely covers in the plane view the second one of the two straight arm phase shifter portions 4. The first one of the two ground electrodes 7 further extends over the dielectric buffer layer 5 over the crystal substrate 1 on lower regions on the X-coordinate than and outside the second one of the two straight arm phase shifter portions 4. The first one of the two ground electrodes 7 is separated in the plane view from the signal electrode 6. A second one of the two ground electrodes 7 extends over the dielectric buffer layer 5 so that the second one of the two ground electrodes 7 is positioned outside the signal electrode 6 but separated in the plane view from the signal electrode 6.

A microwave is applied through the connector package 8 to the signal electrode 6. If no phase shift is provided between the two straight arm phase shifter portions 4, then optical waves having been traveled through the two straight arm phase shifter portions 4 have the same phase as each other. For which reason, when the optical waves with the same phase are then coupled by the optical coupler 3, the intensity of optical wave to be output from the modulator remains unchanged from that of the incident optical wave.

If a high voltage is applied to the signal electrode 6, a phase shift at $\pi$ is provided between the two straight arm phase shifter portions 4 whereby optical waves having been traveled through the two straight arm phase shifter portions 4 have a difference in phase by π from each other. For which reason, when the optical waves with the same phase are then coupled by the optical coupler 3, an offset interference is raised between the coupled optical waves whereby the intensity of the coupled optical wave is zero or almost zero as the minimum value. The optical modulator shows ON-OFF operations as described above.

A second conventional Mach-Zehnder optical modulator with asymmetric strip line type electrodes is illustrated in FIGS. 4 and 5. Except for the electrodes, the structure of the Mach-Zehnder optical modulator is substantially the same as described above with reference to FIGS. 1, 2 and 3.

A third conventional Mach-Zehnder optical modulator with asymmetric coplanar strip type electrodes is illustrated in FIGS. 6 and 7. Except for the electrodes, the structure of the Mach-Zehnder optical modulator is substantially the same as described above with reference to FIGS. 1, 2 and 3.

A fourth conventional Mach-Zehnder optical modulator with asymmetric coplanar waveguide type electrodes is illustrated in FIGS. 8 and 9. Except for the electrodes, the structure of the Mach-Zehnder optical modulator is substantially the same as described above with reference to FIGS. 1, 2 and 3.

As described above, the driving voltage and the modulation bandwidth have a relationship of trade-off each other. The bandwidth of the waveguide optical modulators mainly depends upon the kind, material and placement of the electrode and a dielectric constant of the substrate. On the other hand, the driving voltage mainly depends upon an overlap integral of electric wave, for example, microwave and optical wave, more accurately an overlap integral of a profile of the electric field and an optical mode field profile. As the overlap integral is decreased, then the driving voltage is increased. As the overlap integral is increased, then the driving voltage is decreased. Further, as the thickness of the dielectric buffer layer is increased, the overlap integral is decreased. As the thickness of the dielectric buffer layer is decreased, the overlap integral is increased. Consequently, if the thickness of the dielectric buffer layer is increased, then the driving voltage is also increased. If the thickness of the dielectric buffer layer is decreased, then the driving voltage is also decreased. In the light of reduction in driving voltage, it is preferable to reduce the thickness of the dielectric buffer layer.

1. Driving Voltage

Here, the relationship of the driving voltage to the overlap integral of the electric field profile and the optical mode field profile will be highlighted.

The electrode is provided over the dielectric buffer layer extending over the optical waveguide so that an electric field is applied by the electrode through the dielectric buffer layer to the optical waveguide whereby a profile of refractive index of the optical waveguide is varied in proportion to the intensity of the applied electric field due to linear electro-optic effect so called "Pockels effect". The variation in refractive index of the optical waveguide causes a electro-optic phase shift thereby causing phase modulation.

The refractive index variation Δn electro-optically caused can be represented as a function of an applied voltage V as follows.

$$\Delta n(V) = n_e^3 r_{33} E(x, y)/2 \quad (1)$$

$$= n_e^3 r_{33} V\Gamma/2G$$

where "$n_e$" is the abnormal refractive index of the crystal substrate, "$r_{33}$" is the electro-optic constant, "E(x,y)" is the electric field applied to the optical waveguide, "V" is the voltage applied to the electrode, "G" is the gap between the signal and ground electrodes, and "Γ" is the overlap integral of the electric field profile and the optical mode field profile.

The value of the overlap integral depends upon the distance between the signal and ground electrodes, the electric field profile, the optical mode field profile and the thickness of the dielectric buffer layer. The overlap integral "Γ" is theoretically in the range of 0–1 and given by the following equation.

$$\Gamma = \frac{G \iint \Phi^2(x, y) E(x, y) dx dy}{V \iint \Phi^2(x, y) dx dy} \quad (2)$$

where $\Phi^2(x,y)$ is the two-dimensional optical field, E(x,y) is the two-dimensional electric field. The optical field is different from the applied electric field, for which reason the overlap integral represents an overlap amount between the optical field and the applied electric field.

In order to reduce the driving voltage to be applied to the electrode, it is required to increase the overlap integral "Γ" as closely to the theoretical maximum value 1 as possible. Notwithstanding, in prior art, the actually obtainable overlap integral "Γ" is in the range of 0.3–0.6 in consideration of various parameters such as the thickness of the dielectric buffer layer, the width of the signal electrode and the distance between the signal and ground electrodes.

A total amount of the phase shift "Δβ" caused at the length "L" of the interaction or the electrode is given by the following equation.

$$\Delta\beta L = 2\pi n_e^3 r_{33} V\Gamma L/\lambda G \quad (3)$$

where "$n_e$" is the abnormal refractive index of the crystal substrate, "$r_{33}$" is the electro-optic constant, "V" is the voltage applied to the electrode, "G" is the gap between the signal and ground electrodes, and "Γ" is the overlap integral of the electric field profile and the optical mode field profile, "λ" is the operating wavelength, and "G" is the gap between the signal and ground electrodes.

The switching operations or ON-OFF operations are obtainable by shifting the phase by zero and π radian. If the applied voltage is zero, then no phase shift is caused whereby the optical modulator or optical switch is placed in the ON-state. If the applied voltage is a predetermined value, then a phase shift by π radian is caused whereby the optical modulator is placed in the OFF-state.

In the equation (3), the ΔβL is replaced by π before the equation (3) is transformed into the following equation which represents the product of the voltage and the length of interaction or electrode.

$$V_\pi L = \lambda G/\{2n_e^3 r_{33}\Gamma\} \quad (4)$$

where $V_\pi$ is the applied voltage causing the phase shift by π radian, namely so called "switching voltage". From the above, the overlap integral Γ and the switching voltage $V_\pi$ can be calculated as follows. First, the refractive index profile of the optical waveguide is calculated. Second, the optical field profile is calculated by a specific mode calculation. Further, the profile of the applied electric field is also calculated. The overlap integration "Γ" can be calculated from the equation (2) and the switching voltage "$V_\pi L$" or "VL" can be calculated from the equation (4).

2. Frequency Response and Bandwidth

Frequency response and bandwidth of the traveling wave modulator will be considered. The intensity of the output is determined by the total shift amount of the phase of the traveling wave. The total shift amount of the phase of the traveling wave is given by the following equation.

$$\Delta\Phi(t)=\Delta\Phi_1(t)-\Delta\Phi_2(t) \quad (5)$$

where $\Delta\Phi_1(t)$ and $\Delta\Phi_2(t)$ are respective phase shifts of the first and second arm phase shifter portions of the optical waveguide.

The phase shift $\Delta\Phi(t)$ is also given by the following equation.

$$\Delta\Phi(t)=\{Z/(Z_S+Z)\}(\pi/\lambda)V_g \cos(2\pi ft)Lr_{33}n_e^3\Gamma H(f) \quad (6)$$

where "Z" is the impedance of the optical modulator, "$Z_S$" is the impedance of the light source, "L" is the length of the electrode, "$V_g \cos(2\pi ft)$" is the microwave generation voltage, "λ" is the free space optical wavelength, "$n_e$" is the abnormal refractive index of the crystal substrate, "$r_{33}$" is the electro-optic constant, "Γ" is the overlap integral and H(f) is the frequency response function.

The frequency response function H(f) can be derived from the total phase shift depending upon the frequency which is caused by the applied microwave voltage. The frequency response function H(f) is given by the following equation.

$$H(f) = \frac{[1 - 2e^{-\alpha L}\cos(2u) + 2e^{-2\alpha L}]^{1/2}}{[(\alpha L)^2 + (2u)^2]^{1/2}} \quad (2)$$

where "u" and "α" are respectively given by the following equations.

$$u=\pi fL(n_m-n_o)/C \quad (8)$$

where "f" is the frequency, "L" is the length of the interaction or electrode, "$n_m$" is the refractive index of microwave, "$n_o$" is the is the refractive index of optical wave and "C" is the light velocity.

$$\alpha=\alpha_0(f)^{1/2} \quad (9)$$

where "α" is the microwave attenuation and "$\alpha_0$" is the microwave attenuation constant.

The small signal relative frequency response $\Phi(f)/\Phi(f=0)$" is given by H(f) in the equation (7).

The bandwidth can be found lay solving $H(f)=1/\sqrt{2}$. If there is no loss, H(f) can be transformed into sine function and the bandwidth is given by the following equation.

$$\text{Bandwidth}=1.4C/[\pi L(n_m-n_o)] \quad (10)$$

However, the bandwidth is generally defined by the microwave attenuation "α" and the velocity mismatch "$(n_m-n_o)$". In order to reduce the velocity mismatch "$(n_m-n_o)$", it is required to optimize parameters of the dielectric buffer layer and parameters of the electrodes, particularly the width of the signal electrode and the gap between the signal and ground electrodes.

One of the results of optimizations to the parameters of the dielectric buffer layer and the electrodes is disclosed in IEEE Photonics Technology Letters, Vol. 4, No. 9, September 1992 entitled "A Wide-Band Ti:LiNbO$_3$ Optical Modulator with a Conventional Coplanar Waveguide Type Electrode". A bandwidth of 20 GHz and a driving voltage of 5V were obtained, where the length of electrode is 2.5 cm. A reduction in driving voltage from 5V to 3V was dried by increase in the length of the electrode from 2.5 cm to 4 cm, whilst the bandwidth is narrowed. In order to widen the bandwidth without dropping the driving voltage, it is required to reduce the microwave attenuation.

3. Microwave Attenuation

Microwave attenuation is caused by the following events:

a) Loss of strip line conductance which is a function of placement of electrode, resistivity of electrode material and parameters of dielectric buffer layer;

b) Dielectric loss which is a function of dielectric constant of LiNbO$_3$ substrate and a loss tangent "tan δ";

c) Loss due to higher mode propagation;

d) Loss due to curvature or tapering of the strip line;

e) Loss due to impedance mismatch between 50Ω light source and load; and f) Loss due to mounting package and outside package which includes loss due to connector and connector strip line contact.

If the velocity matching and the reduction in the microwave attenuation as well as the characteristic impedance near 50Ω could be tried to be obtained by optimizing the thickness of the buffer layer, the thickness and width of the signal electrode, the gap between the signal and ground electrode. As a result, the driving voltage is fixed. In order to obtain a further reduction in the driving voltage, it is required to reduce the thickness of the dielectric buffer layer. However, as described above, the reduction in the thickness of the dielectric buffer layer for the purpose of the reduction in the driving voltage causes the bandwidth to be narrowed and characteristic impedance to be apart from 50 Ω.

In the above circumstances, it had been required to develop a novel waveguide optical device with a wide bandwidth, a low driving voltage and a low microwave attenuation.

SUMMARY OF THE INVENTION

Accordingly, it is an object of the present invention to provide a novel waveguide optical modulator free from the problems and disadvantages as described above.

It is a further object of the present invention to provide a novel waveguide optical modulator operable with a reduced driving voltage.

It is a still further object of the present invention to provide a novel waveguide optical modulator operable a widen bandwidth.

It is yet a further object of the present invention to provide a novel waveguide optical modulator with a low microwave attenuation.

It is further more object of the present invention to provide a novel waveguide optical modulator with a predetermined preferable characteristic impedance.

The above and other objects, features and advantages of the present invention will be described in detail with reference to the accompanying drawings.

The present invention provides a dielectric buffer layer extending over an optical waveguide and extending under an electrode which applies an electric field through the dielectric buffer layer to the optical waveguide for causing the optical waveguide to vary in refractive index profile in linear-proportion to an intensity of the electric field thereby causing a phase shift of a light which is on propagation in the optical waveguide. It is important for the present invention that the dielectric buffer layer varies in thickness whereby an overlap integral of a profile of the electric field and an optical mode field profile at a thinner portion of the dielectric buffer layer is larger than that at a thicker portion of the dielectric buffer layer, and whereby a difference of an effective microwave refractive index from an optical refractive index at the thicker portion is smaller than that at the thinner portion.

For applying the above dielectric buffer layer to the optical devices such as optical modulators and optical switches, it is required to reduce as many as possible the driving voltage and further widen the bandwidth. The driving voltage is defined by an overlap integral of the electric field profile and the optical mode field profile. If the overlap integral is risen, then the driving voltage is dropped. If, by contrast, the overlap integral is reduced, then the driving voltage is risen. In the light of a possible reduction in the driving voltage, it is required to increase the overlap integral as approaching to the theoretical maximum value of 1 as practically possible. In order to increase the overlap integral, it is required to reduce the thickness of the dielectric buffer layer through which an electric field is applied to the optical waveguide. Accordingly, in the light of a possible reduction in the driving voltage, it is required to reduce the thickness of the dielectric buffer layer through which an electric field is applied to the optical waveguide.

On the other hand, the bandwidth is defined by both a microwave attenuation and a velocity mismatch. This velocity mismatch is defined as a difference between an effective microwave refractive index which is variable and an optical wave refractive index which is fixed. If the microwave attenuation is reduced, then the bandwidth is widen. If, by contrast, the microwave attenuation is risen, then the bandwidth is made narrow. Accordingly, in the light of a possible reduction in the driving voltage, it is required to reduce the microwave attenuation as many as practically possible. Notwithstanding, even if a sufficiently low microwave attenuation can be obtained, the bandwidth is influenced by the velocity mismatch which is, as described above, defined as a difference of the effective microwave refractive index variable and the optical wave refractive index fixed. In the light of widening the bandwidth, it is required to approach the effective microwave refractive index to the optical wave refractive index as closely as practically possible. Since the effective microwave refractive index is usually larger than the optical wave refractive index, it might be considered that the effective microwave refractive index is required to be reduced to the optical wave refractive index as many as practically possible. In order to approach the effective microwave refractive index to the optical wave refractive index, it is required to increase the thickness of the dielectric buffer layer. Accordingly, in the light of widening the bandwidth, it is required to increase the thickness of the dielectric buffer layer.

Consequently, in order to reduce the driving voltage, it is required to reduce the thickness of the dielectric buffer layer through which an electric field is applied to the optical waveguide, whilst in order to widen the bandwidth, it is required to increase the thickness of the dielectric buffer layer. Notwithstanding, it is only a surface impression that it seems inconsistent requirements to satisfy both requirements for reducing the driving voltage and widening the bandwidth concurrently. The inventor of the present application had conceived and actually confirmed through the great deal of his endeavors that it is possible by varying the thickness of the dielectric buffer layer to satisfy both the above requirements for obtaining considerable reduction in the driving voltage and keeping much wider bandwidth. If, contrary to the subject matter of the present invention, the dielectric buffer layer remains unchanged in thickness in two dimensional directions, then it is certainly difficult to satisfy both requirements for reducing the driving voltage and widening the bandwidth concurrently. If, however, in accordance with the subject matter of the present invention, it is possible by varying the thickness of the dielectric buffer layer to satisfy both the above requirements for obtaining considerable reduction in the driving voltage and keeping much wider bandwidth.

The inventor had discovered and confirmed that the effect by a thinner portion of the dielectric buffer layer for increasing the overlap integral of the electric field profile and the optical mode field profile exceeds the effect by a thinner portion of the dielectric buffer layer for reducing the overlap integral. Namely, this means that the effect by the thinner portion of the dielectric buffer layer for reducing the driving voltage exceeds the effect by the thinner portion thereof for increasing the driving voltage. This further means that, in order to drop the driving voltage, it is more effective to very the thickness of the dielectric buffer layer than keeping the dielectric buffer layer at an averaged thickness which is calculated by averaging those varied thicknesses of the dielectric buffer layer.

The inventor had also discovered and confirmed that the effect by the thicker portion of the dielectric buffer layer for reducing the difference of the effective microwave refractive index from the optical wave refractive index exceeds the opposite effect by the thinner portion of the dielectric buffer layer for increasing the difference of the effective microwave refractive index from the optical wave refractive index. This means that the effect by the thicker portion of the dielectric buffer layer for widening the bandwidth exceeds the opposite effect by the thinner portion of the dielectric buffer layer for narrowing the bandwidth. This further means that, in order to widen the bandwidth, it is more effective to very the thickness of the dielectric buffer layer than keeping the dielectric buffer layer at an averaged thickness which is calculated by averaging those varied thicknesses of the dielectric buffer layer.

Consequently, in order to drop the driving voltage and widen the bandwidth concurrently, it is more effective to very the thickness of the dielectric buffer layer than keeping the dielectric buffer layer at the averaged thickness which is calculated by averaging those varied thicknesses of the dielectric buffer layer. For the above reasons, it is possible by varying the thickness of the dielectric buffer layer to satisfy both the above requirements for obtaining considerable reduction in the driving voltage and keeping much wider bandwidth.

BRIEF DESCRIPTIONS OF THE INVENTION

Preferred embodiments according to the present invention will be described in detail with reference to the accompanying drawings.

FIG. 10 is a plane view illustrative of a novel Mach-Zehnder optical modulator including an improved dielectric buffer layer which varies in thickness in a first embodiment in accordance with the present invention.

FIG. 15 is a plane view illustrative of a novel Mach-Zehnder optical modulator including an improved dielectric buffer layer which varies in thickness in a second embodiment in accordance with the present invention.

FIG. 17 is a plane view illustrative of a novel Mach-Zehnder optical modulator including an improved dielectric buffer layer which varies in thickness in a third embodiment in accordance with the present invention.

FIG. 19 is a plane view illustrative of a novel Mach-Zehnder optical modulator including an improved dielectric buffer layer which varies in thickness in a fourth embodiment in accordance with the present invention.

FIG. 25 is a plane view illustrative of a novel Mach-Zehnder optical modulator including an improved dielectric buffer layer which varies in thickness in a seventh embodiment in accordance with the present invention.

FIG. 27 is a plane view illustrative of a novel Mach-Zehnder optical modulator including an improved dielectric buffer layer which varies in thickness in an eighth embodiment in accordance with the present invention.

FIG. 29 is a plane view illustrative of a novel Mach-Zehnder optical modulator including an improved dielectric buffer layer which varies in thickness in a ninth embodiment in accordance with the present invention.

FIG. 31 is a plane view illustrative of a novel Mach-Zehnder optical modulator including an improved dielectric buffer layer which varies in thickness in a tenth embodiment in accordance with the present invention.

FIG. 34C is a cross sectional elevation view illustrative of a novel Mach-Zehnder optical modulator taken along XXXIVC—XXXIVC in FIG. 33 in an eleventh embodiment in accordance with the present invention.

FIG. 35 is a plane view illustrative of a novel Mach-Zehnder optical modulator including an improved dielectric buffer layer which varies in thickness in a twelfth embodiment in accordance with the present invention.

FIG. 37 is a plane view illustrative of a novel Mach-Zehnder optical modulator including an improved dielectric buffer layer which varies in thickness in a thirteenth embodiment in accordance with the present invention.

FIG. 39 is a plane view illustrative of a novel Mach-Zehnder optical modulator including an improved dielectric buffer layer which varies in thickness in a fourteenth embodiment in accordance with the present invention.

FIG. 40C is a cross sectional elevation view illustrative of a novel Mach-Zehnder optical modulator taken along XLC—XLC in FIG. 39 in a fourteenth embodiment in accordance with the present invention.

DISCLOSURE OF THE INVENTION

Figure 1:
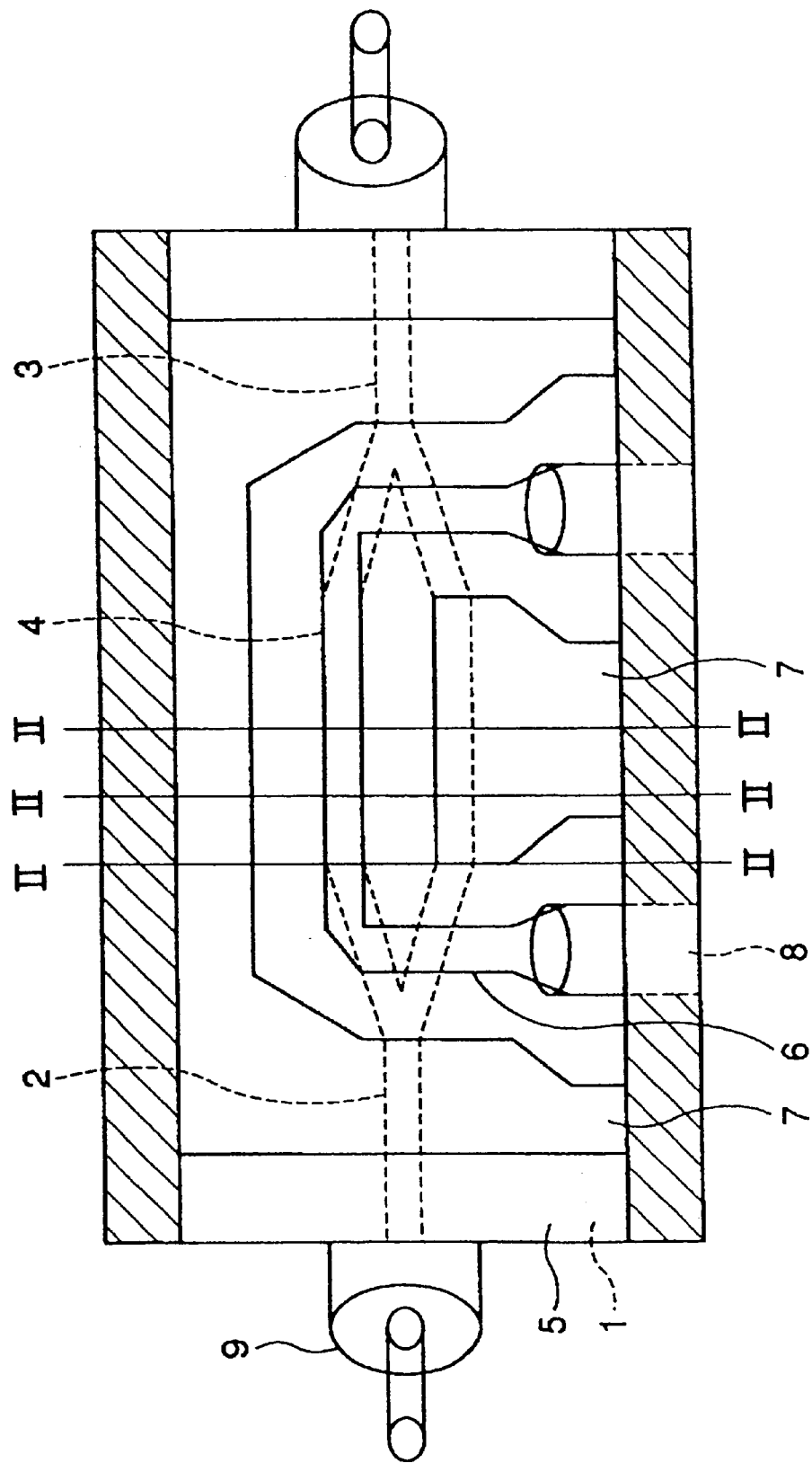
FIG. 1 is a plane view illustrative of the first conventional Mach-Zehnder optical modulator including a dielectric buffer layer having a constant thickness.
Figure 2:
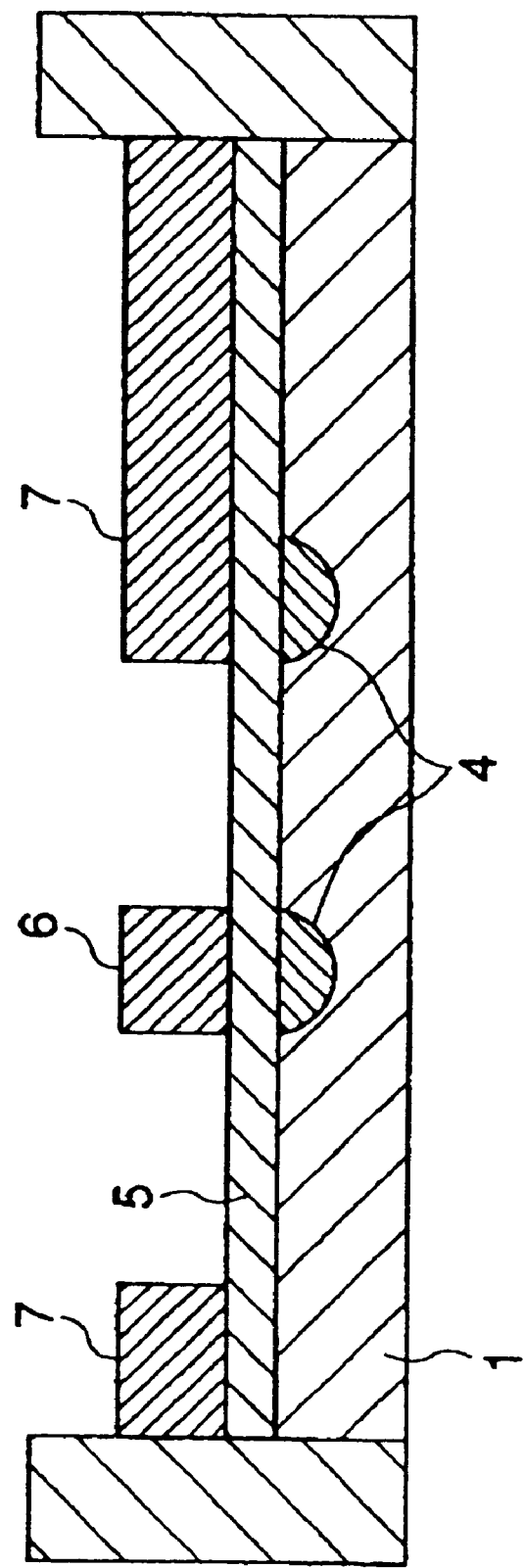
FIG. 2 is a cross sectional elevation view illustrative of the first conventional Mach-Zehnder optical modulator of FIG. 1.
Figure 3:
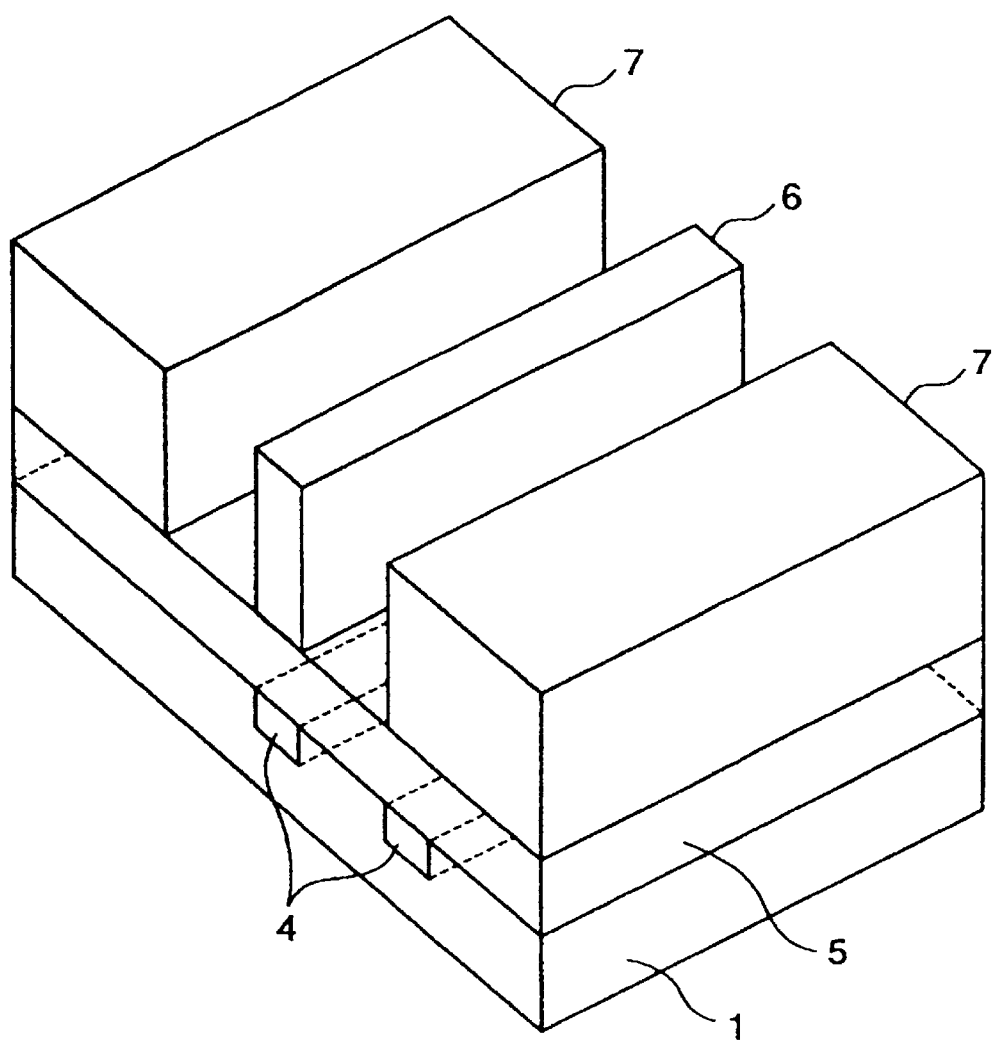
FIG. 3 is a schematic perspective view illustrative of the first conventional Mach-Zehnder optical modulator of FIGS. 1 and 2.
Figure 4:
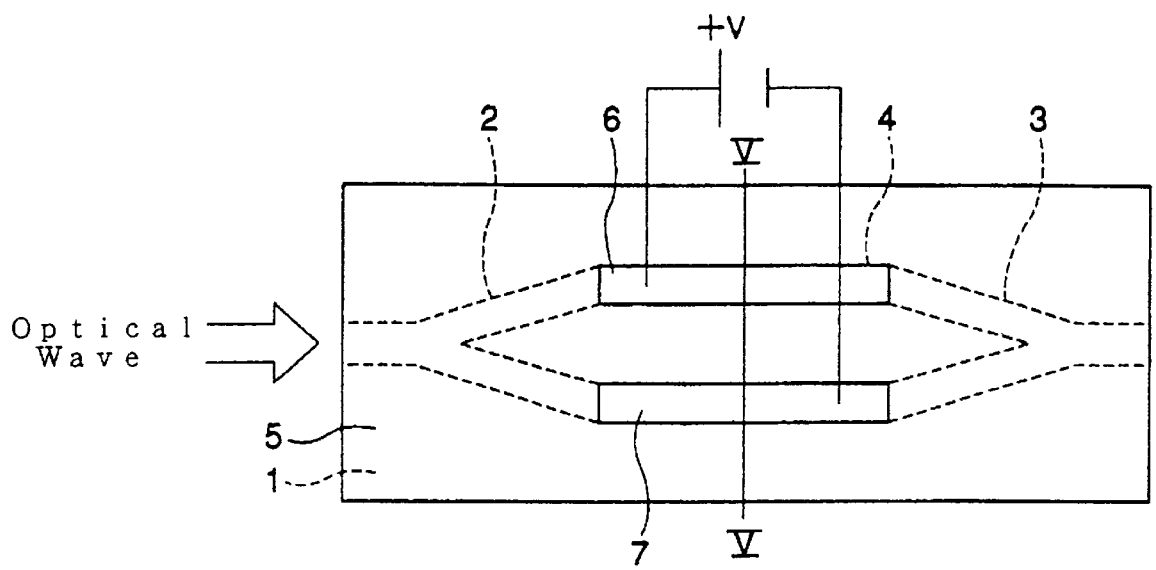
FIG. 4 is a plane view illustrative of the second conventional Mach-Zehnder optical modulator including a dielectric buffer layer having a constant thickness.
Figure 5:
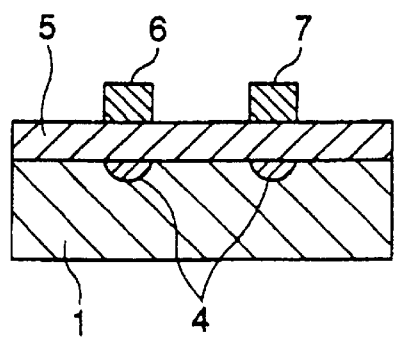
FIG. 5 is a cross sectional elevation view illustrative of the second conventional Mach-Zehnder optical modulator of FIG. 4.
Figure 6:
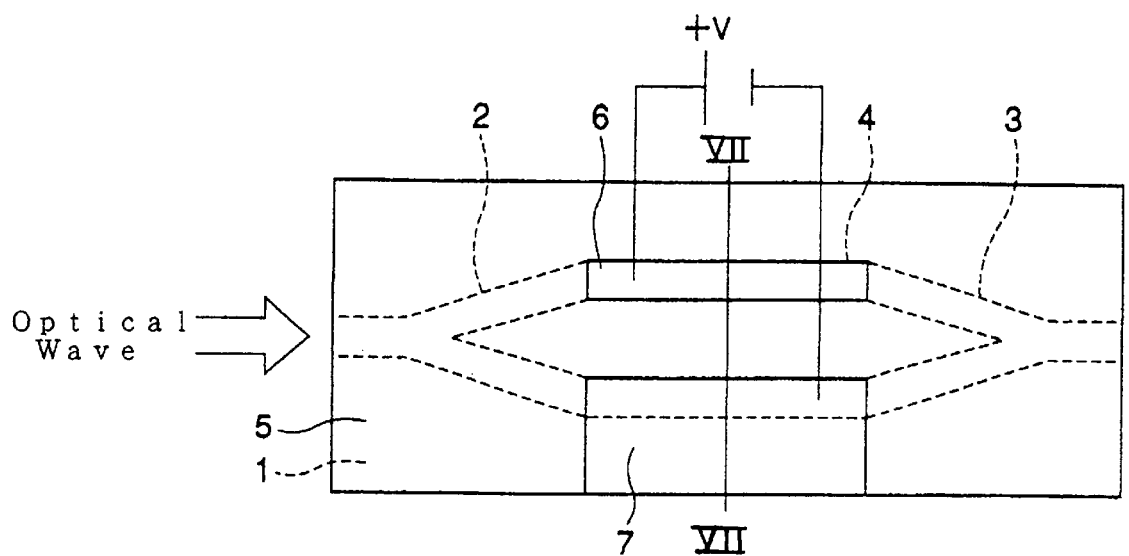
FIG. 6 is a plane view illustrative of the third conventional Mach-Zehnder optical modulator including a dielectric buffer layer having a constant thickness.
Figure 7:
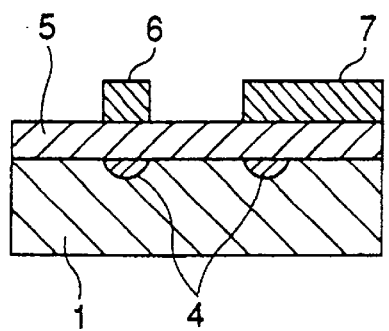
FIG. 7 is a cross sectional elevation view illustrative of the third conventional Mach-Zehnder optical modulator of FIG. 6.
Figure 8:
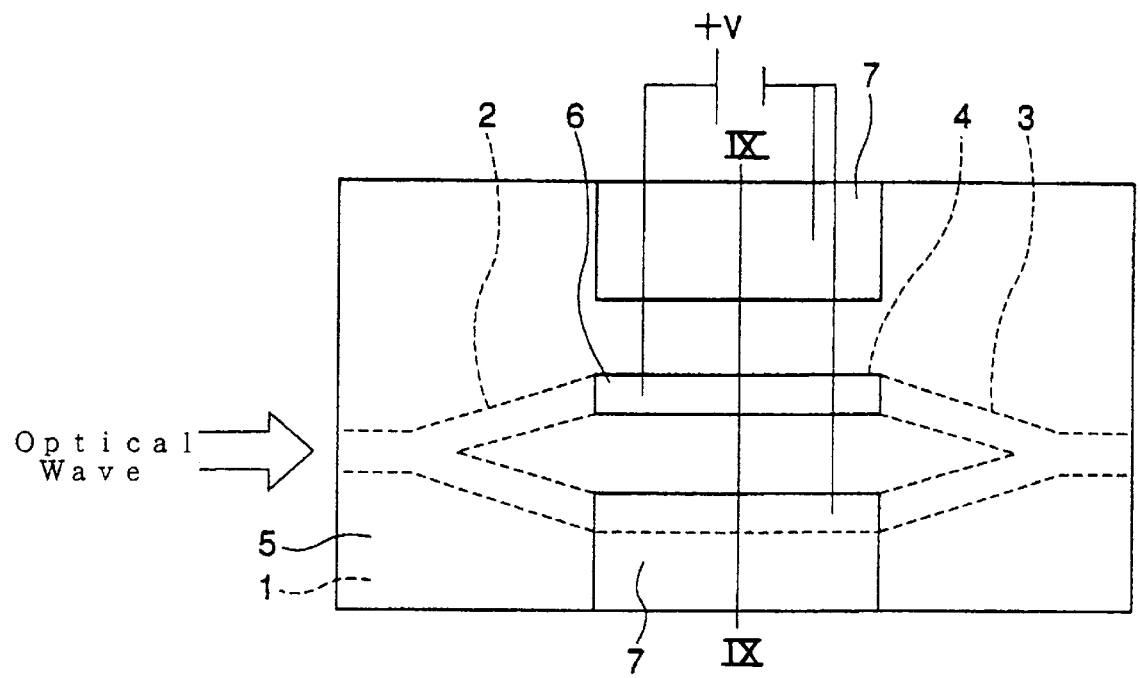
FIG. 8 is a plane view illustrative of the fourth conventional Mach-Zehnder optical modulator including a dielectric buffer layer having a constant thickness.
Figure 9:
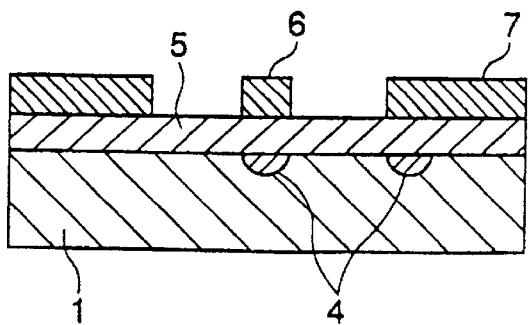
FIG. 9 is a cross sectional elevation view illustrative of the fourth conventional Mach-Zehnder optical modulator of FIG. 8.

The present invention provides a dielectric buffer layer extending over an optical waveguide and extending under an electrode which applies an electric field through the dielectric buffer layer to the optical waveguide for causing the optical waveguide to vary in refractive index profile in linear-proportion to an intensity of the electric field thereby causing a phase shift of a light which is on propagation in the optical waveguide. It is important for the present invention that the dielectric buffer layer varies in thickness whereby an overlap integral of a profile of the electric field and an optical mode field profile at a thinner portion of the dielectric buffer layer is larger than that at a thicker portion of the dielectric buffer layer, and whereby a difference of an effective microwave refractive index from an optical refractive index at the thicker portion is smaller than that at the thinner portion.

For applying the above dielectric buffer layer to the optical devices such as optical modulators and optical switches, it is required to reduce as many as possible the driving voltage and further widen the bandwidth. The driving voltage is defined by an overlap integral of the electric field profile and the optical mode field profile. If the overlap integral is risen, then the driving voltage is dropped. If, by contrast, the overlap integral is reduced, then the driving voltage is risen. In the light of a possible reduction in the driving voltage, it is required to increase the overlap integral as approaching to the theoretical maximum value of 1 as practically possible. In order to increase the overlap integral, it is required to reduce the thickness of the dielectric buffer layer through which an electric field is applied to the optical waveguide. Accordingly, in the light of a possible reduction in the driving voltage, it is required to reduce the thickness of the dielectric buffer layer through which an electric field is applied to the optical waveguide.

On the other hand, the bandwidth is defined by both a microwave attenuation and a velocity mismatch. This velocity mismatch is defined as a difference between an effective microwave refractive index which is variable and an optical wave refractive index which is fixed. If the microwave attenuation is reduced, then the bandwidth is widen. If, by contrast, the microwave attenuation is risen, then the bandwidth is made narrow. Accordingly, in the light of a possible reduction in the driving voltage, it is required to reduce the microwave attenuation as many as practically possible. Notwithstanding, even if a sufficiently low microwave attenuation can be obtained, the bandwidth is influenced by the velocity mismatch which is, as described above, defined as a difference of the effective microwave refractive index variable and the optical wave refractive index fixed. In the light of widening the bandwidth, it is required to approach the effective microwave refractive index to the optical wave refractive index as closely as practically possible. Since the effective microwave refractive index is usually larger than the optical wave refractive index, it might be considered that the effective microwave refractive index is required to be reduced to the optical wave refractive index as many as practically possible. In order to approach the effective microwave refractive index to the optical wave refractive index, it is required to increase the thickness of the dielectric buffer layer. Accordingly, in the light of widening the bandwidth, it is required to increase the thickness of the dielectric buffer layer.

Consequently, in order to reduce the driving voltage, it is required to reduce the thickness of the dielectric buffer layer through which an electric field is applied to the optical waveguide, whilst in order to widen the bandwidth, it is required to increase the thickness of the dielectric buffer layer. Notwithstanding, it is only a surface impression that it seems inconsistent requirements to satisfy both requirements for reducing the driving voltage and widening the bandwidth concurrently. The inventor of the present application had conceived and actually confirmed through the great deal of his endeavors that it is possible by varying the thickness of the dielectric buffer layer to satisfy both the above requirements for obtaining considerable reduction in the driving voltage and keeping much wider bandwidth. If, contrary to the subject matter of the present invention, the dielectric buffer layer remains unchanged in thickness in two dimensional directions, then it is certainly difficult to satisfy both requirements for reducing the driving voltage and widening the bandwidth concurrently. If, however, in accordance with the subject matter of the present invention, it is possible by varying the thickness of the dielectric buffer layer to satisfy both the above requirements for obtaining considerable reduction in the driving voltage and keeping much wider bandwidth.

The inventor had discovered and confirmed that the effect by a thinner portion of the dielectric buffer layer for increasing the overlap integral of the electric field profile and the optical mode field profile exceeds the effect by a thinner portion of the dielectric buffer layer for reducing the overlap integral. Namely, this means that the effect by the thinner portion of the dielectric buffer layer for reducing the driving voltage exceeds the effect by the thinner portion thereof for increasing the driving voltage. This further means that, in order to drop the driving voltage, it is more effective to very the thickness of the dielectric buffer layer than keeping the dielectric buffer layer at an averaged thickness which is calculated by averaging those varied thicknesses of the dielectric buffer layer.

The inventor had also discovered and confirmed that the effect by the thicker portion of the dielectric buffer layer for reducing the difference of the effective microwave refractive index from the optical wave refractive index exceeds the opposite effect by the thinner portion of the dielectric buffer layer for increasing the difference of the effective microwave refractive index from the optical wave refractive index. This means that the effect by the thicker portion of the dielectric buffer layer for widening the bandwidth exceeds the opposite effect by the thinner portion of the dielectric buffer layer for narrowing the bandwidth. This further means that, in order to widen the bandwidth, it is more effective to very the thickness of the dielectric buffer layer than keeping the dielectric buffer layer at an averaged thickness which is calculated by averaging those varied thicknesses of the dielectric buffer layer.

Consequently, in order to drop the driving voltage and widen the bandwidth concurrently, it is more effective to very the thickness of the dielectric buffer layer than keeping the dielectric buffer layer at the averaged thickness which is calculated by averaging those varied thicknesses of the dielectric buffer layer. For the above reasons, it is possible by varying the thickness of the dielectric buffer layer to satisfy both the above requirements for obtaining considerable reduction in the driving voltage and keeping much wider bandwidth.

The inventor had further confirmed with his endeavors the optimal profile of variation in thickness of the dielectric buffer layer as well as possible profiles of variation in thickness of the dielectric buffer layer as follows.

It is preferable that the dielectric buffer layer varies in thickness in two dimensional directions so that variation in thickness of the dielectric buffer layer appears continuously and gradually at least in a direction, along which the light is propagating. In order to drop the driving voltage and widen the bandwidth concurrently, it is more effective to very the thickness of the dielectric buffer layer continuously and gradually at least in a direction, along which the light is propagating. Continuous and gradual variations in thickness of the dielectric buffer layer through which an electric field is applied to the optical waveguide are desirable rather than the discontinuous or rapid variation in thickness of the dielectric buffer layer.

It is also preferable that the dielectric buffer layer varies in thickness discontinuously in two dimensional directions to form a thin portion and a thick portion, both of which are bounded by a step so that the step varies continuously and gradually in position on a first coordinate vertical to a direction, along which the light is propagating. Whereas the thickness of the dielectric buffer layer is discontinuously varied to form the step at the boundary between the thin and thick portions, the continuous and gradual variation in step position on the coordinate vertical to the direction, along which the light is propagating, is preferable to drop the driving voltage and widen the bandwidth concurrently.

It is also preferable that the dielectric buffer layer varies in thickness continuously in two dimensional directions to form a thin portion and a thick portion, both of which are bounded by a slope so that the slope varies continuously and gradually in position on a first coordinate vertical to a direction, along which the light is propagating. In order to drop the driving voltage and widen the bandwidth concurrently, it is more effective to very the thickness of the dielectric buffer layer continuously and gradually in two dimensional directions. Continuous and gradual variations in thickness of the dielectric buffer layer through which an electric field is applied to the optical waveguide are desirable rather than the discontinuous or rapid variation in thickness of the dielectric buffer layer.

It is also preferable that the dielectric buffer layer varies in thickness continuously in two dimensional directions to form a sloped portion and a thick portion so that a boundary between the sloped portion and the thick portion varies continuously and gradually in position on a first coordinate vertical to a direction, along which the light is propagating. In order to drop the driving voltage and widen the bandwidth concurrently, it is more effective to very the thickness of the dielectric buffer layer continuously and gradually in two dimensional directions. Continuous and gradual variations in thickness of the dielectric buffer layer through which an electric field is applied to the optical waveguide are desirable rather than the discontinuous or rapid variation in thickness of the dielectric buffer layer.

It is also possible that the dielectric buffer layer varies in thickness discontinuously in two dimensional directions to form a thin portion and a thick portion, both of which are bounded by a step so that the step varies discontinuously in position on a first coordinate vertical to a direction, along which the light is propagating.

It is also preferable that the dielectric buffer layer varies in thickness continuously in two dimensional directions to form a thin portion and a thick portion, both of which are bounded by a slope so that the slope varies discontinuously in position on a first coordinate vertical to a horizontal direction, along which the light is propagating. Whereas the slope position on the coordinate vertical to the direction, along which the light is propagating, is discontinuously varied, the slope providing the continuous and gradual variation in thickness of the dielectric buffer layer is preferable to drop the driving voltage and widen the bandwidth concurrently.

It is also preferable that the dielectric buffer layer varies in thickness continuously and gradually in two dimensional directions to form a sloped portion and a thick portion so that a boundary between the sloped portion and the thick portion varies discontinuously in position on a first coordinate in parallel to a first horizontal direction, along which the light is propagating. Whereas the boundary position on the coordinate vertical to the direction, along which the light is propagating, is discontinuously varied, the sloped portion and the thick portion providing the continuous and gradual variation in thickness of the dielectric buffer layer is preferable to drop the driving voltage and widen the bandwidth concurrently.

It is also preferable that the dielectric buffer layer varies in thickness in one dimensional direction vertical to a direction, along which the light is propagating, so that variation in thickness of the dielectric buffer layer appears continuously and gradually.

It is possible that the dielectric buffer layer varies in thickness in one dimensional direction vertical to a direction, along which the light is propagating, so that variation in thickness of the dielectric buffer layer appears discontinuously to form a thin portion and a thick portion, both of which are bounded by a step whereby the step remains in position on a first coordinate vertical to the direction, along which the light is propagating.

It is also possible that the dielectric buffer layer varies in thickness in one dimensional direction vertical to a direction, along which the light is propagating, so that variation in thickness of the dielectric buffer layer appears continuously to form a thin portion and a thick portion, both of which are bounded by a slope whereby the slope remains in position on a first coordinate vertical to the direction, along which the light is propagating.

It is also possible that the dielectric buffer layer varies in thickness in one dimensional direction vertical to a direction, along which the light is propagating, so that variation in thickness of the dielectric buffer layer appears discontinuously to form a sloped portion and a thick portion whereby a boundary between the sloped portion and the thick portion remains in position on a first coordinate vertical to the direction, along which the light is propagating.

It is also possible that the dielectric buffer layer varies in thickness symmetrically both in vertical and parallel to a direction, along which the light is propagating.

It is also possible that the dielectric buffer layer varies in thickness symmetrically in two-dimensional directions.

It is also possible that the dielectric buffer layer varies in thickness symmetrically in a first direction parallel to a direction, along which the light is propagating, and asymmetrically in a second direction vertical to the first direction.

It is also possible that the dielectric buffer layer varies in thickness asymmetrically in a first direction parallel to a direction, along which the light is propagating, and symmetrically in a second direction vertical to the first direction.

It is also possible that the dielectric buffer layer varies in thickness asymmetrically in two-dimensional directions.

It is also preferable that the dielectric buffer layer is made of a dielectric material having a dielectric constant in the range of 1.1 to 40.

It is also preferable to further provide first and second optical connectors coupled to opposite ends of the optical waveguide.

As a result of the variation in thickness of the dielectric buffer layer in accordance with the above present invention, the driving voltage to be applied to the signal electrode is considerably reduced to approximately 2.8 V and the characteristic impedance is kept in the range of 46–48Ω.

The present invention provides an optical device comprising a crystal substrate provided with at least an optical waveguide, a dielectric buffer layer provided on the optical waveguide, and at least an electrode selectively provided on the dielectric buffer layer for applying an electric field through at least a part of the dielectric buffer layer to at least a part of the optical waveguide for causing at least the above part of the optical waveguide to vary in refractive index profile in linear-proportion to an intensity of the electric field thereby causing a phase shift of a light which is on propagation in at least the above part of the optical waveguide, wherein at least the above part of the dielectric buffer layer, which extends on at least the above part of the optical waveguide, varies in thickness whereby an overlap integral of a profile of the electric field and an optical mode field profile at a thinner portion of the dielectric buffer layer is larger than that at a thicker portion of the dielectric buffer layer, and whereby a difference of an effective microwave refractive index from an optical refractive index at the thicker portion is smaller than that at the thinner portion.

For the optical devices such as optical modulators and optical switches, it is required to reduce as many as possible the driving voltage and further widen the bandwidth. The driving voltage is defined by an overlap integral of the electric field profile and the optical mode field profile. If the overlap integral is risen, then the driving voltage is dropped. If, by contrast, the overlap integral is reduced, then the driving voltage is risen. In the light of a possible reduction in the driving voltage, it is required to increase the overlap integral as approaching to the theoretical maximum value of 1 as practically possible. In order to increase the overlap integral, it is required to reduce the thickness of the dielectric buffer layer through which an electric field is applied to the optical waveguide. Accordingly, in the light of a possible reduction in the driving voltage, it is required to reduce the thickness of the dielectric buffer layer through which an electric field is applied to the optical waveguide.

On the other hand, the bandwidth is defined by both a microwave attenuation and a velocity mismatch. This velocity mismatch is defined as a difference between an effective microwave refractive index which is variable and an optical wave refractive index which is fixed. If the microwave attenuation is reduced, then the bandwidth is widen. If, by contrast, the microwave attenuation is risen, then the bandwidth is made narrow. Accordingly, in the light of a possible reduction in the driving voltage, it is required to reduce the microwave attenuation as many as practically possible. Notwithstanding, even if a sufficiently low microwave attenuation can be obtained, the bandwidth is influenced by the velocity mismatch which is, as described above, defined as a difference of the effective microwave refractive index variable and the optical wave refractive index fixed. In the light of widening the bandwidth, it is required to approach the effective microwave refractive index to the optical wave refractive index as closely as practically possible. Since the effective microwave refractive index is usually larger than the optical wave refractive index, it might be considered that the effective microwave refractive index is required to be reduced to the optical wave refractive index as many as practically possible. In order to approach the effective microwave refractive index to the optical wave refractive index, it is required to increase the thickness of the dielectric buffer layer. Accordingly, in the light of widening the bandwidth, it is required to increase the thickness of the dielectric buffer layer.

Consequently, in order to reduce the driving voltage, it is required to reduce the thickness of the dielectric buffer layer through which an electric field is applied to the optical waveguide, whilst in order to widen the bandwidth, it is required to increase the thickness of the dielectric buffer layer. Notwithstanding, it is only a surface impression that it seems inconsistent requirements to satisfy both requirements for reducing the driving voltage and widening the bandwidth concurrently. The inventor of the present application had conceived and actually confirmed through the great deal of his endeavors that it is possible by varying the thickness of the dielectric buffer layer to satisfy, both the above requirements for obtaining considerable reduction in the driving voltage and keeping much wider bandwidth, If, contrary to the subject matter of the present invention, the dielectric buffer layer remains unchanged in thickness in two dimensional directions, then it is certainly difficult to satisfy both requirements for reducing the driving voltage and widening the bandwidth concurrently. If, however, in accordance with the subject matter of the present invention, it is possible by varying the thickness of the dielectric buffer layer to satisfy both the above requirements for obtaining considerable reduction in the driving voltage and keeping much wider bandwidth.

The inventor had discovered and confirmed that the effect by a thinner portion of the dielectric buffer layer for increasing the overlap integral of the electric field profile and the optical mode field profile exceeds the effect by a thinner portion of the dielectric buffer layer for reducing the overlap integral. Namely, this means that the effect by the thinner portion of the dielectric buffer layer for reducing the driving voltage exceeds the effect by the thinner portion thereof for increasing the driving voltage. This further means that, in order to drop the driving voltage, it is more effective to very the thickness of the dielectric buffer layer than keeping the dielectric buffer layer at an averaged thickness which is calculated by averaging those varied thicknesses of the dielectric buffer layer.

The inventor had also discovered and confirmed that the effect by the thicker portion of the dielectric buffer layer for reducing the difference of the effective microwave refractive index from the optical wave refractive index exceeds the opposite effect by the thinner portion of the dielectric buffer layer for increasing the difference of the effective microwave refractive index from the optical wave refractive index. This means that the effect by the thicker portion of the dielectric buffer layer for widening the bandwidth exceeds the opposite effect by the thinner portion of the dielectric buffer layer for narrowing the bandwidth. This further means that, in order to widen the bandwidth, it is more effective to very the thickness of the dielectric buffer layer than keeping the dielectric buffer layer at an averaged thickness which is calculated by averaging those varied thicknesses of the dielectric buffer layer.

Consequently, in order to drop, the driving voltage and widen the bandwidth concurrently, it is more effective to very the thickness of the dielectric buffer layer than keeping the dielectric buffer layer at the averaged thickness which is calculated by averaging those varied thicknesses of the dielectric buffer layer. For the above reasons, it is possible by varying the thickness of the dielectric buffer layer to satisfy both the above requirements for obtaining considerable reduction in the driving voltage and keeping much wider bandwidth.

The inventor had further confirmed with his endeavors the optimal profile of variation in thickness of the dielectric buffer layer as well as possible profiles of variation in thickness of the dielectric buffer layer as follows.

It is preferable that at least the above part of the dielectric buffer layer varies in thickness in two dimensional directions so that variation in thickness of the dielectric buffer layer appears continuously and gradually at least in a direction, along which the light is propagating. In order to drop the driving voltage and widen the bandwidth concurrently, it is more effective to very the thickness of the dielectric buffer layer continuously and gradually at least in a direction, along which the light is propagating. Continuous and gradual variations in thickness of the dielectric buffer layer through which an electric field is applied to the optical waveguide are desirable rather than the discontinuous or rapid variation in thickness of the dielectric buffer layer.

It is also preferable that at least the above part of the dielectric buffer layer varies in thickness discontinuously in two dimensional directions to form a thin portion and a thick portion, both of which are bounded by a step so that the step varies continuously and gradually in position on a first coordinate vertical to a direction, along which the light is propagating. Whereas the thickness of the dielectric buffer layer is discontinuously varied to form the stop at the boundary between the thin and thick portions, the continuous and gradual variation in step position on the coordinate vertical to the direction, along which the light is propagating, is preferable to drop the driving voltage and widen the bandwidth concurrently.

It is also preferable that at least the above part of the dielectric buffer layer varies in thickness continuously in two dimensional directions to form a thin portion and a thick portion, both of which are bounded by a slope so that the slope varies continuously and gradually in position on a first coordinate vertical to a direction, along which the light is propagating. In order to drop the driving voltage and widen the bandwidth concurrently, it is more effective to very the thickness of the dielectric buffer layer continuously and gradually in two dimensional directions. Continuous and gradual variations in thickness of the dielectric buffer layer through which an electric field is applied to the optical waveguide are desirable rather than the discontinuous or rapid variation in thickness of the dielectric buffer layer.

It is also preferable that at least the above part of the dielectric buffer layer varies in thickness continuously in two dimensional directions to form a sloped portion and a thick portion so that a boundary between the sloped portion and the thick portion varies continuously and gradually in position on a first coordinate vertical to a direction, along which the light is propagating. In order to drop the driving voltage and widen the bandwidth concurrently, it is more effective to very the thickness of the dielectric buffer layer continuously and gradually in two dimensional directions. Continuous and gradual variations in thickness of the dielectric buffer layer through which an electric field is applied to the optical waveguide are desirable rather than the discontinuous or rapid variation in thickness of the dielectric buffer layer.

It is also possible that at least the above part of the dielectric buffer layer varies in thickness discontinuously in two dimensional directions to form a thin portion and a thick portion, both of which are bounded by a step so that the step varies discontinuously in position on a first coordinate vertical to a direction, along which the light is propagating.

It is also preferable that at least the above part of the dielectric buffer layer varies in thickness continuously in two dimensional directions to form a thin portion and a thick portion, both of which are bounded by a slope so that the slope varies discontinuously in position on a first coordinate vertical to a horizontal direction, along which the light is propagating. Whereas the slope position on the coordinate vertical to the direction, along which the light is propagating, is discontinuously varied, the slope providing the continuous and gradual variation in thickness of the dielectric buffer layer is preferable to drop the driving voltage and widen the bandwidth concurrently.

It is also preferable that at least the above part of the dielectric buffer layer varies in thickness continuously and gradually in two dimensional directions to form a sloped portion and a thick portion so that a boundary between the sloped portion and the thick portion varies discontinuously in position on a first coordinate in parallel to a first horizontal direction, along which the light is propagating. Whereas the boundary position on the coordinate vertical to the direction, along which the light is propagating, is discontinuously varied, the sloped portion and the thick portion providing the continuous and gradual variation in thickness of the dielectric buffer layer is preferable to drop the driving voltage and widen the bandwidth concurrently.

It is also possible that at least the above part of the dielectric buffer layer varies in thickness in one dimensional direction vertical to a direction, along which the light is propagating, so that variation in thickness of the dielectric buffer layer appears continuously and gradually.

It is also possible that at least the above part of the dielectric buffer layer varies in thickness in one dimensional direction vertical to a direction, along which the light is propagating, so that variation in thickness of the dielectric buffer layer appears discontinuously to form a thin portion and a thick portion, both of which are bounded by a step whereby the step remains in position on a first coordinate vertical to the direction, along which the light is propagating.

It is also possible that at least the above part of the dielectric buffer layer varies in thickness in one dimensional direction vertical to a direction, along which the light is propagating, so that variation in thickness of the dielectric buffer layer appears continuously to form a thin portion and a thick portion, both of which are bounded by a slope whereby the slope remains in position on a first coordinate vertical to the direction, along which the light is propagating.

It is also possible that at least the above part of the dielectric buffer layer varies in thickness in one dimensional direction vertical to a direction, along which the light is propagating, so that variation in thickness of the dielectric buffer layer appears discontinuously to form a sloped portion and a thick portion whereby a boundary between the sloped portion and the thick portion remains in position on a first coordinate vertical to the direction, along which the light is propagating.

It is also possible that at least the above part of the dielectric buffer layer varies in thickness symmetrically both in vertical and parallel to a direction, along which the light is propagating.

It is also possible that at least the above part of the dielectric buffer layer varies in thickness symmetrically in two-dimensional directions.

It is also possible that at least the above part of the dielectric buffer layer varies in thickness symmetrically in a first direction parallel to a direction, along which the light is propagating, and asymmetrically in a second direction vertical to the first direction.

It is also possible that at least the above part of the dielectric buffer layer varies in thickness asymmetrically in a first direction parallel to a direction, along which the light is propagating, and symmetrically in a second direction vertical to the first direction.

It is also possible that at least the above part of the dielectric buffer layer varies in thickness asymmetrically in two-dimensional directions.

It is also preferable that the dielectric buffer layer is made of a dielectric material having a dielectric constant in the range of 1.1 to 40.

It is also preferable to further provide first and second optical connectors coupled to opposite ends of the optical waveguide.

As a result of the variation in thickness of the dielectric buffer layer in accordance with the above present invention, the driving voltage to be applied to the signal electrode is considerably reduced to approximately 2.8 V and the characteristic impedance is kept in the range of 46–48Ω.

The present invention provides an optical modulator comprising the following elements. A crystal substrate is capable of causing an electro-optical effect. The crystal substrate comprises an active region, a first passive region in directly contact with a first side of the active region and a second passive region in directly contact with a second side opposite to the first side of the active region. An optical waveguide extends over the active region and the first and second passive regions of the crystal substrate. The optical waveguide comprises an optical divider portion provided in the first passive region, a plurality of phase modulator portions provided in the active region and coupled to the optical divider portion, and an optical coupler portion provided in the second passive region and coupled to the phase modulator portions. A top surface of the optical waveguide and a surface of the crystal substrate form a flat surface. A dielectric buffer layer extends over the flat surface. A plurality of electrodes are selectively provided on the buffer layer for applying an electric field through at least part of the dielectric layer to at least one of the phase modulator portions for causing at least the above one of the phase modulator portions to vary in refractive index profile in linear-proportion to an intensity of the electric field thereby causing phase shift of a light which is on propagation in at least the above one of the phase modulator portions. It is important for the present invention that at least the above part of the dielectric buffer layer, which extends on at least the above part of the optical waveguide, varies in thickness whereby an overlap integral of a profile of the electric field and an optical mode field profile at a thinner portion of the dielectric buffer layer is larger than that at a thicker portion of the dielectric buffer layer, and whereby a difference of an effective microwave refractive index from an optical refractive index at the thicker portion is smaller than that at the thinner portion.

For the optical modulators, it is required to reduce as many as possible the driving voltage and further widen the bandwidth. The driving voltage is defined by an overlap integral of the electric field profile and the optical mode field profile. If the overlap integral is risen, then the driving voltage is dropped. If, by contrast, the overlap integral is reduced, then the driving voltage is risen. In the light of a possible reduction in the driving voltage, it is required to increase the overlap integral as approaching to the theoretical maximum value of 1 as practically possible. In order to increase the overlap integral, it is required to reduce the thickness of the dielectric buffer layer through which an electric field is applied to the optical waveguide. Accordingly, in the light of a possible reduction in the driving voltage, it is required to reduce the thickness of the dielectric buffer layer through which an electric field is applied to the optical waveguide.

On the other hand, the bandwidth is defined by both a microwave attenuation and a velocity mismatch. This velocity mismatch is defined as a difference between an effective microwave refractive index which is variable and an optical wave refractive index which is fixed. If the microwave attenuation is reduced, then the bandwidth is widen. If, by contrast, the microwave attenuation is risen, then the bandwidth is made narrow. Accordingly, in the light of a possible reduction in the driving voltage, it is required to reduce the microwave attenuation as many as practically possible. Notwithstanding, even if a sufficiently low microwave attenuation can be obtained, the bandwidth is influenced by the velocity mismatch which is, as described above, defined as a difference of the effective microwave refractive index variable and the optical wave refractive index fixed. In the light of widening the bandwidth, it is required to approach the effective microwave refractive index to the optical wave refractive index as closely as practically possible. Since the effective microwave refractive index is usually larger than the optical wave refractive index, it might be considered that the effective microwave refractive index is required to be reduced to the optical wave refractive index as many as practically possible. In order to approach the effective microwave refractive index to the optical wave refractive index, it is required to increase the thickness of the dielectric buffer layer. Accordingly, in the light of widening the bandwidth, it is required to increase the thickness of the dielectric buffer layer.

Consequently, in order to reduce the driving voltage, it is required to reduce the thickness of the dielectric buffer layer through which an electric field is applied to the optical waveguide, whilst in order to widen the bandwidth, it is required to increase the thickness of the dielectric buffer layer. Notwithstanding, it is only a surface impression that it seems inconsistent requirements to satisfy both requirements for reducing the driving voltage and widening the bandwidth concurrently. The inventor of the present application had conceived and actually confirmed through the great deal of his endeavors that it is possible by varying the thickness of the dielectric buffer layer to satisfy both the above requirements for obtaining considerable reduction in the driving voltage and keeping much wider bandwidth. If, contrary to the subject matter of the present invention, the dielectric buffer layer remains unchanged in thickness in two dimensional directions, then it is certainly difficult to satisfy both requirements for reducing the driving voltage and widening the bandwidth concurrently. If, however, in accordance with the subject matter of the present invention, it is possible by varying the thickness of the dielectric buffer layer to satisfy both the above requirements for obtaining considerable reduction in the driving voltage and keeping much wider bandwidth.

The inventor had discovered and confirmed that the effect by a thinner portion of the dielectric buffer layer for increasing the overlap integral of the electric field profile and the optical mode field profile exceeds the effect by a thinner portion of the dielectric buffer layer for reducing the overlap integral. Namely, this means that the effect by the thinner portion of the dielectric buffer layer for reducing the driving voltage exceeds the effect by the thinner portion thereof for increasing the driving voltage. This further means that, in order to drop the driving voltage, it is more effective to very the thickness of the dielectric buffer layer than keeping the dielectric buffer layer at an averaged thickness which is calculated by averaging those varied thicknesses of the dielectric buffer layer.

The inventor had also discovered and confirmed that the effect by the thicker portion of the dielectric buffer layer for reducing the difference of the effective microwave refractive index from the optical wave refractive index exceeds the opposite effect by the thinner portion of the dielectric buffer layer for increasing the difference of the effective microwave refractive index from the optical wave refractive index. This means that the effect by the thicker portion of the dielectric buffer layer for widening the bandwidth exceeds the opposite effect by the thinner portion of the dielectric buffer layer for narrowing the bandwidth. This further means that, in order to widen the bandwidth, it is more effective to very the thickness of the dielectric buffer layer than keeping the dielectric buffer layer at an averaged thickness which is calculated by averaging those varied thicknesses of the dielectric buffer layer.

Consequently, in order to drop the driving voltage and widen the bandwidth concurrently, it is more effective to very the thickness of the dielectric buffer layer than keeping the dielectric buffer layer at the averaged thickness which is calculated by averaging those varied thicknesses of the dielectric buffer layer. For the above reasons, it is possible by varying the thickness of the dielectric buffer layer to satisfy both the above requirements for obtaining considerable reduction in the driving voltage and keeping much wider bandwidth.

The inventor had further confirmed with his endeavors the optimal profile of variation in thickness of the dielectric buffer layer as well as possible profiles of variation in thickness of the dielectric buffer layer as follows.

It is preferable that at least the above part of the dielectric buffer layer varies in thickness in two dimensional directions so that variation in thickness of the dielectric buffer layer appears continuously and gradually at least in a direction, along which the light is propagating. In order to drop the driving voltage and widen the bandwidth concurrently, it is more effective to very the thickness of the dielectric buffer layer continuously and gradually at least in a direction, along which the light is propagating. Continuous and gradual variations in thickness of the dielectric buffer layer through which an electric field is applied to the optical waveguide are desirable rather than the discontinuous or rapid variation in thickness of the dielectric buffer layer.

It is also preferable that at least the above part of the dielectric buffer layer varies in thickness discontinuously in two dimensional directions to form a thin portion and a thick portion, both of which are bounded by a step so that the step varies continuously and gradually in position on a first coordinate vertical to a direction, along which the light is propagating. Whereas the thickness of the dielectric buffer layer is discontinuously varied to form the step at the boundary between the thin and thick portions, the continuous and gradual variation in position on the coordinate vertical to the direction, along which the light is propagating, is preferable to drop the driving voltage and widen the bandwidth concurrently.

It is also preferable that at least the above part of the dielectric buffer layer varies in thickness continuously in two dimensional directions to form a thin portion and a thick portion, both of which are bounded by a slope so that the slope varies continuously and gradually in position on a first coordinate vertical to a direction, along which the light is propagating. In order to drop the driving voltage and widen the bandwidth concurrently, it is more effective to very the thickness of the dielectric buffer layer continuously and gradually in two dimensional directions. Continuous and gradual variations in thickness of the dielectric buffer layer through which an electric field is applied to the optical waveguide are desirable rather than the discontinuous or rapid variation in thickness of the dielectric buffer layer.

It is also preferable that at least the above part of the dielectric buffer layer varies in thickness continuously in two dimensional directions to form a sloped portion and a thick portion so that a boundary between the sloped portion and the thick portion varies continuously and gradually in position on a first coordinate vertical to a direction, along which the light is propagating. In order to drop the driving voltage and widen the bandwidth concurrently, it is more effective to very the thickness of the dielectric buffer layer continuously and gradually in two dimensional directions. Continuous and gradual variations in thickness of the dielectric buffer layer through which an electric field is applied to the optical waveguide are desirable rather than the discontinuous or rapid variation in thickness of the dielectric buffer layer.

It is also possible that at least the above part of the dielectric buffer layer varies in thickness discontinuously in two dimensional directions to form a thin portion and a thick portion, both of which are bounded by a step so that the step varies discontinuously in position on a first coordinate vertical to a direction, along which the light is propagating.

It is also preferable that at least the above part of the dielectric buffer layer varies in thickness continuously in two dimensional directions to form a thin portion and a thick portion, both of which are bounded by a slope so that the slope varies discontinuously in position on a first coordinate vertical to a horizontal direction, along which the light is propagating. Whereas the slope position on the coordinate vertical to the direction, along which the light is propagating, is discontinuously varied, the slope providing the continuous and gradual variation in thickness of the dielectric buffer layer is preferable to drop the driving voltage and widen the bandwidth concurrently.

It is also preferable that at least the above part of the dielectric buffer layer varies in thickness continuously and gradually in two dimensional directions to form a sloped portion and a thick portion so that a boundary between the sloped portion and the thick portion varies discontinuously in position on a first coordinate in parallel to a first horizontal direction, along which the light is propagating. Whereas the boundary position on the coordinate vertical to the direction, along which the light is propagating, is discontinuously varied, the sloped portion and the thick portion providing the continuous and gradual variation in thickness of the dielectric buffer layer is preferable to drop the driving voltage and widen the bandwidth concurrently.

It is also possible that at least the above part of the dielectric buffer layer varies in thickness in one dimensional direction vertical to a direction, along which the light is propagating, so that variation in thickness of the dielectric buffer layer appears continuously and gradually.

It is also possible that at least the above part of the dielectric buffer layer varies in thickness in one dimensional direction vertical to a direction, along which the light is propagating, so that variation in thickness of the dielectric buffer layer appears discontinuously to form a thin portion and a thick portion, both of which are bounded by a step whereby the step remains in position on a first coordinate vertical to the direction, along which the light is propagating.

It is also possible that at least the above part of the dielectric buffer layer varies in thickness in one dimensional direction vertical to a direction, along which the light is propagating, so that variation in thickness of the dielectric buffer layer appears continuously to form a thin portion and a thick portion, both of which are bounded by a slope whereby the slope remains in position on a first coordinate vertical to the direction, along which the light is propagating.

It is also possible that at least the above part of the dielectric buffer layer varies in thickness in one dimensional direction vertical to a direction, along which the light is propagating, so that variation in thickness of the dielectric buffer layer appears discontinuously to form a sloped portion and a thick portion whereby a boundary between the sloped portion and the thick portion remains in position on a first coordinate vertical to the direction, along which the light is propagating.

It is also possible that at least the above part of the dielectric buffer layer varies in thickness symmetrically both in vertical and parallel to a direction, along which the light is propagating.

It is also possible that at least the above part of the dielectric buffer layer varies in thickness symmetrically in two-dimensional directions.

It is also possible that at least the above part of the dielectric buffer layer varies in thickness symmetrically in a first direction parallel to a direction, along which the light is propagating, and asymmetrically in a second direction vertical to the first direction.

It is also possible that at least the above part of the dielectric buffer layer varies in thickness asymmetrically in a first direction parallel to a direction, along which the light is propagating, and symmetrically in a second direction vertical to the first direction.

It is also possible that at least the above part of the dielectric buffer layer varies in thickness asymmetrically in two-dimensional directions.

It is also preferable that the dielectric buffer layer is made of a dielectric material having a dielectric constant in the range of 1.1 to 40.

It is also preferable to further provide first and second optical connectors coupled to opposite ends of the optical waveguide.

As a result of the variation in thickness of the dielectric buffer layer in accordance with the above present invention, the driving voltage to be applied to the signal electrode is considerably reduced to approximately 2.8 V and the characteristic impedance is kept in the range of 46–48Ω.

The present invention provides a Mach-Zehnder optical modulator comprising the following elements. A crystal substrate is capable of causing an electro-optical effect. The crystal substrate comprises an active region, a first passive region in directly contact with a first side of the active region and a second passive region in directly contact with a second side opposite to the first side of the active region. An optical waveguide extends over the active region and the first and second passive regions of the crystal substrate. The optical waveguide comprises a Y-shaped optical divider portion provided on the first passive region, first and second straight arm portions provided in parallel to each other on the active region and coupled to the Y-shaped optical divider portion, and a Y-shaped optical coupler portion provided on the second passive region and coupled to the first and second straight arm portions. A top surface of the optical waveguide and a surface of the crystal substrate forms a flat surface. A dielectric buffer layer extends over the flat surface. A signal electrode is selectively provided on the buffer layer over the first straight arm portion for applying an electric field through the dielectric layer to the first straight arm portion for causing the first straight arm portion to vary in refractive index profile in linear-proportion to an intensity of the electric field thereby causing phase shift of a light which is on propagation in the first straight arm portion. A ground electrode is selectively provided on the buffer layer over the second straight arm portion. It is important for the present invention that at least a part of the dielectric buffer layer, which extends on the first straight arm portion, varies in thickness whereby an overlap integral of a profile of the electric field and an optical mode field profile at a thinner portion of the dielectric buffer layer is larger than that at a thicker portion of the dielectric buffer layer, and whereby a difference of an effective microwave refractive index from an optical refractive index at the thicker portion is smaller than that at the thinner portion.

For the above Mach-Zehnder optical modulator, it is required to reduce as many as possible the driving voltage and further widen the bandwidth. The driving voltage is defined by an overlap integral of the electric field profile and the optical mode field profile. If the overlap integral is risen, then the driving voltage is dropped. If, by contrast, the overlap integral is reduced, then the driving voltage is risen. In the light of a possible reduction in the driving voltage, it is required to increase the overlap integral as approaching to the theoretical maximum value of 1 as practically possible. In order to increase the overlap integral, it is required to reduce the thickness of the dielectric buffer layer through which an electric field is applied to the optical waveguide. Accordingly, in the light of a possible reduction in the driving voltage, it is required to reduce the thickness of the dielectric buffer layer through which an electric field is applied to the optical waveguide.

On the other hand, the bandwidth is defined by both a microwave attenuation and a velocity mismatch. This velocity mismatch is defined as a difference between an effective microwave refractive index which is variable and an optical wave refractive index which is fixed. If the microwave attenuation is reduced, then the bandwidth is widen. If, by contrast, the microwave attenuation is risen, then the bandwidth is made narrow. Accordingly, in the light of a possible reduction in the driving voltage, it is required to reduce the microwave attenuation as many as practically possible. Notwithstanding, even if a sufficiently low microwave attenuation can be obtained, the bandwidth is influenced by the velocity mismatch which is, as described above, defined as a difference of the effective microwave refractive index variable and the optical wave refractive index fixed. In the light of widening the bandwidth, it is required to approach the effective microwave refractive index to the optical wave refractive index as closely as practically possible. Since the effective microwave refractive index is usually larger than the optical wave refractive index, it might be considered that the effective microwave refractive index is required to be reduced to the optical wave refractive index as many as practically possible. In order to approach the effective microwave refractive index to the optical wave refractive index, it is required to increase the thickness of the dielectric buffer layer. Accordingly, in the light of widening the bandwidth, it is required to increase the thickness of the dielectric buffer layer.

Consequently, in order to reduce the driving voltage, it is required to reduce the thickness of the dielectric buffer layer through which an electric field is applied to the optical waveguide, whilst in order to widen the bandwidth, it is required to increase the thickness of the dielectric buffer layer. Notwithstanding, it is only a surface impression that it seems inconsistent requirements to satisfy both requirements for reducing the driving voltage and widening the bandwidth concurrently. The inventor of the present application had conceived and actually confirmed through the great deal of his endeavors that it is possible by varying the thickness of the dielectric buffer layer to satisfy both the above requirements for obtaining considerable reduction in the driving voltage and keeping much wider bandwidth. If, contrary to the subject matter of the present invention, the dielectric buffer layer remains unchanged in thickness in two dimensional directions, then it is certainly difficult to satisfy both requirements for reducing the driving voltage and widening the bandwidth concurrently. If, however, in accordance with the subject matter of the present invention, it is possible by varying the thickness of the dielectric buffer layer to satisfy both the above requirements for obtaining considerable reduction in the driving voltage and keeping much wider bandwidth.

The inventor had discovered and confirmed that the effect by a thinner portion of the dielectric buffer layer for increasing the overlap integral of the electric field profile and the optical mode field profile exceeds the effect by a thinner portion of the dielectric buffer layer for reducing the overlap integral. Namely, this means that the effect by the thinner portion of the dielectric buffer layer for reducing the driving voltage exceeds the effect by the thinner portion thereof for increasing the driving voltage. This further means that, in order to drop the driving voltage, it is more effective to very the thickness of the dielectric buffer layer than keeping the dielectric buffer layer at an averaged thickness which is calculated by averaging those varied thicknesses of the dielectric buffer layer.

The inventor had also discovered and confirmed that the effect by the thicker portion of the dielectric buffer layer for reducing the difference of the effective microwave refractive index from the optical wave refractive index exceeds the opposite effect by the thinner portion of the dielectric buffer layer for increasing the difference of the effective microwave refractive index from the optical wave refractive index. This means that the effect by the thicker portion of the dielectric buffer layer for widening the bandwidth exceeds the opposite effect by the thinner portion of the dielectric buffer layer for narrowing the bandwidth. This further means that, in order to widen the bandwidth, it is more effective to very the thickness of the dielectric buffer layer than keeping the dielectric buffer layer at an averaged thickness which is calculated by averaging those varied thicknesses of the dielectric buffer layer.

Consequently, in order to drop the driving voltage and widen the bandwidth concurrently, it is more effective to very the thickness of the dielectric buffer layer than keeping the dielectric buffer layer at the averaged thickness which is calculated by averaging those varied thicknesses of the dielectric buffer layer. For the above reasons, it is possible by varying the thickness of the dielectric buffer layer to satisfy both the above requirements for obtaining considerable reduction in the driving voltage and keeping much wider bandwidth.

The inventor had further confirmed with his endeavors the optimal profile of variation in thickness of the dielectric buffer layer as well as possible profiles of variation in thickness of the dielectric buffer layer as follows.

It is preferable that at least the above part of the dielectric buffer layer varies in thickness in two dimensional directions so that variation in thickness of the dielectric buffer layer appears continuously and gradually at least in a direction, along which the light is propagating. In order to drop the driving voltage and widen the bandwidth concurrently, it is more effective to very the thickness of the dielectric buffer layer continuously and gradually at least in a direction, along which the light is propagating. Continuous and gradual variations in thickness of the dielectric buffer layer through which an electric field is applied to the optical waveguide are desirable rather than the discontinuous or rapid variation in thickness of the dielectric buffer layer.

It is also preferable that at least the above part of the dielectric buffer layer varies in thickness discontinuously in two dimensional directions to form a thin portion and a thick portion, both of which are bounded by a step so that the step varies continuously and gradually in position on a first coordinate vertical to a direction, along which the light is propagating. Whereas the thickness of the dielectric buffer layer is discontinuously varied to form the step at the boundary between the thin and thick portions, the continuous and gradual variation in step position on the coordinate vertical to the direction, along which the light is propagating, is preferable to drop the driving voltage and widen the bandwidth concurrently.

It is also preferable that at least the above part of the dielectric buffer layer varies in thickness continuously in two dimensional directions to form a thin portion and a thick portion, both of which are bounded by a slope so that the slope varies continuously and gradually in position on a first coordinate vertical to a direction along which the light is propagating. In order to drop the driving voltage and widen the bandwidth concurrently, it is more effective to very the thickness of the dielectric buffer layer continuously and gradually in two dimensional directions. Continuous and gradual variations in thickness of the dielectric buffer layer through which an electric field is applied to the optical waveguide are desirable rather than the discontinuous or rapid variation in thickness of the dielectric buffer layer.

It is also preferable that at least the above part of the dielectric buffer layer varies in thickness continuously in two dimensional directions to form a sloped portion and a thick portion so that a boundary between the sloped portion and the thick portion varies continuously and gradually in position on a first coordinate vertical to a direction, along which the light is propagating. In order to drop the driving voltage and widen the bandwidth concurrently, it is more effective to very the thickness of the dielectric buffer layer continuously and gradually in two dimensional directions. Continuous and gradual variations in thickness of the dielectric buffer layer through which an electric field is applied to the optical waveguide are desirable rather than the discontinuous or rapid variation in thickness of the dielectric buffer layer.

It is also possible that at least the above part of the dielectric buffer layer varies in thickness discontinuously in two dimensional directions to form a thin portion and a thick portion, both of which are bounded by a step so that the step varies discontinuously in position on a first coordinate vertical to a direction, along which the light is propagating.

It is also preferable that at least the above part of the dielectric buffer layer varies in thickness continuously in two dimensional directions to form a thin portion and a thick portion, both of which are bounded by a slope so that the slope varies discontinuously in position on a first coordinate vertical to a horizontal direction, along which the light is propagating. Whereas the slope position on the coordinate vertical to the direction, along which the light is propagating, is discontinuously varied, the slope providing the continuous and gradual variation in thickness of the dielectric buffer layer is preferable to drop the driving voltage and widen the bandwidth concurrently.

It is also preferable that at least the above part of the dielectric buffer layer varies in thickness continuously and gradually in two dimensional directions to form a sloped portion and a thick portion so that a boundary between the sloped portion and the thick portion varies discontinuously in position on a first coordinate in parallel to a first horizontal direction, along which the light is propagating. Whereas the boundary position on the coordinate vertical to the direction, along which the light is propagating, is discontinuously varied, the sloped portion and the thick portion providing the continuous and gradual variation in thickness of the dielectric buffer layer is preferable to drop the driving voltage and widen the bandwidth concurrently.

It is also possible that at least the above part of the dielectric buffer layer varies in thickness in one dimensional direction vertical to a direction, along which the light is propagating so that variation in thickness of the dielectric buffer layer appears continuously and gradually.

It is also possible that at least the above part of the dielectric buffer layer varies in thickness in one dimensional direction vertical to a direction, along which the light is propagating so that variation in thickness of the dielectric buffer layer appears discontinuously to form a thin portion and a thick portion, both of which are bounded by a step whereby the step remains in position on a first coordinate vertical to the direction, along which the light is propagating.

It is also possible that at least the above part of the dielectric buffer layer varies in thickness in one dimensional direction vertical to a direction, along which the light is propagating, so that variation in thickness of the dielectric buffer layer appears continuously to form a thin portion and a thick portion, both of which are bounded by a slope whereby the slope remains in position on a first coordinate vertical to the direction, along which the light is propagating.

It is also possible that at least the above part of the dielectric buffer layer varies in thickness in one dimensional direction vertical to a direction, along which the light is propagating, so that variation in thickness of the dielectric buffer layer appears discontinuously to form a sloped portion and a thick portion whereby a boundary between the sloped portion and the thick portion remains in position on a first coordinate vertical to the direction, along which the light is propagating.

It is also possible that at least the above part of the dielectric buffer layer varies in thickness symmetrically both in vertical and parallel to a direction, along which the light is propagating.

It is also possible that at least the above part of the dielectric buffer layer varies in thickness symmetrically in two-dimensional directions.

It is also possible that at least the above part of the dielectric buffer layer varies in thickness symmetrically in a first direction parallel to a direction, along which the light is propagating, and asymmetrically in a second direction vertical to the first direction.

It is also possible that at least the above part of the dielectric buffer layer varies in thickness asymmetrically in a first direction parallel to a direction, along which the light is propagating, and symmetrically in a second direction vertical to the first direction.

It is also possible that at least the above part of the dielectric buffer layer varies in thickness asymmetrically in two-dimensional directions.

It is also preferable that the dielectric buffer layer is made of a dielectric material having a dielectric constant in the range of 1.1 to 40.

It is also preferable to further provide first and second optical connectors coupled to opposite ends of the optical waveguide.

As a result of the variation in thickness of the dielectric buffer layer in accordance with the above present invention, the driving voltage to be applied to the signal electrode is considerably reduced to approximately 2.8 V and the characteristic impedance is kept in the range of 46–48Ω.

The above possible profiles of variation in thickness of the dielectric buffer layer were confirmed by the inventor in the following embodiments.

PREFERRED EMBODIMENTS

First Embodiment

Figure 11A:
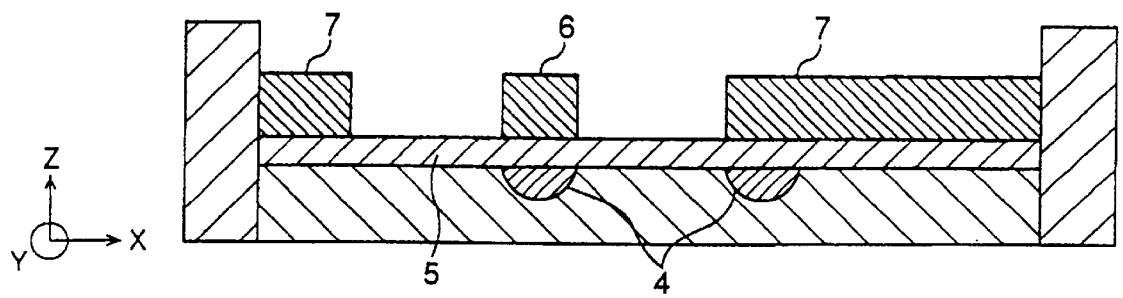
FIG. 11A is a cross sectional elevation view illustrative of a novel Mach-Zehnder optical modulator taken along XIA—XIA in FIG. 10 in a first embodiment in accordance with the present invention.
Figure 11B:
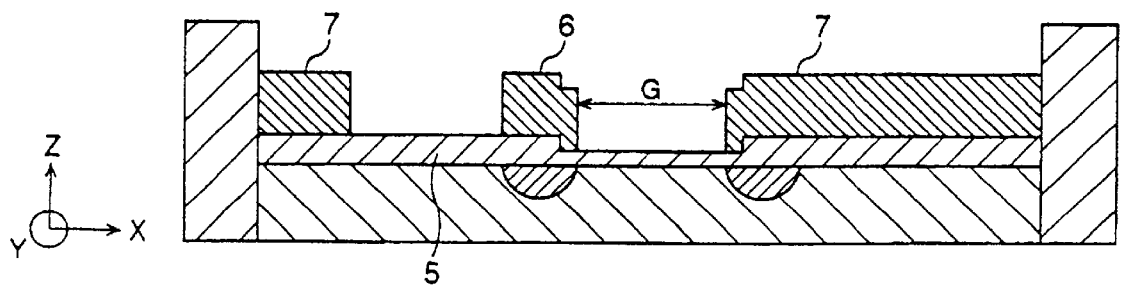
FIG. 11B is a cross sectional elevation view illustrative of a novel Mach-Zehnder optical modulator taken along XIB—XIB in FIG. 10 in a first embodiment in accordance with the present invention.
Figure 11C:
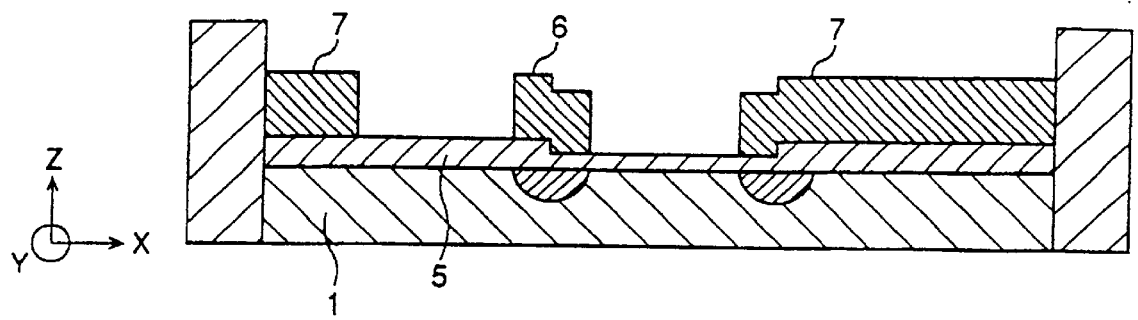
FIG. 11C is a cross sectional elevation view illustrative of a novel Mach-Zehnder optical modulator taken along XIC—XIC in FIG. 10 in a first embodiment in accordance with the present invention.
Figure 12:
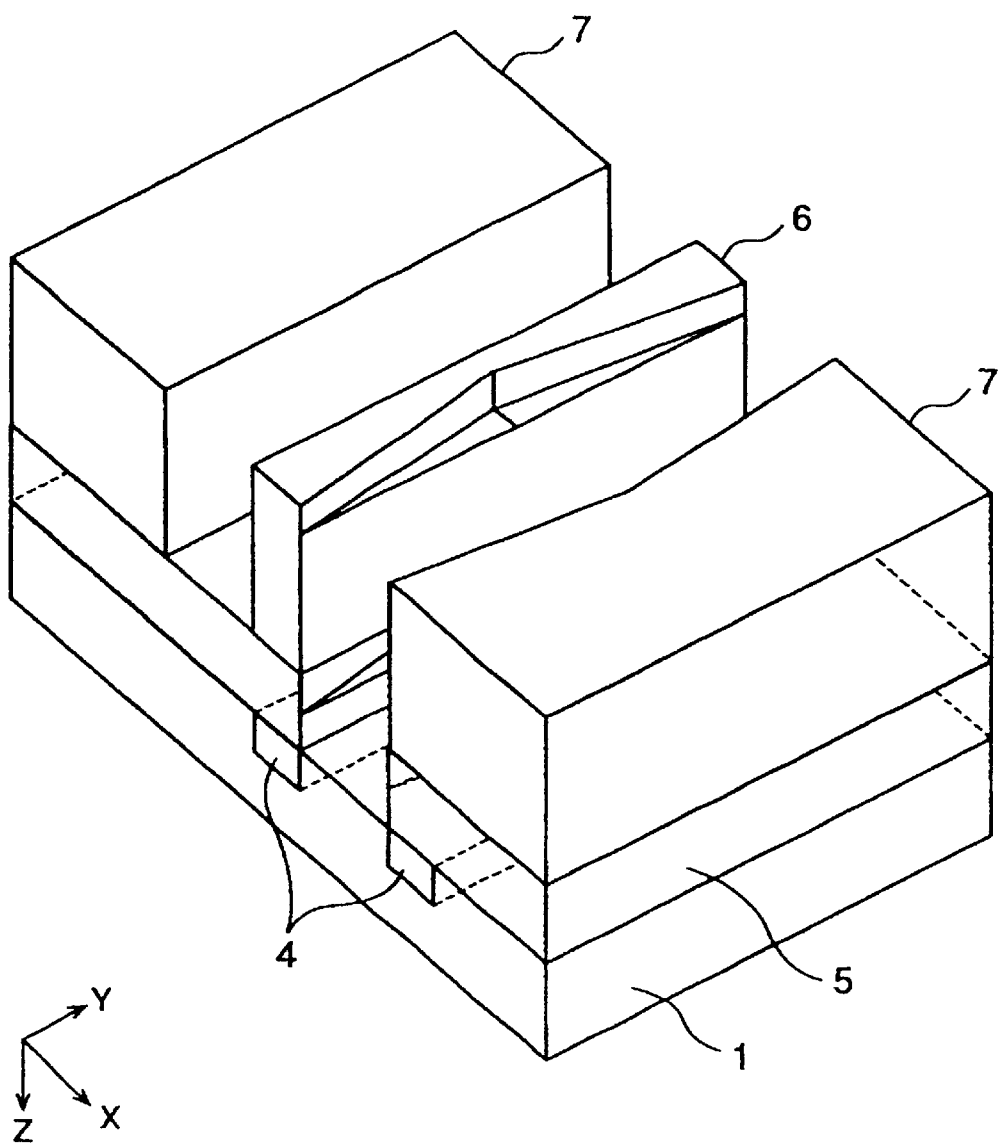
FIG. 12 is a schematic perspective view illustrative of the first novel Mach-Zehnder optical modulator of FIG. 10.
Figure 13:
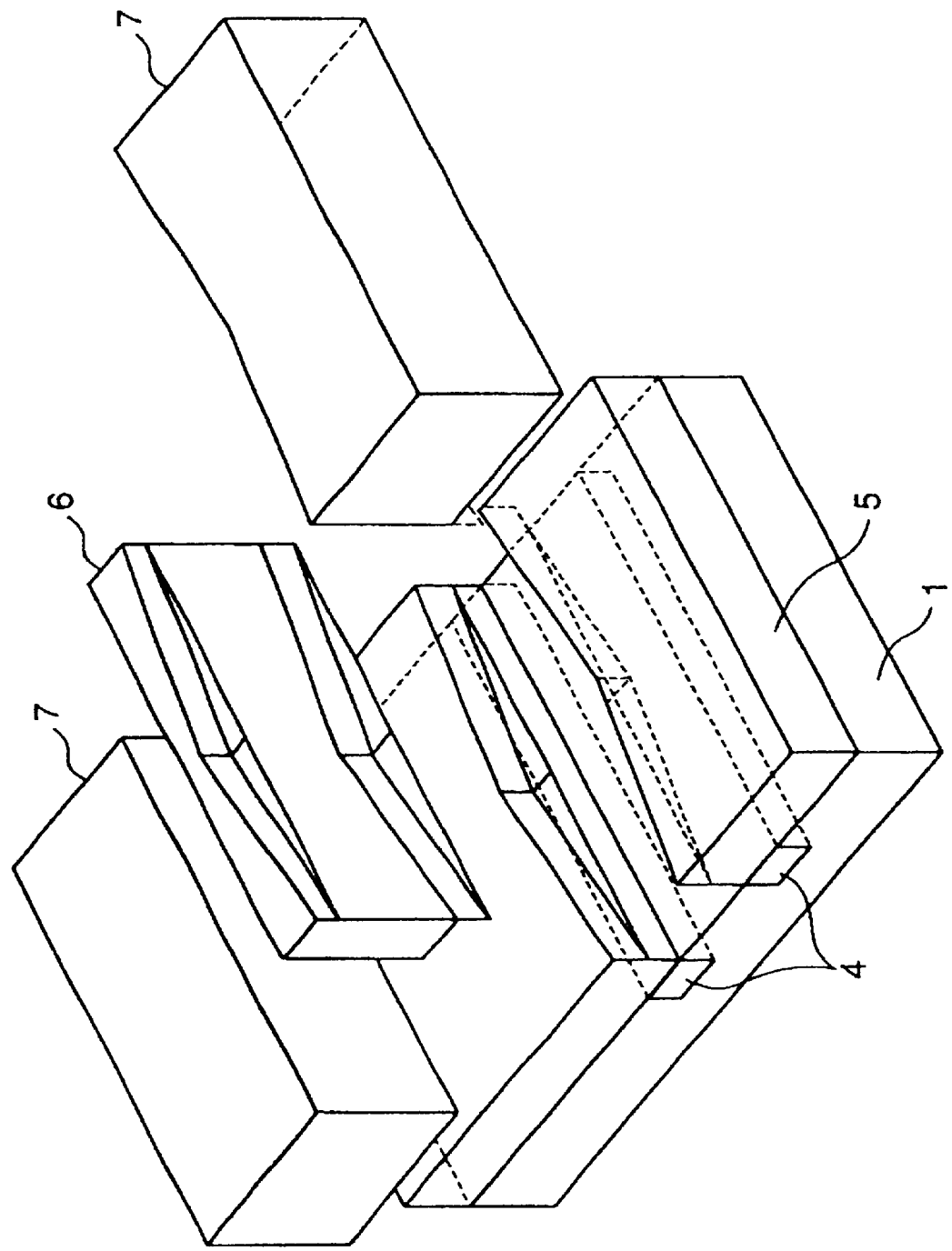
FIG. 13 is a schematic perspective view illustrative of the first novel Mach-Zehnder optical modulator of FIG. 10, wherein electrodes are displaced to illustrate well the variation in thickness of the dielectric buffer layer.

A first embodiment according to the present invention will be described in detail with reference to FIGS. 10, 11A, 11B, 11C, 12 and 13. FIG. 10 is a plane view illustrative of a novel Mach-Zehnder optical modulator including an improved dielectric buffer layer which varies in thickness. FIG. 11A is a cross sectional elevation view illustrative of a novel Mach-Zehnder optical modulator taken along line XIA—XIA in FIG. 10. FIG. 11B is a cross sectional elevation view illustrative of a novel Mach-Zehnder optical modulator taken along line XIB—XIB in FIG. 10. FIG. 11C is a cross sectional elevation view illustrative of a novel Mach-Zehnder optical modulator taken along line XIC—XIC in FIG. 10. FIG. 12 is a schematic perspective view illustrative of the first novel Mach-Zehnder optical modulator of FIG. 10. FIG. 13 is a schematic perspective view illustrative of the first novel Mach-Zehnder optical modulator of FIG. 10, wherein electrodes are displaced to illustrate well the variation in thickness of the dielectric buffer layer.

A crystal substrate 1, for example, a $LiNbO_3$ substrate was prepared which is capable of causing electro-optical effects. A titanium film strip was formed on a top surface of the crystal substrate 1, wherein the titanium film strip comprises too straight arms and two Y-shaped portions coupled to opposite sides of the two straight arms. The titanium film strip has a width of 5–20 micrometers and a thickness of 500–1200 angstroms. The crystal substrate 1 was then subjected to a beat treatment at a temperature in the range of 900° C. to 1000° C. for 5–12 hours to cause a diffusion of titanium in the titanium film strip into an upper region of the crystal substrate 1 to form a titanium-diffused optical waveguide in the upper region of the crystal substrate 1. The titanium-diffused optical waveguide comprises a Y-shaped optical divider portion 2, two straight arm optical modulator portions 4 coupled to the Y-shaped optical divider portion 2, and a Y-shaped optical coupler portion 3 coupled to the two straight arm optical modulator portions 4. Optical fiber mounts 9 are provided at opposite end portions of the titanium-diffused optical waveguide so that the Y-shaped optical divider portion 2 and the Y-shaped optical coupler portion 3 are coupled via the optical fiber mounts 9 to optical fibers. The top surface of the titanium-diffused optical waveguide has the same level as the top surface of the crystal substrate 1 to form a flat surface. A dielectric buffer layer 5, for example, $SiO_2$ buffer layer is provided entirely on the flat surface so that the dielectric buffer layer 5 extends over the optical waveguide and the crystal substrate 1. The dielectric buffer layer 5 varies in thickness in the range of 1–10 micrometers. The dielectric buffer layer 5 has a dielectric constant in the range of 1.1–40.

The dielectric buffer layer 5 is discontinuously reduced in thickness to form a thin portion and a thick portion, both of which are bounded by a step. A thickness of the thin portion is a half of a thickness of the thick portion. The thin portion is selectively provided in inner half regions of the two straight arm optical modulator portions 4 of the titanium-diffused optical waveguide and extends over the top surface of the crystal substrate 1 between the two straight arm optical modulator portions 4. The position of the step on an X-coordinate is linearly and proportionally varied in a Y-direction. Here, a width of the thin portion of the dielectric buffer layer 5 is defined as a horizontal size of the thin portion on the X-coordinate or in the X-direction. The width of the thin portion of the dielectric buffer layer 5 is thus linearly and proportionally varied in the Y-direction.

With reference to FIGS. 10 and 11A, on the Y-coordinate at a position just inside line XIA—XIA including a boundary between the two straight arm optical modulator portions 4 and the Y-shaped optical divider portion 2, the width of the thin portion of the dielectric buffer layer 5 corresponds to a distance between the two straight arm optical modulator portions 4. The steps between the thin portion and the thick portion are positioned at the inside edges of the two straight arm optical modulator portions 4.

With reference to FIGS. 10 and 11C, on line XIC—XIC including center positions on the Y-coordinate of the straight arm optical modulator portions 4, the width of the thin portion of the dielectric buffer layer 5 corresponds to the sum of a width of each the straight arm optical modulator portion 4 and the above distance between the two straight arm optical modulator portions 4. The steps between the thin portion and the thick portion are positioned at center positions on the X-coordinate of the two straight arm optical modulator portions 4.

With reference to FIGS. 10 and 11B, on line XIB—XIB extending in parallel to line XIA—XIA and XIC—XIC line and positioned on the Y-coordinate at a center between line XIA—XIA and line XIC—XIC, the width of the thin portion of the dielectric buffer layer 5 corresponds to the sum of a half width of each the straight arm optical modulator portion 4 and the above distance between the two straight arm optical modulator portions 4. On the X-coordinate, the steps between the thin portion and the thick portion are positioned outside from the inside edges of the two straight arm optical modulator portions 4 by a quarter of the width of each the straight arm optical modulator portion 4.

As the position on the Y-coordinate moves from line XIA—XIA to line XIC—XIC, the width of the thin portion of the dielectric buffer layer 5 is linearly and proportionally increased as well illustrated in FIGS. 10 and 13. Further, as the position on the Y-coordinate moves from line XIC—XIC to the boundary between the two straight arm optical modulator portions 4 and the Y-shaped optical coupler portion 3, the width of the thin portion of the dielectric buffer layer 5 is linearly and proportionally decreased to the same value as at line XIA—XIA as well illustrated in FIGS. 10 and 13.

The shapes in the plane view of the thin portion and the thick portion of the dielectric buffer layer 5 are symmetrical both in the X-direction and the Y-direction. Namely, a profile of variation in the thickness of the dielectric buffer layer 5 are symmetrical both in the X-direction and the Y-direction.

In this embodiment, a coplanar waveguide type electrode structure is selectively provided on the dielectric buffer layer 5, although other electrodes structures may be provided such as asymmetric coplanar strip type electrode structure and asymmetric strip line type electrode structure. The coplanar waveguide type electrode structure comprises a signal electrode 6 and two ground electrodes 7.

Here, a first one of the two straight arm optical modulator portions 4 is defined as having a larger value on the X-coordinate, while a second one of the two straight arm optical modulator portions 4 is defined as having a smaller value on the X-coordinate.

The signal electrode 6 extends in the Y-direction and over the dielectric buffer layer 5 over the first one of the two straight arm optical modulator portions 4 so that the signal electrode 6 entirely covers in the plane view the first one of the two straight arm optical modulator portions 4. The signal electrode 6 further extends in the X-direction toward the lower position on the X-coordinate and over the Y-shaped optical divider portion 2 and the Y-shaped optical coupler portion 3 so that the signal electrode 6 is coupled with connector packages 8 at the lower position on the X-coordinate than the position of the second one of the two straight arm optical modulator portions 4. The signal electrode 6 has a width in the range of 5–20 micrometers and a length in the range of 10–70 millimeters as well as a thickness of 3–40 micrometers. Since the signal electrode 6 extends over the dielectric buffer layer 5 varying in the thickness, the signal electrode 6 also has a step. Since, however, the thickness of the signal electrode 6 is much greater than the thickness of the dielectric buffer layer 5, for which reason the step of the signal electrode 6 provides substantially no effect to the electric field applied by the signal electrode 6.

A first one of the two ground electrodes 7 extends over the dielectric buffer layer 5 over the second one of the two straight arm optical modulator portions 4 so that the first one of the two ground electrodes 7 entirely covers in the plane view the second one of the two straight arm optical modulator portions 4. The first one of the two ground electrodes 7 further extends over the dielectric buffer layer 5 over the crystal substrate 1 on lower regions on the X-coordinate than and outside the second one of the two straight arm optical modulator portions 4. The first one of the two ground electrodes 7 is separated in the plane view from the signal electrode 6 at a distance or gap in the range of 5–200 micrometers.

A second one of the two ground electrodes 7 extends over the dielectric buffer layer 5 so that the second one of the two ground electrodes 7 is positioned outside the signal electrode 6 but separated in the plane view from the signal electrode 6 at a distance or gap in the range of 5–200 micrometers. The distance of the two ground electrodes 7 from the signal electrode 6 is determined so that a ratio of the width of the signal electrode 6 to the distance is in the range of 1–0.1, wherein the width of the signal electrode 6 is in the range of 5–20 micrometers as described above.

The ground electrode 7 has a width in the range of 100–9000 micrometers, a length in the range of 10–70 millimeters and a thickness in the range of 3–40 micrometers.

A microwave is applied through the connector package 8 to the signal electrode 6.

For the above Mach-Zehnder optical modulator, it was confirmed that the effect by a thinner portion of the dielectric buffer layer 5 for increasing the overlap integral of the electric field profile and the optical mode field profile exceeds the effect by a thinner portion of the dielectric buffer layer 5 for reducing the overlap integral. Namely, the effect by the thinner portion of the dielectric buffer layer 5 for reducing the driving voltage exceeds the effect by the thinner portion thereof for increasing the driving voltage. In order to drop the driving voltage, it is more effective to very the thickness of the dielectric buffer layer than keeping the dielectric buffer layer at an averaged thickness which is calculated by averaging those varied thicknesses of the dielectric buffer layer.

It was also confirmed that the effect by the thicker portion of the dielectric buffer layer 5 for reducing the difference of the effective microwave refractive index from the optical wave refractive index exceeds the opposite effect by the thinner portion of the dielectric buffer layer for increasing the difference of the effective microwave refractive index from the optical wave refractive index. Namely, the effect by the thicker portion of the dielectric buffer layer 5 for widening the bandwidth exceeds the opposite effect by the thinner portion of the dielectric buffer layer 5 for narrowing the bandwidth. In order to widen the bandwidth, it is more effective to very the thickness of the dielectric buffer layer than keeping the dielectric buffer layer at an averaged thickness which is calculated by averaging those varied thicknesses of the dielectric buffer layer.

Consequently, in order to drop the driving voltage and widen the bandwidth concurrently, it is more effective to very the thickness of the dielectric buffer layer than keeping the dielectric buffer layer at the averaged thickness which is calculated by averaging those varied thicknesses of the dielectric buffer layer. For above Mach-Zehnder optical modulator, both the above requirements for obtaining considerable reduction in the driving voltage and keeping much wider bandwidth could be satisfied.

Figure 14:
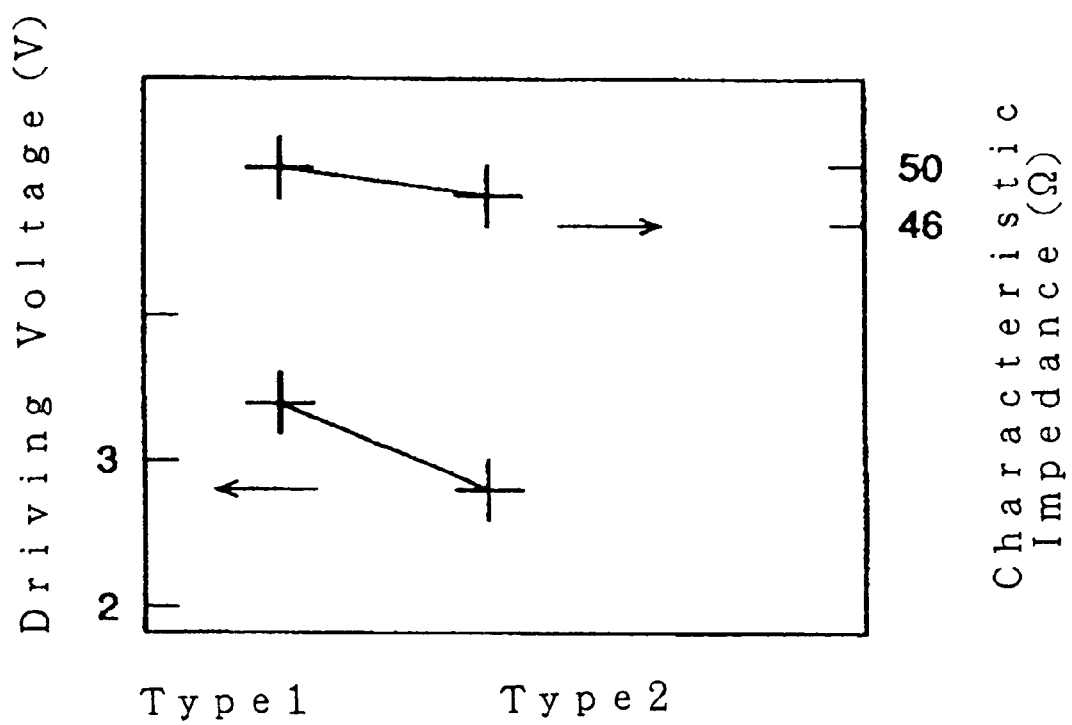
FIG. 14 is a diagram of driving voltage and characteristic impedance of a novel Mach-Zehnder optical modulator in accordance with the present invention as compared to the conventional Mach-Zehnder optical modulator.

FIG. 14 is a diagram of driving voltage and characteristic impedance of a novel Mach-Zehnder optical modulator in accordance with the present invention as compared to the conventional Mach-Zehnder optical modulator. "Type 2" represents the novel Mach-Zehnder optical modulator having the dielectric buffer layer 5 varying in thickness while "Type 1" represents the conventional Mach-Zehnder optical modulator having the dielectric buffer layer 5 remaining unchanged in thickness. The driving voltage of the novel Mach-Zehnder optical modulator is about 2.8 V which is much lower than the driving voltage of 3.4 V of the conventional Mach-Zehnder optical modulator. Namely, the driving voltage of the novel Mach-Zehnder optical modulator is reduced by 18% from that of the conventional one. The characteristic impedance of the novel Mach-Zehnder optical modulator can be kept in the range of 46–48Ω which is lower by only 2–4Ω or about 4–8% than 50Ω of the conventional Mach-Zehnder optical modulator.

The subject matter of the present invention in the above described embodiment can be applicable to the other optical devices such as other optical modulator or optical switches utilizing the phase shift phenomenon.

The above dielectric buffer layer 5 can be prepared by optional use of selective wet and dry etching processes in combination with masking work.

Second Embodiment

Figure 16A:
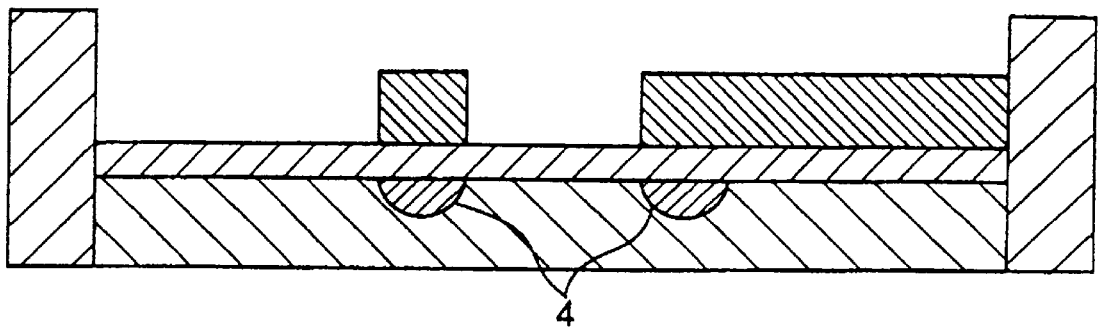
FIG. 16A is a cross sectional elevation view illustrative of a novel Mach-Zehnder optical modulator taken along XVIA—XVIA in FIG. 15 in a second embodiment in accordance with the present invention.
Figure 16B:
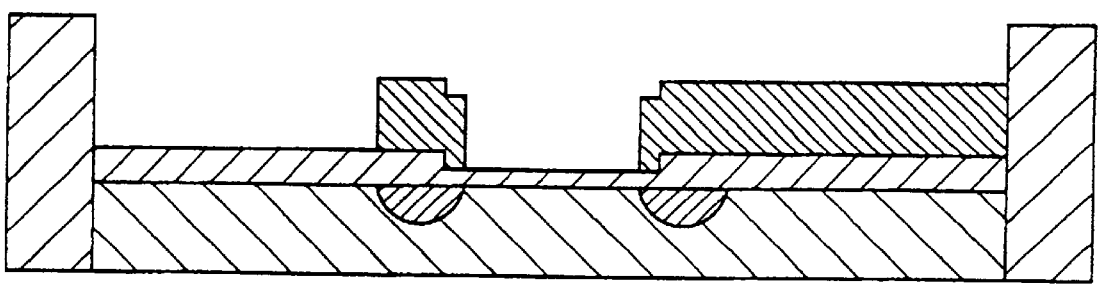
FIG. 16B is a cross sectional elevation view illustrative of a novel Mach-Zehnder optical modulator taken along XVIB—XVIB in FIG. 15 in a second embodiment in accordance with the present invention.
Figure 16C:
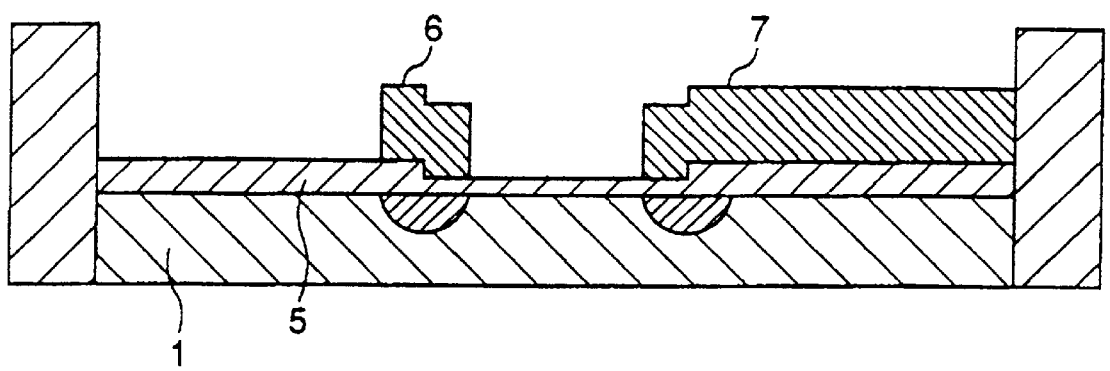
FIG. 16C is a cross sectional elevation view illustrative of a novel Mach-Zehnder optical modulator taken along XVIC—XVIC in FIG. 15 in a second embodiment in accordance with the present invention.

A second embodiment according to the present invention will be described in detail with reference to FIGS. 15, 16A, 16B and 16C. FIG. 15 is a plane view illustrative of a novel Mach-Zehnder optical modulator including an improved dielectric buffer layer which varies in thickness. FIG. 16A is a cross sectional elevation view illustrative of a novel Mach-Zehnder optical modulator taken along line XVIA—XVIA in FIG. 15. FIG. 16B is a cross sectional elevation view illustrative of a novel Mach-Zehnder optical modulator taken along line XVIB—XVIB in FIG. 15. FIG. 16C is a cross sectional elevation view illustrative of a novel Mach-Zehnder optical modulator taken along line XVIC—XVIC in FIG. 15.

A crystal substrate 1, for example, a $LiNbO_3$ substrate was prepared which is capable of causing electro-optical effects. A titanium film strip was formed on a top surface of the crystal substrate 1, wherein the titanium film strip comprises two straight arms and two Y-shaped portions coupled to opposite sides of the two straight arms. The titanium film strip has a width of 5–20 micrometers and a thickness of 500–1200 angstroms. The crystal substrate 1 was then subjected to a heat treatment at a temperature in the range of 900° C., to 1000° C. for 5–12 hours to cause a diffusion of titanium in the titanium film strip into an upper region of the crystal substrate 1 to form a titanium-diffused optical waveguide in the upper region of the crystal substrate 1. The titanium-diffused optical waveguide comprises a Y-shaped optical divider portion 2, two straight arm optical modulator portions 4 coupled to the Y-shaped optical divider portion 2, and a Y-shaped optical coupler portion 3 coupled to the two straight arm optical modulator portions 4. Optical fiber mounts 9 are provided at opposite end portions of the titanium-diffused optical waveguide so that the Y-shaped optical divider portion 2 and the Y-shaped optical coupler portion 3 are coupled via the optical fiber mounts 9 to optical fibers. The top surface of the titanium-diffused optical waveguide has the same level as the top surface of the crystal substrate 1 to form a flat surface. A dielectric buffer layer 5, for example, $SiO_2$ buffer layer is provided entirely on the flat surface so that the dielectric buffer layer 5 extends over the optical waveguide, and the crystal substrate 1. The dielectric buffer layer 5 varies in thickness in the range of 1–10 micrometers. The dielectric buffer layer 5 has a dielectric constant in the range of 1.1–40.

The dielectric buffer layer 5 is discontinuously reduced in thickness to form a thin portion and a thick portion, both of which are bounded by a step. A thickness of the thin portion is a half of a thickness of the thick portion. The thin portion is selectively provided in inner half regions of the two straight arm optical modulator portions 4 of the titanium-diffused optical waveguide and extends over the top surface of the crystal substrate 1 between the two straight arm optical modulator portions 4. The position of the step on an X-coordinate is linearly and proportionally varied in a Y-direction. Here, a width of the thin portion of the dielectric buffer layer 5 is defined as a horizontal size of the thin portion on the X-coordinate or in the X-direction. The width of the thin portion of the dielectric buffer layer 5 is thus linearly and proportionally varied in the Y-direction.

With reference to FIGS. 15 and 16A, on the Y-coordinate at a position just inside line XVIA—XVIA including a boundary between the two straight arm optical modulator portions 4 and the Y-shaped optical divider portion 2, the width of the thin portion of the dielectric buffer layer 5 corresponds to a distance between the two straight arm optical modulator portions 4. The steps between the thin portion and the thick portion are positioned at the inside edges of the two straight arm optical modulator portions 4.

With reference to FIGS. 15 and 16C, on line XVIC—XVIC including center positions on the Y-coordinate of the straight arm optical modulator portions 4, the width of the thin portion of the dielectric buffer layer 5 corresponds to the sum of a width of each the straight arm optical modulator portion 4 and the above distance between the two straight arm optical modulator portions 4. The steps between the thin portion and the thick portion are positioned at center positions on the X-coordinate of the two straight arm optical modulator portions 4.

With reference to FIGS. 15 and 16B, on line XVIB—XVIB extending in parallel to line XVIA—XVIA and line XVIC—XVIC and positioned on the Y-coordinate at a center between line XVIA—XVIA and line XVIC—XVIC, the width of the thin portion of the dielectric buffer layer 5 corresponds to the sum of a half width of each the straight arm optical modulator portion 4 and the above distance between the two straight arm optical modulator portions 4. On the X-coordinate, the steps between the thin portion and the thick portion are positioned outside from the inside edges of the two straight arm optical modulator portions 4 by a quarter of the width of each the straight arm optical modulator portion 4.

As the position on the Y-coordinate moves from line XVIA—XVIA to line XVIC—XVIC, the width of the thin portion of the dielectric buffer layer 5 is linearly and proportionally increased as well illustrated in FIG. 15. Further, as the position on the Y-coordinate moves from line XVIC—XVIC to the boundary between the two straight arm optical modulator portions 4 and the Y-shaped optical coupler portion 3, the width of the thin portion of the dielectric buffer layer 5 is linearly and proportionally decreased to the same value as at line XVIA—XVIA as well illustrated in FIG. 15.

The shapes in the plane view of the thin portion and the thick portion of the dielectric buffer layer 5 are symmetrical both in the X-direction and the Y-direction. Namely, a profile of variation in the thickness of the dielectric buffer layer 5 are symmetrical both in the X-direction and the Y-direction.

In this embodiment, either an asymmetric coplanar strip type electrode structure or an asymmetric strip line type electrode structure is selectively provided on the dielectric buffer layer 5. This electrode structure comprises a signal electrode 6 and a ground electrode 7.

The signal electrode 6 extends in the Y-direction and over the dielectric buffer layer 5 over the first one of the two straight arm optical modulator portions 4 so that the signal electrode 6 entirely covers in the plane view the first one of the two straight arm optical modulator portions 4. The signal electrode 6 further extends in the X-direction toward the lower position on the X-coordinate and over the Y-shaped optical divider portion 2 and the Y-shaped optical coupler portion 3 so that the signal electrode 6 is coupled with connector packages 8 at the lower position on the X-coordinate than the position of the second one of the two straight arm optical modulator portions 4. The signal electrode 6 has a width in the range of 5–20 micrometers and a length in the range of 10–70 millimeters as well as a thickness of 3–40 micrometers. Since the signal electrode 6 extends over the dielectric buffer layer 5 varying in the thickness, the signal electrode 6 also has a step. Since, however, the thickness of the signal electrode 6 is much greater than the thickness of the dielectric buffer layer 5, for which reason the step of the signal electrode 6 provides substantially no effect to the electric field applied by the signal electrode 6.

The ground electrode 7 extends over the dielectric buffer layer 5 over the second one of the two straight arm optical modulator portions 4 so that the ground electrode 7 entirely covers in the plane view the second one of the two straight arm optical modulator portions 4. The ground electrode 7 further extends over the dielectric buffer layer 5 over the crystal substrate 1 on lower regions on the X-coordinate than and outside the second one of the two straight arm optical modulator portions 4. The ground electrode 7 is separated in the plane view from the signal electrode 6 at a distance or gap in the range of 5–200 micrometers.

The ground electrode 7 has a width in the range of 100–9000 micrometers, a length in the range of 10–70 millimeters and a thickness in the range of 3–40 micrometers.

A microwave is applied through the connector package 8 to the signal electrode 6.

For the above Mach-Zehnder optical modulator, it was confirmed that the effect by a thinner portion of the dielectric buffer layer 5 for increasing the overlap integral of the electric field profile and the optical mode field profile exceeds the effect by a thinner portion of the dielectric buffer layer 5 for reducing the overlap integral. Namely, the effect by the thinner portion of the dielectric buffer layer 5 for reducing the driving voltage exceeds the effect by the thinner portion thereof for increasing the driving voltage. In order to drop the driving voltage, it is more effective to very the thickness of the dielectric buffer layer than keeping the dielectric buffer layer at an averaged thickness which is calculated by averaging those varied thicknesses of the dielectric buffer layer.

It was also confirmed that the effect by the thicker portion of the dielectric buffer layer 5 for reducing the difference of the effective microwave refractive index from the optical wave refractive index exceeds the opposite effect by the thinner portion of the dielectric buffer layer for increasing the difference of the effective microwave refractive index from the optical wave refractive index. Namely, the effect by the thicker portion of the dielectric buffer layer 5 for widening the bandwidth exceeds the opposite effect by the thinner portion of the dielectric buffer layer 5 for narrowing the bandwidth. In order to widen the bandwidth, it is more effective to very the thickness of the dielectric buffer layer than keeping the dielectric buffer layer at an averaged thickness which is calculated by averaging those varied thicknesses of the dielectric buffer layer.

Consequently, in order to drop the driving voltage and widen the bandwidth concurrently, it is more effective to very the thickness of the dielectric buffer layer than keeping the dielectric buffer layer at the averaged thickness which is calculated by averaging those varied thicknesses of the dielectric buffer layer. For above Mach-Zehnder optical modulator, both the above requirements for obtaining considerable reduction in the driving voltage and keeping much wider bandwidth could be satisfied.

FIG. 14 is a diagram of driving voltage and characteristic impedance of a novel Mach-Zehnder optical modulator in accordance with the present invention as compared to the conventional Mach-Zehnder optical modulator. "Type 2" represents the novel Mach-Zehnder optical modulator having the dielectric buffer layer 5 varying in thickness while "Type 1" represents the conventional Mach-Zehnder optical modulator having the dielectric buffer layer 5 remaining unchanged in thickness. The driving voltage of the novel Mach-Zehnder optical modulator is about 2.8 V which is much lower than the driving voltage of 3.4 V of the conventional Mach-Zehnder optical modulator. Namely, the driving voltage of the novel Mach-Zehnder optical modulator is reduced by 18% from that of the conventional one. The characteristic impedance of the novel Mach-Zehnder optical modulator can be kept in the range of 46–48Ω which is lower by only 2–4Ω or about 4–8% than 50Ω of the conventional Mach-Zehnder optical modulator.

The subject matter of the present invention in the above described embodiment can be applicable to the other optical devices such as other optical modulator or optical switches utilizing the phase shift phenomenon.

The above dielectric buffer layer 5 can be prepared by optional use of selective wet and dry etching processes in combination with masking work.

Third Embodiment

Figure 18A:
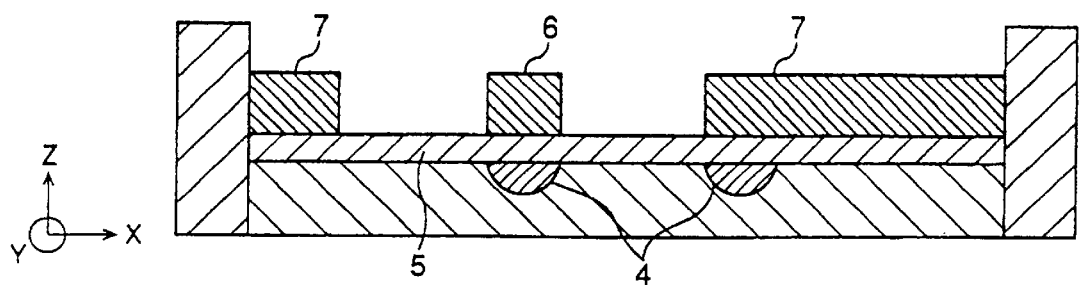
FIG. 18A is a cross sectional elevation view illustrative of a novel Mach-Zehnder optical modulator taken along XVIIIA—XVIIIA in FIG. 17 in a third embodiment in accordance with the present invention.
Figure 18B:
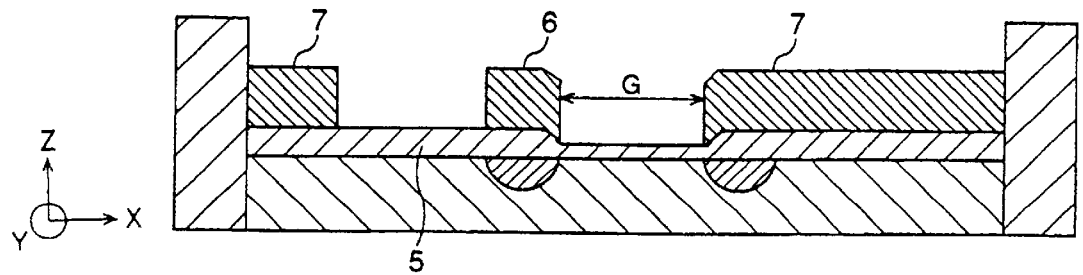
FIG. 18B is a cross sectional elevation view illustrative of a novel Mach-Zehnder optical modulator taken along XVIIIB—XVIIIB in FIG. 17 in a third embodiment in accordance with the present invention.
Figure 18C:
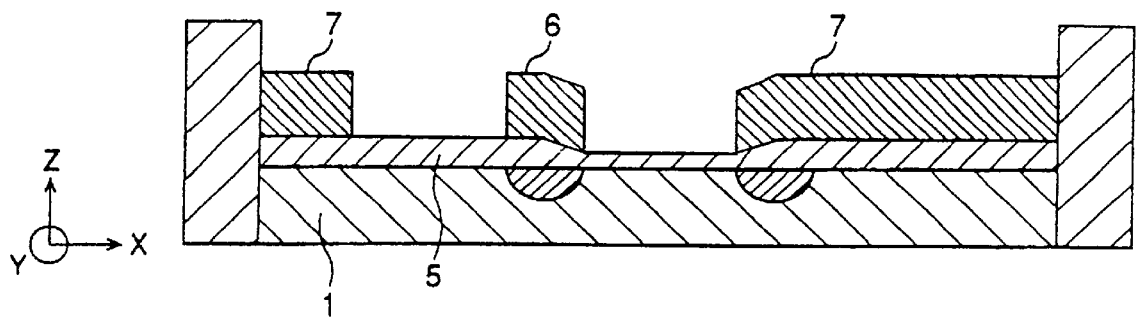
FIG. 18C is a cross sectional elevation view illustrative of a novel Mach-Zehnder optical modulator taken along XVIIIC—XVIIIC in FIG. 17 in a third embodiment in accordance with the present invention.

A third embodiment according to the present invention will be described in detail with reference to FIGS. 17, 18A, 18B and 18C. FIG. 17 is a plane view illustrative of a novel Mach-Zehnder optical modulator including an improved dielectric buffer layer which varies in thickness. FIG. 18A is a cross sectional elevation view illustrative of a novel Mach-Zehnder optical modulator taken along line XVIIIA—XVIIIA in FIG. 17. FIG. 18B is a cross sectional elevation view illustrative of a novel Mach-Zehnder optical modulator taken along line XVIIIB—XVIIIB in FIG. 17. FIG. 18C is a cross sectional elevation view illustrative of a novel Mach-Zehnder optical modulator taken along line XVIIC—XVIIC in FIG. 17.

A crystal substrate 1, for example, a $LiNbO_3$ substrate was prepared which is capable of causing electro-optical effects. A titanium film strip was formed on a top surface of the crystal substrate 1, wherein the titanium film strip comprises two straight arms and two Y-shaped portions coupled to opposite sides of the two straight arms. The titanium film strip has a width of 5–20 micrometers and a thickness of 500–1200 angstroms. The crystal substrate 1 was then subjected to a heat treatment at a temperature in the range of 900° C. to 1000° C. for 5–12 hours to cause a diffusion of titanium in the titanium film strip into an upper region of the crystal substrate 1 to form a titanium-diffused optical waveguide in the upper region of the crystal substrate 1. The titanium-diffused optical waveguide comprises a Y-shaped optical divider portion 2, two straight arm optical modulator portions 4 coupled to the Y-shaped optical divider portion 2, and a Y-shaped optical coupler portion 3 coupled to the two straight arm optical modulator portions 4. Optical fiber mounts 9 are provided at opposite end portions of the titanium-diffused optical waveguide so that the Y-shaped optical divider portion 2 and the Y-shaped optical coupler portion 3 are coupled via the optical fiber mounts 9 to optical fibers. The top surface of the titanium-diffused optical waveguide has the same level as the top surface of the crystal substrate 1 to form a flat surface. A dielectric buffer layer 5, for example, $SiO_2$ buffer layer is provided entirely on the flat surface so that the dielectric buffer layer 5 extends over the optical waveguide and the crystal substrate 1. The dielectric buffer layer 5 varies in thickness in the range of 1–10 micrometers. The dielectric buffer layer 5 has a dielectric constant in the range of 1.1–40.

The dielectric buffer layer 5 is continuously reduced in thickness to form a thin portion and a thick portion, both of which are bounded by a slope. A thickness of the thin portion is a half of a thickness of the thick portion. The thin portion is selectively provided in inner half regions of the two straight arm optical modulator portions 4 of the titanium-diffused optical waveguide and extends over the top surface of the crystal substrate 1 between the two straight arm optical modulator portions 4. The position of the slope on an X-coordinate is linearly and proportionally varied in a Y-direction. Here, a width of the thin portion of the dielectric buffer layer 5 is defined as a horizontal size of the thin portion on the X-coordinate or in the X-direction. The width of the thin portion of the dielectric buffer layer 5 is thus linearly and proportionally varied in the Y-direction.

With reference to FIGS. 17 and 18A, on the Y-coordinate at a position just inside an A-B line including a boundary between the two straight arm optical modulator portions 4 and the Y-shaped optical divider portion 2, the width of the thin portion of the dielectric buffer layer 5 corresponds to a distance between the two straight arm optical modulator portions 4. The boundaries between the thin portion and the slopes are positioned at the inside edges of the two straight arm optical modulator portions 4.

With reference to FIGS. 17 and 18C, on line XVIIIC—XVIIIC including center positions on the Y-coordinate of the straight arm optical modulator portions 4, the width of the thin portion of the dielectric buffer layer 5 corresponds to the sum of a width of each the straight arm optical modulator portion 4 and the above distance between the two straight arm optical modulator portions 4. The boundaries between the thin portion and the slopes are positioned at center positions on the X-coordinate of the two straight arm optical modulator portions 4.

With reference to FIGS. 17 and 18B, on line XVIIIB—XVIIIB extending in parallel to line XVIIIA—XVIIIA and line XVIIIC—XVIIIC and positioned on the Y-coordinate at a center between line XVIIIA—XVIIIA and line XVIIIC—XVIIIC, the width of the thin portion of the dielectric buffer layer 5 corresponds to the sum of a half width of each the straight arm optical modulator portion 4 and the above distance between the two straight arm optical modulator portions 4. On the X-coordinate, the boundaries between the thin portion and the slopes are positioned outside from the inside edges of the two straight arm optical modulator portions 4 by a quarter of the width of each the straight arm optical modulator portion 4.

As the position on the Y-coordinate moves from line XVIIIA—XVIIIA to line XVIIIC—XVIIIC, the width of the thin portion of the dielectric buffer layer 5 is linearly and proportionally increased as well illustrated in FIG. 17. Further, as the position on the Y-coordinate moves from line XVIIIC—XVIIIC to the boundary between the two straight arm optical modulator portions 4 and the Y-shaped optical coupler portion 3, the width of the thin portion of the dielectric buffer layer 5 is linearly and proportionally decreased to the same value as at line XVIIA—XVIIA as well illustrated in FIG. 17.

The shapes in the plane view of the thin portion and the thick portion of the dielectric buffer layer 5 are symmetrical both in the X-direction and the Y-direction. Namely, a profile of variation in the thickness of the dielectric buffer layer 5 are symmetrical both in the X-direction and the Y-direction.

In this embodiment, a coplanar waveguide type electrode structure is selectively provided on the dielectric buffer layer 5, although other electrodes structures may be provided such as asymmetric coplanar strip type electrode structure and asymmetric strip line type electrode structure. The coplanar waveguide type electrode structure comprises a signal electrode 6 and two ground electrodes 7.

Here, a first one of the two straight arm optical modulator portions 4 is defined as having a larger value on the X-coordinate, while a second one of the two straight arm optical modulator portions 4 is defined as having a smaller value on the X-coordinate.

The signal electrode 6 extends in the Y-direction and over the dielectric buffer layer 5 over the first one of the two straight arm optical modulator portions 4 so that the signal electrode 6 entirely covers in the plane view the first one of the two straight arm optical modulator portions 4. The signal electrode 6 further extends in the X-direction toward the lower position on the X-coordinate and over the Y-shaped optical divider portion 2 and the Y-shaped optical coupler portion 3 so that the signal electrode 6 is coupled with connector packages 8 at the lower position on the X-coordinate than the position of the second one of the two straight arm optical modulator portions 4. The signal electrode 6 has a width in the range of 5–20 micrometers and a length in the range of 10–70 millimeters as well as a thickness of 3–40 micrometers. Since the signal electrode 6 extends over the dielectric buffer layer 5 varying in the thickness, the signal electrode 6 also has a slope. Since, however, the thickness of the signal electrode 6 is much greater than the thickness of the dielectric buffer layer 5, for which reason the slope of the signal electrode 6 provides substantially no effect to the electric field applied by the signal electrode 6.

A first one of the two ground electrodes 7 extends over the dielectric buffer layer 5 over the second one of the two straight arm optical modulator portions 4 so that the first one of the two ground electrodes 7 entirely covers in the plane view the second one of the two straight arm optical modulator portions 4. The first one of the two ground electrodes 7 further extends over the dielectric buffer layer 5 over the crystal substrate 1 on lower regions on the X-coordinate than and outside the second one of the two straight arm optical modulator portions 4. The first one of the two ground electrodes 7 is separated in the plane view from the signal electrode 6 at a distance or gap in the range of 5–200 micrometers.

A second one of the two ground electrodes 7 extends over the dielectric buffer layer 5 so that the second one of the two ground electrodes 7 is positioned outside the signal electrode 6 but separated in the plane view from the signal electrode 6 at a distance or gap in the range of 5–200 micrometers. The distance of the two ground electrodes 7 from the signal electrode 6 is determined so that a ratio of the width of the signal electrode 6 to the distance is in the range of 1–0.1, wherein the width of the signal electrode 6 is in the range of 5–20 micrometers as described above.

The ground electrode 7 has a width in the range of 100–9000 micrometers, a length in the range of 10–70 millimeters and a thickness in the range of 3–40 micrometers.

A microwave is applied through the connector package 8 to the signal electrode 6.

For the above Mach-Zehnder optical modulator, it was confirmed that the effect by a thinner portion of the dielectric buffer layer 5 for increasing the overlap integral of the electric field profile and the optical mode field profile exceeds the effect by a thinner portion of the dielectric buffer layer 5 for reducing the overlap integral. Namely, the effect by the thinner portion of the dielectric buffer layer 5 for reducing the driving voltage exceeds the effect by the thinner portion thereof for increasing the driving voltage. In order to drop the driving voltage, it is more effective to very the thickness of the dielectric buffer layer than keeping the dielectric buffer layer at an averaged thickness which is calculated by averaging those varied thicknesses of the dielectric buffer layer.

It was also confirmed that the effect by the thicker portion of the dielectric buffer layer 5 for reducing the difference of the effective microwave refractive index from the optical wave refractive index exceeds the opposite effect by the thinner portion of the dielectric buffer layer for increasing the difference of the effective microwave refractive index from the optical wave refractive index. Namely, the effect by the thicker portion of the dielectric buffer layer 5 for widening the bandwidth exceeds the opposite effect by the thinner portion of the dielectric buffer layer 5 for narrowing the bandwidth. In order to widen the bandwidth, it is more effective to very the thickness of the dielectric buffer layer than keeping the dielectric buffer layer at an averaged thickness which is calculated by averaging those varied thicknesses of the dielectric buffer layer.

Consequently, in order to drop the driving voltage and widen the bandwidth concurrently, it is more effective to very the thickness of the dielectric buffer layer than keeping the dielectric buffer layer at the averaged thickness which is calculated by averaging those varied thicknesses of the dielectric buffer layer. For above Mach-Zehnder optical modulator, both the above requirements for obtaining considerable reduction in the driving voltage and keeping much wider bandwidth could be satisfied.

FIG. 14 is a diagram of driving voltage and characteristic impedance of a novel Mach-Zehnder optical modulator in accordance with the present invention as compared to the conventional Mach-Zehnder optical modulator. "Type 2" represents the novel Mach-Zehnder optical modulator having the dielectric buffer layer 5 varying in thickness while "Type 1" represents the conventional Mach-Zehnder optical modulator having the dielectric buffer layer 5 remaining unchanged in thickness. The driving voltage of the novel Mach-Zehnder optical modulator is about 2.8 V which is much lower than the driving voltage of 3.4 V of the conventional Mach-Zehnder optical modulator. Namely, the driving voltage of the novel Mach-Zehnder optical modulator is reduced by 18% from that of the conventional one. The characteristic impedance of the novel Mach-Zehnder optical modulator can be kept in the range of 46–48Ω which is lower by only 2–4Ω or about 4–8% than 50Ω of the conventional Mach-Zehnder optical modulator.

The subject matter of the present invention in the above described embodiment can be applicable to the other optical devices such as other optical modulator or optical switches utilizing the phase shift phenomenon.

The above dielectric buffer layer 5 can be prepared by optional use of selective wet and dry etching processes in combination with masking work.

Fourth Embodiment

Figure 20A:
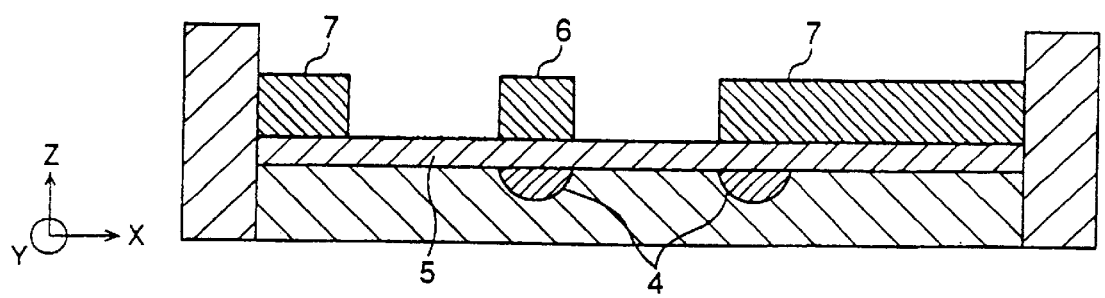
FIG. 20A is a cross sectional elevation view illustrative of a novel Mach-Zehnder optical modulator taken along XXA—XXA in FIG. 19 in a fourth embodiment in accordance with the present invention.
Figure 20B:
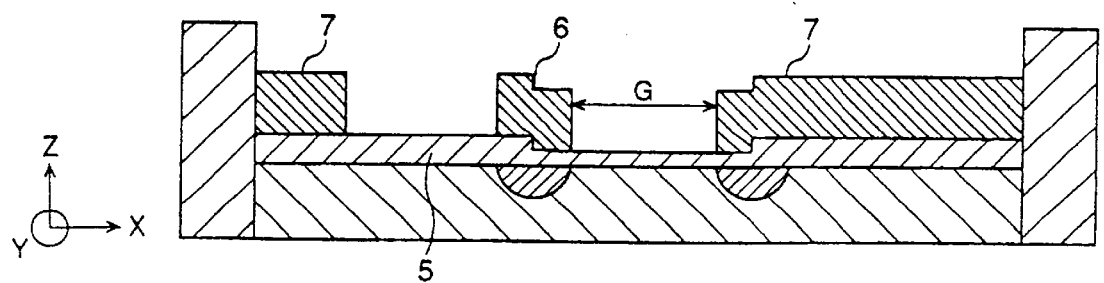
FIG. 20B is a cross sectional elevation view illustrative of a novel Mach-Zehnder optical modulator taken along XXB—XXB in FIG. 19 in a fourth embodiment in accordance with the present invention.
Figure 20C:
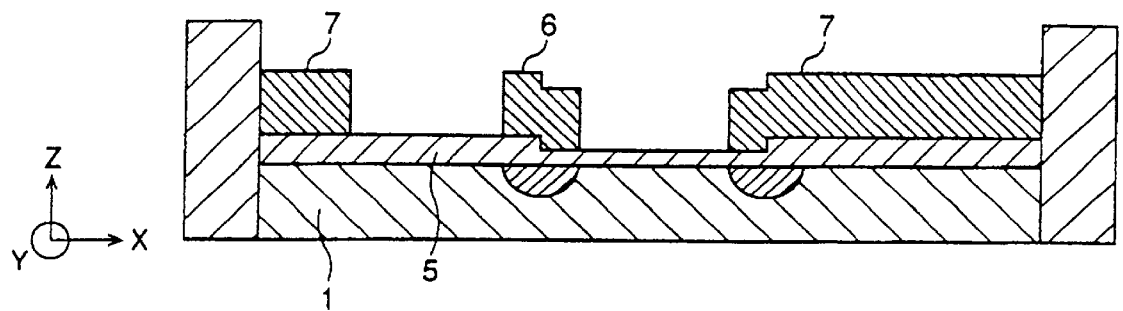
FIG. 20C is a cross sectional elevation view illustrative of a novel Mach-Zehnder optical modulator taken along XXC—XXC in FIG. 19 in a fourth embodiment in accordance with the present invention.

A fourth embodiment according to the present invention will be described in detail with reference to FIGS. 19, 20A, 20B and 20C. FIG. 19 is a plane view illustrative of a novel Mach-Zehnder optical modulator including an improved dielectric buffer layer which varies in thickness. FIG. 20A is a cross sectional elevation view illustrative of a novel Mach-Zehnder optical modulator taken along line XXA—XXA in FIG. 19. FIG. 20B is a cross sectional elevation view illustrative of a novel Mach-Zehnder optical modulator taken along line XXB—XXB in FIG. 19. FIG. 20C is a cross sectional elevation view illustrative of a novel Mach-Zehnder optical modulator taken along line XXC—XXC in FIG. 19.

A crystal substrate 1, for example, a $LiNbO_3$ substrate was prepared which is capable of causing electro-optical effects. A titanium film strip was formed on a top surface of the crystal substrate 1, wherein the titanium film strip comprises two straight arms and two Y-shaped portions coupled to opposite sides of the two straight arms. The titanium film strip has a width of 5–20 micrometers and a thickness of 500–1200 angstroms. The crystal substrate 1 was then subjected to a heat treatment at a temperature in the range of 900° C. to 1000° C. for 5–12 hours to cause a diffusion of titanium in the titanium film strip into an upper region of the crystal substrate 1 to form a titanium-diffused optical waveguide in the upper region of the crystal substrate 1. The titanium-diffused optical waveguide comprises a Y-shaped optical divider portion 2, two straight arm optical modulator portions 4 coupled to the Y-shaped optical divider portion 2, and a Y-shaped optical coupler portion 3 coupled to the two straight arm optical modulator portions 4. Optical fiber mounts 9 are provided at opposite end portions of the titanium-diffused optical waveguide so that the Y-shaped optical divider portion 2 and the Y-shaped optical coupler portion 3 are coupled via the optical fiber mounts 9 to optical fibers. The top surface of the titanium-diffused optical waveguide has the same level as the top surface of the crystal substrate 1 to form a flat surface. A dielectric buffer layer 5, for example, $SiO_2$ buffer layer is provided entirely on the flat surface so that the dielectric buffer layer 5 extends over the optical waveguide and the crystal substrate 1. The dielectric buffer layer 5 varies in thickness in the range of 1–10 micrometers. The dielectric buffer layer 5 has a dielectric constant in the range of 1.1–40.

The dielectric buffer layer 5 is discontinuously reduced in thickness to form a thin portion and a thick portion, both of which are bounded by a step. A thickness of the thin portion is a half of a thickness of the thick portion. The thin portion is selectively provided in inner half regions of the two straight arm optical modulator portions 4 of the titanium-diffused optical waveguide and extends over the top surface of the crystal substrate 1 between the two straight arm optical modulator portions 4. The position of the step on an X-coordinate remains unchanged in a Y-direction. Here, a width of the thin portion of the dielectric buffer layer 5 is defined as a horizontal size of the thin portion on the X-coordinate or in the X-direction. The width of the thin portion of the dielectric buffer layer 5 is thus remains unchanged in the Y-direction.

With reference to FIGS. 19 and 20A, on the Y-coordinate at an A-B line including a boundary between the two straight arm optical modulator portions 4 and the Y-shaped optical divider portion 2, the thin portion of the dielectric buffer layer 5 does not exist. No step is therefore formed.

With reference to FIGS. 19 and 20C, on line XXC—XXC including center positions on the Y-coordinate o)f the straight arm optical modulator portions 4, the width of the thin portion of the dielectric buffer layer 5 corresponds to the sum of a width of each the straight arm optical modulator portion 4 and the above distance between the two straight arm optical modulator portions 4. The steps between the thin portion and the thick portion are positioned at center positions on the X-coordinate of the two straight arm optical modulator portions 4.

With reference to FIGS. 19 and 20B, on line XXB—XXB extending in parallel to line XXA—XXA and line XXC—XXC and positioned on the Y-coordinate at a center between line XXA—XXA and line XXC—XXC, the width of the thin portion of the dielectric buffer layer 5 corresponds to the sum of a width of each the straight arm optical modulator portion 4 and the above distance between the two straight arm optical modulator portions 4. The steps between the thin portion and the thick portion are positioned at center positions on the X-coordinate of the two straight arm optical modulator portions 4.

The width of the thin portion of the dielectric buffer layer 5 remains unchanged as well illustrated in FIG. 19.

The shapes in the plane view of the thin portion and the thick portion of the dielectric buffer layer 5 are symmetrical both in the X-direction and the Y-direction. Namely, a profile of variation in the thickness of the dielectric buffer layer 5 are symmetrical both in the X-direction and the Y-direction.

In this embodiment, a coplanar waveguide type electrode structure is selectively provided on the dielectric buffer layer 5, although other electrodes structures may be provided such as asymmetric coplanar strip type electrode structure and asymmetric strip line type electrode structure. The coplanar waveguide type electrode structure comprises a signal electrode 6 and two ground electrodes 7.

Here, a first one of the two straight arm optical modulator portions 4 is defined as having a larger value on the X-coordinate, while a second one of the two straight arm optical modulator portions 4 is defined as having a smaller value on the X-coordinate.

The signal electrode 6 extends in the Y-direction and over the dielectric buffer layer 5 over the first one of the two straight arm optical modulator portions 4 so that the signal electrode 6 entirely covers in the plane view the first one of the two straight arm optical modulator portions 4. The signal electrode 6 further extends in the X-direction toward the lower position on the X-coordinate and over the Y-shaped optical divider portion 2 and the Y-shaped optical coupler portion 3 so that the signal electrode 6 is coupled with connector packages 8 at the lower position on the X-coordinate than the position of the second one of the two straight arm optical modulator portions 4. The signal electrode 6 has a width in the range of 5–20 micrometers and a length in the range of 10–70 millimeters as well as a thickness of 3–40 micrometers. Since the signal electrode 6 extends over the dielectric buffer layer 5 varying in the thickness, the signal electrode 6 also has a step. Since, however, the thickness of the signal electrode 6 is much greater than the thickness of the dielectric buffer layer 5, for which reason the step of the signal electrode 6 provides substantially no effect to the electric field applied by the signal electrode 6.

A first one of the two ground electrodes 7 extends over the dielectric buffer layer 5 over the second one of the two straight arm optical modulator portions 4 so that the first one of the two ground electrodes 7 entirely covers in the plane view the second one of the two straight arm optical modulator portions 4. The first one of the two ground electrodes 7 further extends over the dielectric buffer layer 5 over the crystal substrate 1 on lower regions on the X-coordinate than and outside the second one of the two straight arm optical modulator portions 4. The first one of the two ground electrodes 7 is separated in the plane view from the signal electrode 6 at a distance or gap in the range of 5–200 micrometers.

A second one of the two ground electrodes 7 extends over the dielectric buffer layer 5 so that the second one of the two ground electrodes 7 is positioned outside the signal electrode 6 but separated in the plane view from the signal electrode 6 at a distance or gap in the range of 5–200 micrometers. The distance of the two ground electrodes 7 from the signal electrode 6 is determined so that a ratio of the width of the signal electrode 6 to the distance is in the range of 1–0.1, wherein the width of the signal electrode 6 is in the range of 5–20 micrometers as described above.

The ground electrode 7 has a width in the range of 100–9000 micrometers, a length in the range of 10–70 millimeters and a thickness in the range of 3–40 micrometers.

A microwave is applied through the connector package 8 to the signal electrode 6.

For the above Mach-Zehnder optical modulator, it was confirmed that the effect by a thinner portion of the dielectric buffer layer 5 for increasing the overlap integral of the electric field profile and the optical mode field profile exceeds the effect by a thinner portion of the dielectric buffer layer 5 for reducing the overlap integral. Namely, the effect by the thinner portion of the dielectric buffer layer 5 for reducing the driving voltage exceeds the effect by the thinner portion thereof for increasing the driving voltage. In order to drop the driving voltage, it is more effective to very the thickness of the dielectric buffer layer than keeping the dielectric buffer layer at an averaged thickness which is calculated by averaging those varied thicknesses of the dielectric buffer layer.

It was also confirmed that the effect by the thicker portion of the dielectric buffer layer 5 for reducing the difference of the effective microwave refractive index from the optical wave refractive index exceeds the opposite effect by the thinner portion of the dielectric buffer layer for increasing the difference of the effective microwave refractive index from the optical wave refractive index. Namely, the effect by the thicker portion of the dielectric buffer layer 5 for widening the bandwidth exceeds the opposite effect by the thinner portion of the dielectric buffer layer 5 for narrowing the bandwidth. In order to widen the bandwidth, it is more effective to very the thickness of the dielectric buffer layer than keeping the dielectric buffer layer at an averaged thickness which is calculated by averaging those varied thicknesses of the dielectric buffer layer.

Consequently, in order to drop the driving voltage and widen the bandwidth concurrently, it is more effective to very the thickness of the dielectric buffer layer than keeping the dielectric buffer layer at the averaged thickness which is calculated by averaging those varied thicknesses of the dielectric buffer layer. For above Mach-Zehnder optical modulator, both the above requirements for obtaining considerable reduction in the driving voltage and keeping much wider bandwidth could be satisfied.

The subject matter of the present invention in the above described embodiment can be applicable to the other optical devices such as other optical modulator or optical switches utilizing the phase shift phenomenon.

The above dielectric buffer layer 5 can be prepared by optional use of selective wet and dry etching processes in combination with masking work.

Fifth Embodiment

Figure 21:
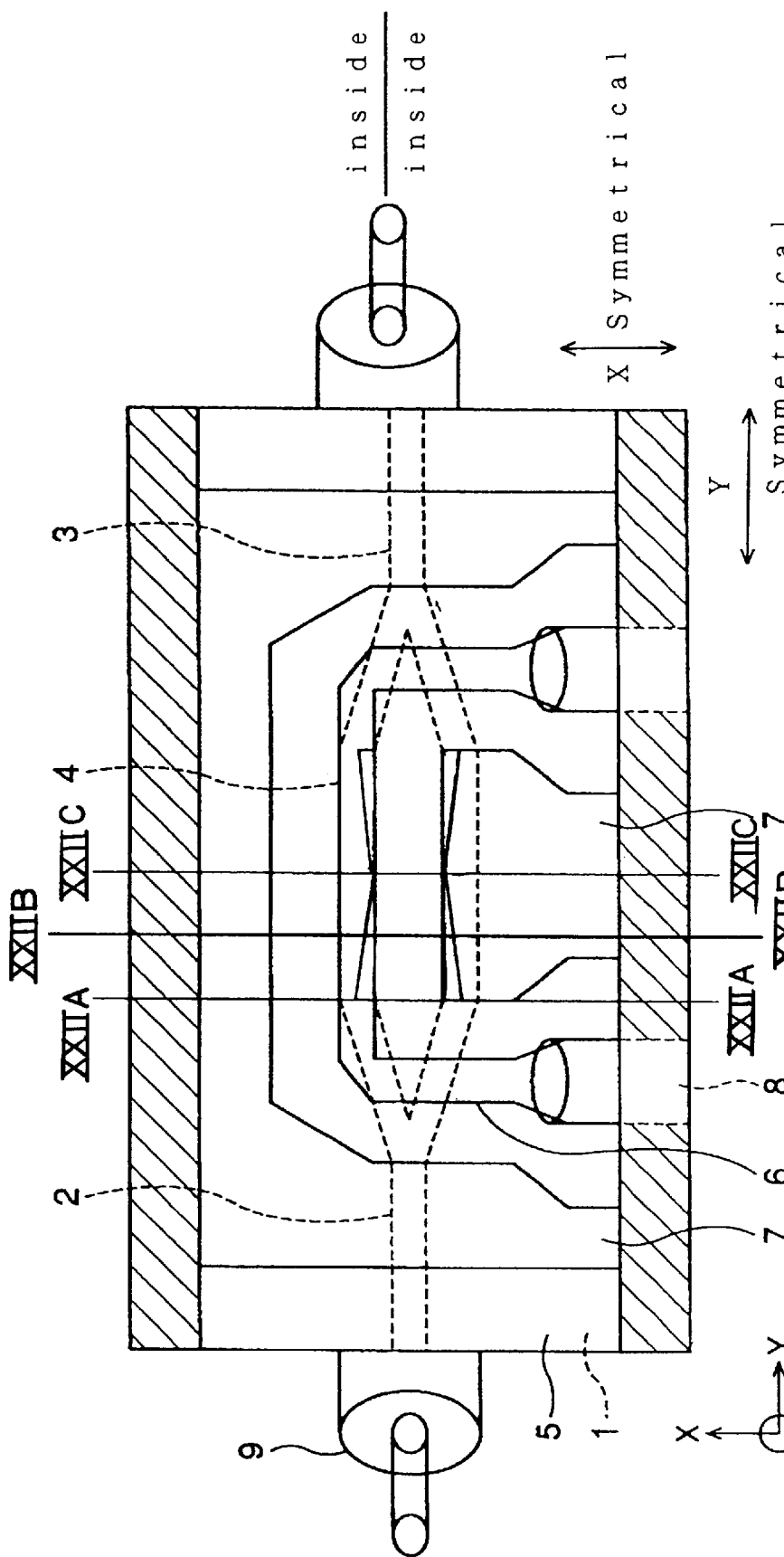
FIG. 21 is a plane view illustrative of a novel Mach-Zehnder optical modulator including an improved dielectric buffer layer which varies in thickness in a fifth embodiment in accordance with the present invention.
Figure 22A:
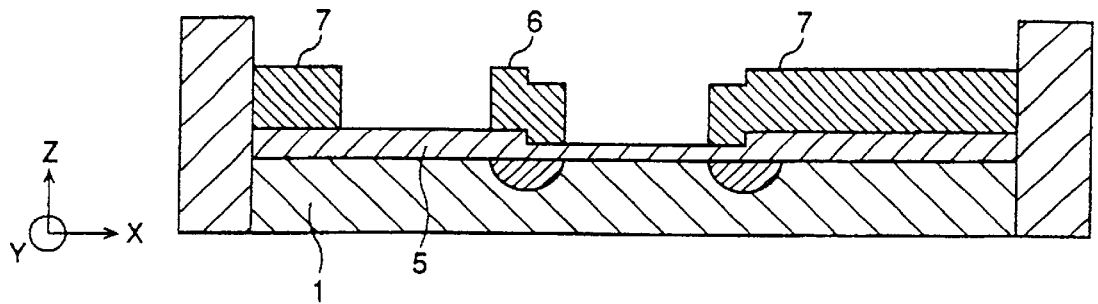
FIG. 22A is a cross sectional elevation view illustrative of a novel Mach-Zehnder optical modulator taken along XXIIA—XXIIA in FIG. 21 in a fifth embodiment in accordance with the present invention.
Figure 22B:
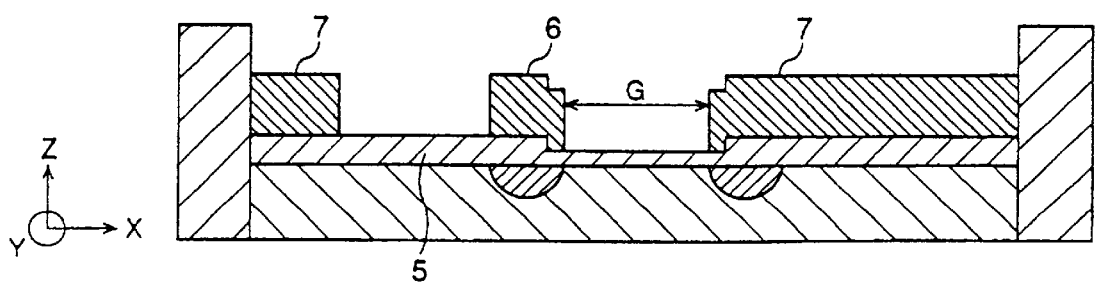
FIG. 22B is a cross sectional elevation view illustrative of a novel Mach-Zehnder optical modulator taken along XXIIB—XXIIB in FIG. 21 in a fifth embodiment in accordance with the present invention.
Figure 22C:
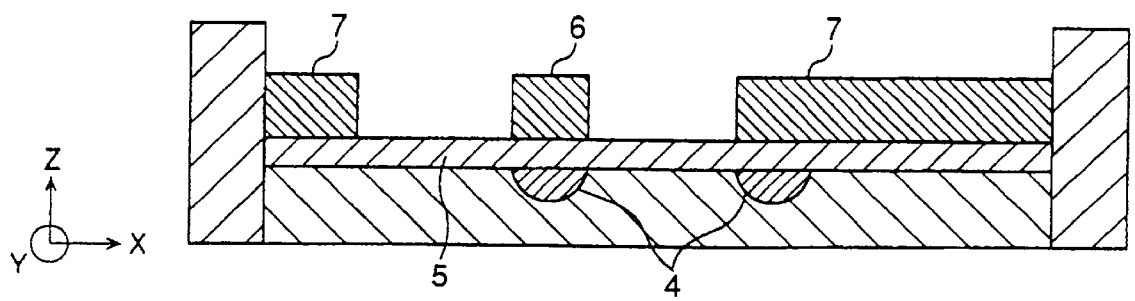
FIG. 22C is a cross sectional elevation view illustrative of a novel Mach-Zehnder optical modulator taken along XXIIC—XXIIC in FIG. 21 in a fifth embodiment in accordance with the present invention.

A fifth embodiment according to the present invention will be described in detail with reference to FIGS. 21, 22A, 22B and 22C. FIG. 21 is a plane view illustrative of a novel Mach-Zehnder optical modulator including an improved dielectric buffer layer which varies in thickness. FIG. 22A is a cross sectional elevation view illustrative of a novel Mach-Zehnder optical modulator taken along, line XXIIA—XXIIA in FIG. 21. FIG. 22B is a cross sectional elevation view illustrative of a novel Mach-Zehnder optical modulator taken along line XXIIB—XXIIB in FIG. 21. FIG. 22C is a cross sectional elevation view illustrative of a novel Mach-Zehnder optical modulator taken along line XXIIC—XXIIC in FIG. 21.

A crystal substrate 1, for example, a LiNbO$_3$ substrate was prepared which is capable of causing electro-optical effects. A titanium film strip was formed on a top surface of the crystal substrate 1, wherein the titanium film strip comprises two straight arms and two Y-shaped portions coupled to opposite sides of the two straight arms. The titanium film strip has a width of 5–20 micrometers and a thickness of 500–1200 angstroms. The crystal substrate 1 was then subjected to a heat treatment at a temperature in the range of 900° C. to 1000° C. for 5–12 hours to cause a diffusion of titanium in the titanium film strip into an upper region of the crystal substrate 1 to form a titanium-diffused optical waveguide in the upper region of the crystal substrate 1. The titanium-diffused optical waveguide comprises a Y-shaped optical divider portion 2, two straight arm optical modulator portions 4 coupled to the Y-shaped optical divider portion 2, and a Y-shaped optical coupler portion 3 coupled to the two straight arm optical modulator portions 4. Optical fiber mounts 9 are provided at opposite end portion; of the titanium-diffused optical waveguide so that the Y-shaped optical divider portion 2 and the Y-shaped optical coupler portion 3 are coupled via the optical fiber mounts 9 to optical fibers. The top surface of the titanium-diffused optical waveguide has the same level as the top surface of the crystal substrate 1 to form a flat surface. A dielectric buffer layer 5, for example, SiO$_2$ buffer layer is provided entirely on the flat surface so that the dielectric buffer layer 5 extends over the optical waveguide and the crystal substrate 1. The dielectric buffer layer 5 varies in thickness in the range of 1–10 micrometers. The dielectric buffer layer 5 has a dielectric constant in the range of 1.1–40.

The dielectric buffer layer 5 is discontinuously reduced in thickness to form a thin portion and a thick portion, both of which are bounded by a step. A thickness of the thin portion is a half of a thickness of the thick portion. The thin portion is selectively provided in inner half regions of the two straight arm optical modulator portions 4 of the titanium-diffused optical waveguide and extends over the top surface of the crystal substrate 1 between the two straight arm optical modulator portions 4. The position of the step on an X-coordinate is linearly and proportionally varied in a Y-direction. Here, a width of the thin portion of the dielectric buffer layer 5 is defined as a horizontal size of the thin portion on the X-coordinate or in the X-direction. The width of the thin portion of the dielectric buffer layer 5 is thus linearly and proportionally varied in the Y-direction.

With reference to FIGS. 21 and 22A, on the Y-coordinate at a position just inside line XXIIA—XXIIA including a boundary between the two straight arm optical modulator portions 4 and the Y-shaped optical divider portion 2, the width of the thin portion of the dielectric buffer layer 5 corresponds to the sum of a width of each the straight arm optical modulator portion 4 and the above distance between the two straight arm optical modulator portions 4. The steps between the thin portion and the thick portion are positioned at center positions on the X-coordinate of the two straight arm optical modulator portions 4.

With reference to FIGS. 21 and 22C, on line XXIIC—XXIIC including center positions on the Y-coordinate of the straight arm optical modulator portions 4, the width of the thin portion of the dielectric buffer layer 5 corresponds to a distance between the two straight arm optical modulator portions 4. The steps between the thin portion and the thick portion are positioned at the inside edges of the two straight arm optical modulator portions 4.

With reference to FIGS. 21 and 22B, on line XXIIB—XXIIB extending in parallel to line XXIIA—XXIIA and line XXIIC—XXIIC and positioned on the Y-coordinate at a center between line XXIIA—XXIIA and line XXIIC—XXIIC, the width of the thin portion of the dielectric buffer layer 5 corresponds to the sum of a half width of each the straight arm optical modulator portion 4 and the above distance between the two straight arm optical modulator portions 4. On the X-coordinate, the steps between the thin portion and the thick portion are positioned outside from the inside edges of the two straight arm optical modulator portions 4 by a quarter of the width of each the straight arm optical modulator portion 4.

As the position on the Y-coordinate moves from line XXIIA—XXIIA to line XXIIC—XXIIC, the width of the thin portion of the dielectric buffer layer 5 is linearly and proportionally decreased as well illustrated in FIG. 21. Further, as the position on the Y-coordinate moves from line XXIIC—XXIIC to the boundary between the two straight arm optical modulator portions 4 and the Y-shaped optical coupler portion 3, the width of the thin portion of the dielectric buffer layer 5 is linearly and proportionally increased to the same value as at the A-B line as well illustrated in FIG. 21.

The shapes in the plane view of the thin portion and the thick portion of the dielectric buffer layer 5 are symmetrical both in the X-direction and the Y-direction. Namely, a profile of variation in the thickness of the dielectric buffer layer 5 are symmetrical both in the X-direction and the Y-direction.

In this embodiment, a coplanar waveguide type electrode structure is selectively provided on the dielectric buffer layer 5, although other electrodes structures may be provided such as asymmetric coplanar strip type electrode structure and asymmetric strip line type electrode structure. The coplanar waveguide type electrode structure comprises a signal electrode 6 and two ground electrodes 7.

Here, a first one of the two straight arm optical modulator portions 4 is defined as having a larger value on the X-coordinate, while a second one of the two straight arm optical modulator portions 4 is defined as having a smaller value on the X-coordinate.

The signal electrode 6 extends in the Y-direction and over the dielectric buffer layer 5 over the first one of the two straight arm optical modulator portions 4 so that the signal electrode 6 entirely covers in the plane view the first one of the two straight arm optical modulator portions 4. The signal electrode 6 further extends in the X-direction toward the lower position on the X-coordinate and over the Y-shaped optical divider portion 2 and the Y-shaped optical coupler portion 3 so that the signal electrode 6 is coupled with connector packages 8 at the lower position on the X-coordinate than the position of the second one of the two straight arm optical modulator portions 4. The signal electrode 6 has a width in the range of 5–20 micrometers and a length in the range of 10–70 millimeters as well as a thickness of 3–40 micrometers. Since the signal electrode 6 extends over the dielectric buffer layer 5 varying in the thickness, the signal electrode 6 also has a step. Since, however, the thickness of the signal electrode 6 is much greater than the thickness of the dielectric buffer layer 5, for which reason the step of the signal electrode 6 provides substantially no effect to the electric field applied by the signal electrode 6.

A first one of the two ground electrodes 7 extends over the dielectric buffer layer 5 over the second one of the two straight arm optical modulator portions 4 so that the first one of the two ground electrodes 7 entirely covers in the plane view the second one of the two straight arm optical modulator portions 4. The first one of the two ground electrodes 7 further extends over the dielectric buffer layer 5 over the crystal substrate 1 on lower regions on the X-coordinate than and outside the second one of the two straight arm optical modulator portions 4. The first one of the two ground electrodes 7 is separated in the plane view from the signal electrode 6 at a distance or gap in the range of 5–200 micrometers.

A second one of the two ground electrodes 7 extends over the dielectric buffer layer 5 so that the second one of the two ground electrodes 7 is positioned outside the signal electrode 6 but separated in the plane view from the signal electrode 6 at a distance or gap in the range of 5–200 micrometers. The distance of the two ground electrodes 7 from the signal electrode 6 is determined so that a ratio of the width of the signal electrode 6 to the distance is in the range of 1–0.1, wherein the width of the signal electrode 6 is in the range of 5–20 micrometers as described above.

The ground electrode 7 has a width in the range of 100–9000 micrometers, a length in the range of 10–70 millimeters and a thickness in the range of 3–40 micrometers.

A microwave is applied through the connector package 8 to the signal electrode 6.

For the above Mach-Zehnder optical modulator, it was confirmed that the effect by a thinner portion of the dielectric buffer layer 5 for increasing the overlap integral of the electric field profile and the optical mode field profile exceeds the effect by a thinner portion of the dielectric buffer layer 5 for reducing the overlap integral. Namely, the effect by the thinner portion of the dielectric buffer layer 5 for reducing the driving voltage exceeds the effect by the thinner portion thereof for increasing the driving voltage. In order to drop the driving voltage, it is more effective to very the thickness of the dielectric buffer layer than keeping the dielectric buffer layer at an averaged thickness which is calculated by averaging those varied thicknesses of the dielectric buffer layer.

It was also confirmed that the effect by the thicker portion of the dielectric buffer layer 5 for reducing the difference of the effective microwave refractive index from the optical wave refractive index exceeds the opposite effect by the thinner portion of the dielectric buffer layer for increasing the difference of the effective microwave refractive index from the optical wave refractive index. Namely, the effect by the thicker portion of the dielectric buffer layer 5 for widening the bandwidth exceeds the opposite effect by the thinner portion of the dielectric buffer layer 5 for narrowing the bandwidth. In order to widen the bandwidth, it is more effective to very the thickness of the dielectric buffer layer than keeping the dielectric buffer layer at an averaged thickness which is calculated by averaging those varied thicknesses of the dielectric buffer layer.

Consequently, in order to drop the driving voltage and widen the bandwidth concurrently, it is more effective to very the thickness of the dielectric buffer layer than keeping the dielectric buffer layer at the averaged thickness which is calculated by averaging those varied thicknesses of the dielectric buffer layer. For above Mach-Zehnder optical modulator, both the above requirements for obtaining considerable reduction in the driving voltage and keeping much wider bandwidth could be satisfied.

The driving voltage of the novel Mach-Zehnder optical modulator is about 2.8 V which is much lower than the driving voltage of 3.4 V of the conventional Mach-Zehnder optical modulator. Namely, the driving voltage of the novel Mach-Zehnder optical modulator is reduced by 18% from that of the conventional one. The characteristic impedance of the novel Mach-Zehnder optical modulator can be kept in the range of 46–48Ω which is lower by only 2–4Ω or about 4–8% than 50Ω of the conventional Mach-Zehnder optical modulator.

The subject matter of the present invention in the above described embodiment can be applicable to the other optical devices such as other optical modulator or optical switches utilizing the phase shift phenomenon.

The above dielectric buffer layer 5 can be prepared by optional use of selective wet and dry etching processes in combination with masking work.

Sixth Embodiment

Figure 23:
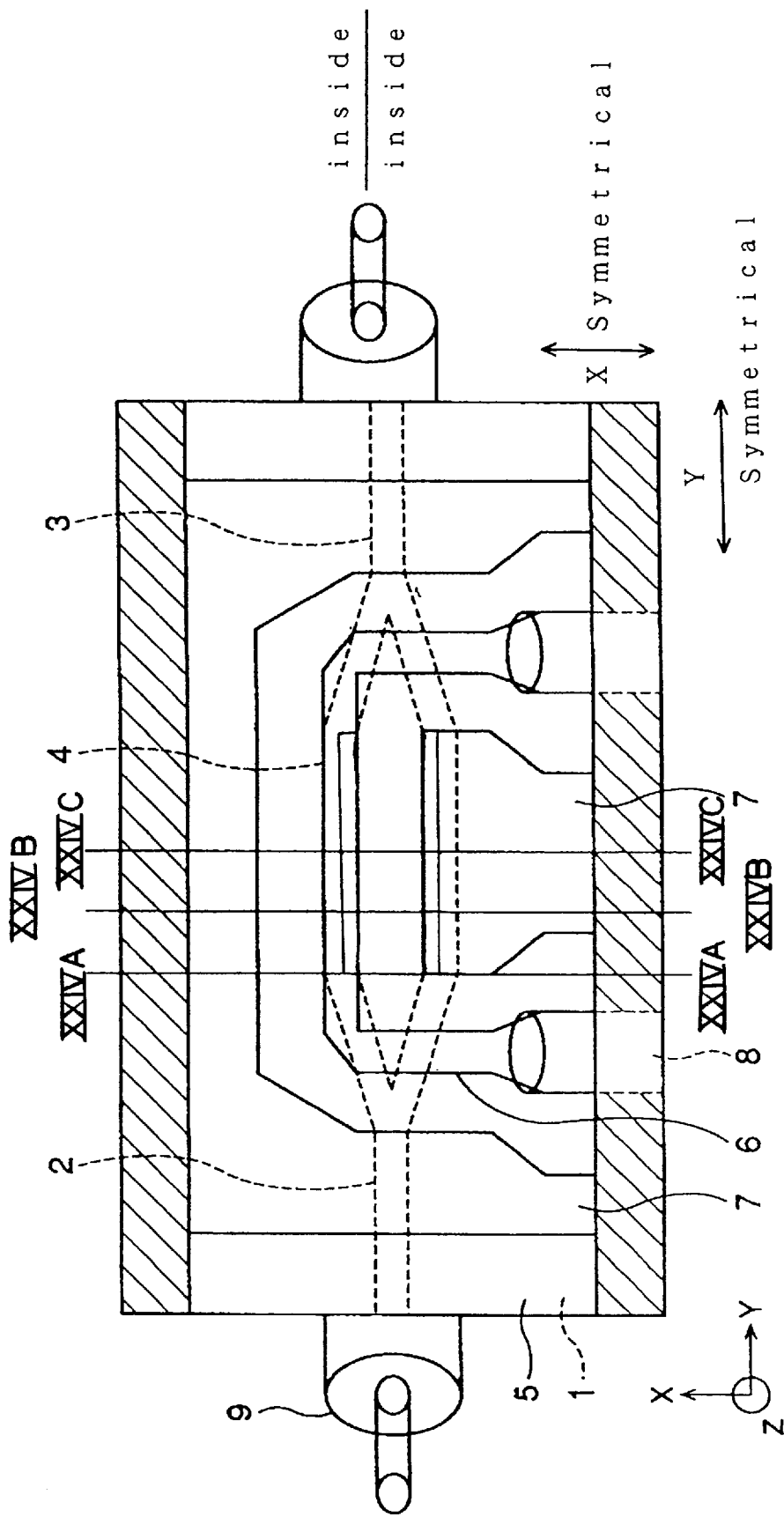
FIG. 23 is a plane view illustrative of a novel Mach-Zehnder optical modulator including an improved dielectric buffer layer which varies in thickness in a sixth embodiment in accordance with the present invention.
Figure 24A:
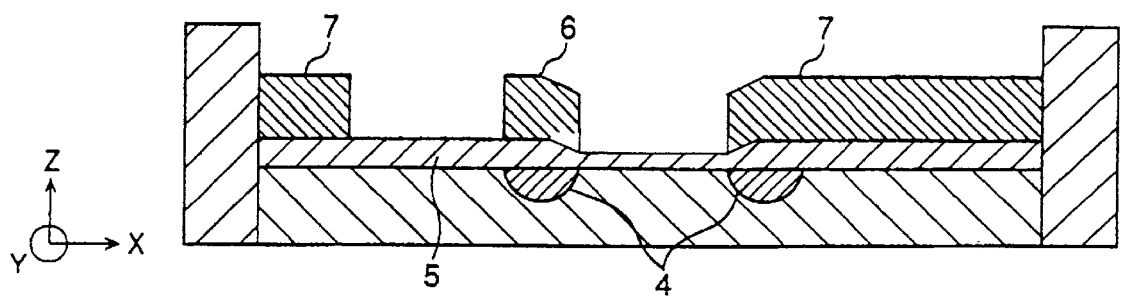
FIG. 24A is a cross sectional elevation view illustrative of a novel Mach-Zehnder optical modulator taken along XXIVA—XXIVA in FIG. 23 in a sixth embodiment in accordance with the present invention.
Figure 24B:
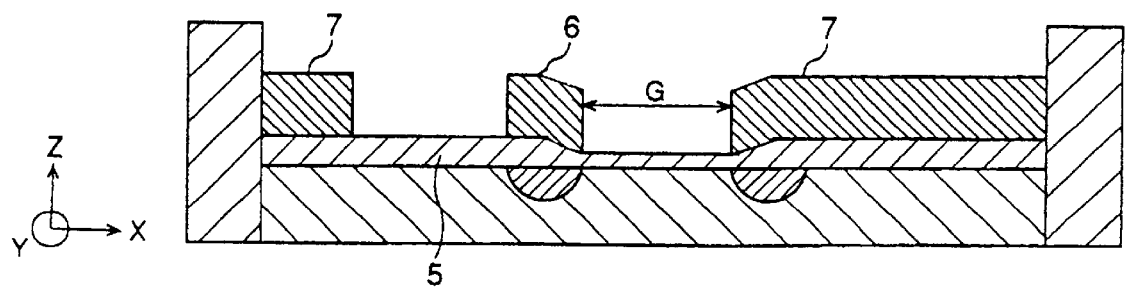
FIG. 24B is a cross sectional elevation view illustrative of a novel Mach-Zehnder optical modulator taken along XXIVB—XXIVB in FIG. 23 in a sixth embodiment in accordance with the present invention.
Figure 24C:
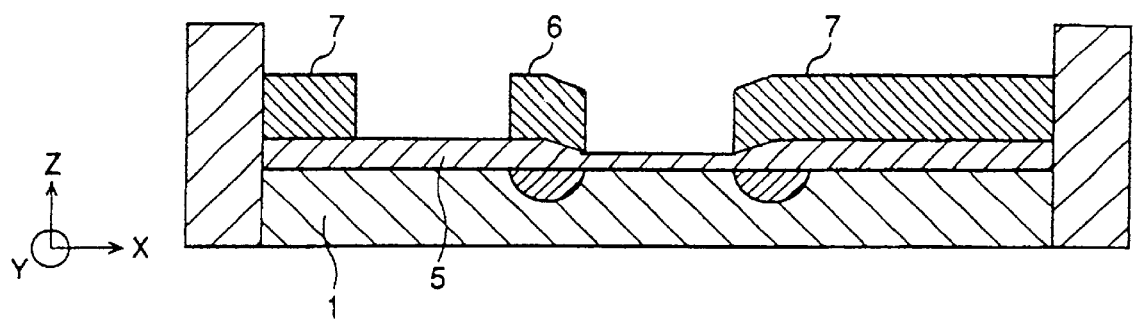
FIG. 24C is a cross sectional elevation view illustrative of a novel Mach-Zehnder optical modulator taken along XXIVC—XXIVC in FIG. 23 in a sixth embodiment in accordance with the present invention.

A sixth embodiment according to the present invention will be described in detail with reference to FIGS. 23, 24A, 24B and 24C. FIG. 23 is a plane view illustrative of a novel Mach-Zehnder optical modulator including an improved dielectric buffer layer which varies in thickness. FIG. 24A is a cross sectional elevation view illustrative of a novel Mach-Zehnder optical modulator taken along line XXIVA—XXIVA in FIG. 23. FIG. 24B is a cross sectional elevation view illustrative of a novel Mach-Zehnder optical modulator taken along line XXIVB—XXIVB in FIG. 23. FIG. 24C is a cross sectional elevation view illustrative of a novel Mach-Zehnder optical modulator taken along line XXIVC—XXIVC in FIG. 23.

A crystal substrate 1, for example, a LiNbO$_3$ substrate was prepared which is capable of causing electro-optical effects. A titanium film strip was formed on a top surface of the crystal substrate 1, wherein the titanium film strip comprises two straight arms and two Y-shaped portions coupled to opposite sides of the two straight arms. The titanium film strip has a width of 5–20 micrometers and a thickness of 500–1200 angstroms. The crystal substrate 1 was then subjected to a heat treatment at a temperature in the range of 900° C. to 1000° C. for 5–12 hours to cause a diffusion of titanium in the titanium film strip into an upper region of the crystal substrate 1 to form a titanium-diffused optical waveguide in the upper region of the crystal substrate 1. The titanium-diffused optical waveguide comprises a Y-shaped optical divider portion 2, two straight arm optical modulator portions 4 coupled to the Y-shaped optical divider portion 2, and a Y-shaped optical coupler portion 3 coupled to the two straight arm optical modulator portions 4. Optical fiber mounts 9 are provided at opposite end portions of the titanium-diffused optical waveguide so that the Y-shaped optical divider portion 2 and the Y-shaped optical coupler portion 3 are coupled via the optical fiber mounts 9 to optical fibers. The top surface of the titanium-diffused optical waveguide has the same level as the top surface of the crystal substrate 1 to form a flat surface. A dielectric buffer layer 5, for example, SiO$_2$ buffer layer is provided entirely on the flat surface so that the dielectric buffer layer 5 extends over the optical waveguide and the crystal substrate 1. The dielectric buffer layer 5 varies in thickness in the range of 1–10 micrometers. The dielectric buffer layer 5 has a dielectric constant in the range of 1.1–40.

The dielectric buffer layer 5 is continuously reduced in thickness to form a thin portion and a thick portion, both of which are bounded by a slope. A thickness of the thin portion is a half of a thickness of the thick portion. The thin portion is selectively provided in inner half regions of the two straight arm optical modulator portions 4 of the titanium-diffused optical waveguide and extends over the top surface of the crystal substrate 1 between the two straight arm optical modulator portions 4. The position of the slope on an X-coordinate remains unchanged in a Y-direction. Here, a width of the thin portion of the dielectric buffer layer 5 is defined as a horizontal size of the thin portion on the X-coordinate or in the X-direction. The width of the thin portion of the dielectric buffer layer 5 is thus remains unchanged in the Y-direction.

With reference to FIGS. 23 and 24A, on the Y-coordinate at line XXIVA—XXIVA including a boundary between the two straight arm optical modulator portions 4 and the Y-shaped optical divider portion 2, the thin portion of the dielectric buffer layer 5 does not exist. No slope is therefore formed.

With reference to FIGS. 23 and 24C, on line XXIVC—XXIVC including center positions on the Y-coordinate of the straight arm optical modulator portions 4, the width of the thin portion of the dielectric buffer layer 5 corresponds to the sum of a width of each the straight arm optical modulator portion 4 and the above distance between the two straight arm optical modulator portions 4. The boundaries between the thin portion and the slopes are positioned at center positions on the X-coordinate of the two straight arm optical modulator portions 4.

With reference to FIGS. 23 and 24B, on line XXIVB—XXIVB extending in parallel to line XXIVA—XXIVA and line XXIVC—XXIVC and positioned on the Y-coordinate at a center between line XXIVA—XXIVA and line XXIVC—XXIVC, the width of the thin portion of the dielectric buffer layer 5 corresponds to the sum of a width of each the straight arm optical modulator portion 4 and the above distance between the two straight arm optical modulator portions 4. The boundaries between the thin portion and the slopes are positioned at center positions on the X-coordinate of the two straight arm optical modulator portions 4.

The width of the thin portion of the dielectric buffer layer 5 remains unchanged as well illustrated in FIG. 23.

The shapes in the plane view of the thin portion and the thick portion of the dielectric buffer layer 5 are symmetrical both in the X-direction and the Y-direction. Namely, a profile of variation in the thickness of the dielectric buffer layer 5 are symmetrical both in the X-direction and the Y-direction.

In this embodiment, a coplanar waveguide type electrode structure is selectively provided on the dielectric buffer layer 5, although other electrodes structures may be provided such as asymmetric coplanar strip type electrode structure and asymmetric strip line type electrode structure. The coplanar waveguide type electrode structure comprises a signal electrode 6 and two ground electrodes 7.

Here, a first one of the two straight arm optical modulator portions 4 is defined as having a larger value on the X-coordinate, while a second one of the two straight arm optical modulator portions 4 is defined as having a smaller value on the X-coordinate.

The signal electrode 6 extends in the Y-direction and over the dielectric buffer layer 5 over the first one of the two straight arm optical modulator portions 4 so that the signal electrode 6 entirely covers in the plane view the first one of the two straight arm optical modulator portions 4. The signal electrode 6 further extends in the X-direction toward the lower position on the X-coordinate and over the Y-shaped optical divider portion 2 and the Y-shaped optical coupler portion 3 so that the signal electrode 6 is coupled with connector packages 8 at the lower position on the X-coordinate than the position of the second one of the two straight arm optical modulator portions 4. The signal electrode 6 has a width in the range of 5–20 micrometers and a length in the range of 10–70 millimeters as well as a thickness of 3–40 micrometers. Since the signal electrode 6 extends over the dielectric buffer layer 5 varying in the thickness, the signal electrode 6 also has a slope. Since, however, the thickness of the signal electrode 6 is much greater than the thickness of the dielectric buffer layer 5, for which reason the slope of the signal electrode 6 provides substantially no effect to the electric field applied by the signal electrode 6.

A first one of the two ground electrodes 7 extends over the dielectric buffer layer 5 over the second one of the two straight arm optical modulator portions 4 so that the first one of the two ground electrodes 7 entirely covers in the plane view the second one of the two straight arm optical modulator portions 4. The first one of the two ground electrodes 7 further extends over the dielectric buffer layer 5 over the crystal substrate 1 on lower regions on the X-coordinate than and outside the second one of the two straight arm optical modulator portions 4. The first one of the two ground electrodes 7 is separated in the plane view from the signal electrode 6 at a distance or gap in the range of 5–200 micrometers.

A second one of the two ground electrodes 7 extends over the dielectric buffer layer 5 so that the second one of the two ground electrodes 7 is positioned outside the signal electrode 6 but separated in the plane view from the signal electrode 6 at a distance or gap in the range of 5–200 micrometers. The distance of the two ground electrodes 7 from the signal electrode 6 is determined so that a ratio of the width of the signal electrode 6 to the distance is in the range of 1–0.1, wherein the width of the signal electrode 6 is in the range of 5–20 micrometers as described above.

The ground electrode 7 has a width in the range of 100–9000 micrometers, a length in the range of 10–70 millimeters and a thickness in the range of 3–40 micrometers.

A microwave is applied through the connector package 8 to the signal electrode 6.

For the above Mach-Zehnder optical modulator, it was confirmed that the effect by a thinner portion of the dielectric buffer layer 5 for increasing the overlap integral of the electric field profile and the optical mode field profile exceeds the effect by a thinner portion of the dielectric buffer layer 5 for reducing the overlap integral. Namely, the effect by the thinner portion of the dielectric buffer layer 5 for reducing the driving voltage exceeds the effect by the thinner portion thereof for increasing the driving voltage. In order to drop the driving voltage, it is more effective to very the thickness of the dielectric buffer layer than keeping the dielectric buffer layer at an averaged thickness which is calculated by averaging those varied thicknesses of the dielectric buffer layer.

It was also confirmed that the effect by the thicker portion of the dielectric buffer layer 5 for reducing the difference of the effective microwave refractive index from the optical wave refractive index exceeds the opposite effect by the thinner portion of the dielectric buffer layer for increasing the difference of the effective microwave refractive index from the optical wave refractive index. Namely, the effect by the thicker portion of the dielectric buffer layer 5 for widening the bandwidth exceeds the opposite effect by the thinner portion of the dielectric buffer layer 5 for narrowing the bandwidth. In order to widen the bandwidth, it is more effective to very the thickness of the dielectric buffer layer than keeping the dielectric buffer layer at an averaged thickness which is calculated by averaging those varied thicknesses of the dielectric buffer layer.

Consequently, in order to drop the driving voltage and widen the bandwidth concurrently, it is more effective to very the thickness of the dielectric buffer layer than keeping the dielectric buffer layer at the averaged thickness which is calculated by averaging those varied thicknesses of the dielectric buffer layer. For above Mach-Zehnder optical modulator, both the above requirements for obtaining considerable reduction in the driving voltage and keeping much wider bandwidth could be satisfied.

The subject matter of the present invention in the above described embodiment can be applicable to the other optical devices such as other optical modulator or optical switches Utilizing the phase shift phenomenon.

The above dielectric buffer layer 5 can be prepared by optional use of selective wet and dry etching processes in combination with masking work.

Seventh Embodiment

Figure 26A:
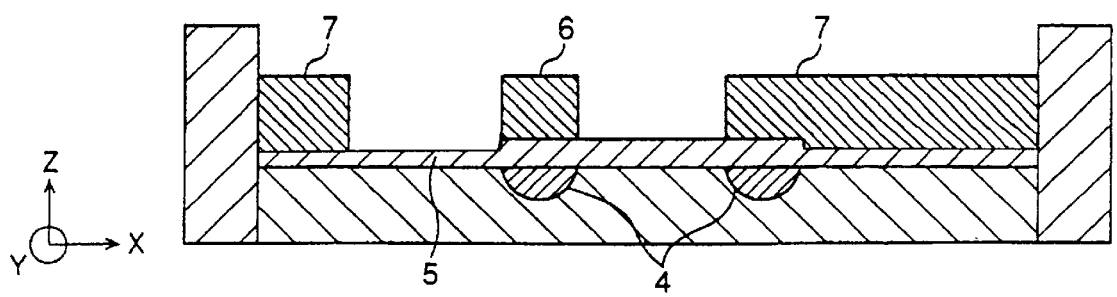
FIG. 26A is a cross sectional elevation view illustrative of a novel Mach-Zehnder optical modulator taken along XXVIA—XXVIA in FIG. 25 in a seventh embodiment in accordance with the present invention.
Figure 26B:
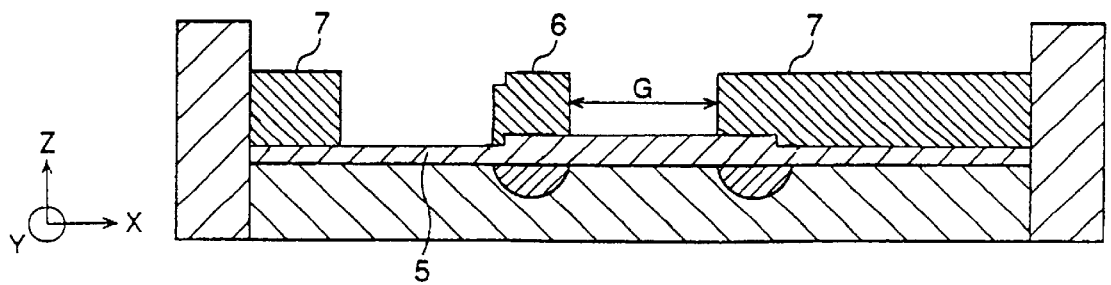
FIG. 26B is a cross sectional elevation view illustrative of a novel Mach-Zehnder optical modulator taken along XXVIB—XXVIB in FIG. 25 in a seventh embodiment in accordance with the present invention.

A seventh embodiment according to the present invention will be described in detail with reference to FIGS. 25, 26A, 26B and 26C. FIG. 25 is a plane view illustrative of a novel Mach-Zehnder optical modulator including an improved dielectric buffer layer which varies in thickness. FIG. 26A is a cross sectional elevation view illustrative of a novel Mach-Zehnder optical modulator taken along line XXVIA—XXVIA in FIG. 25. FIG. 26B is a cross sectional elevation view illustrative of a novel Mach-Zehnder optical modulator taken along line XXVIB—XXVIB in FIG. 25.

Figure 26C:
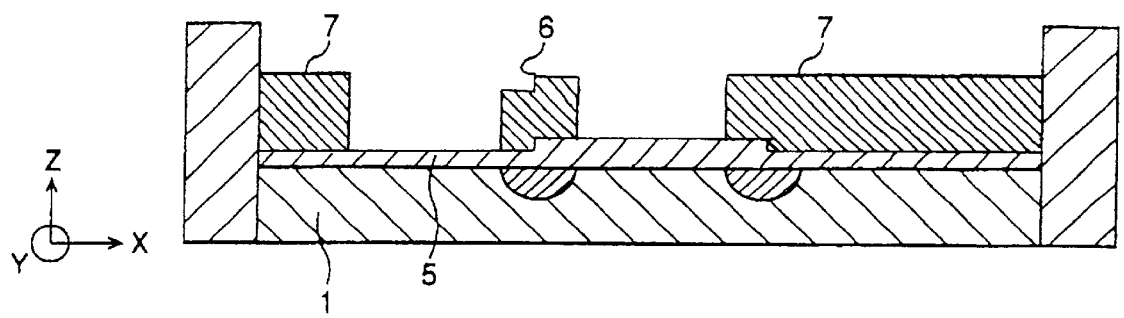
FIG. 26C is a cross sectional elevation view illustrative of a novel Mach-Zehnder optical modulator taken along XXVIC—XXVIC in FIG. 25 in a seventh embodiment in accordance with the present invention.

FIG. 26C is a cross sectional elevation view illustrative of a novel Mach-Zehnder optical modulator taken along line XXVIC—XXVIC in FIG. 25.

A crystal substrate 1, for example, a $LiNbO_3$ substrate was prepared which is capable of causing electro-optical effects. A titanium film strip was formed on a top surface of the crystal substrate 1, wherein the titanium film strip comprises two straight arms and two Y-shaped portions coupled to opposite sides of the two straight arms. The titanium film strip has a width of 5–20 micrometers and a thickness of 500–1200 angstroms. The crystal substrate 1 was then subjected to a heat treatment at a temperature in the range of 900° C. to 1000° C. for 5–12 hours to cause a diffusion of titanium in the titanium film strip into an upper region of the crystal substrate 1 to form a titanium-diffused optical waveguide in the upper region of the crystal substrate 1. The titanium-diffused optical waveguide comprises a Y-shaped optical divider portion 2, two straight arm optical modulator portions 4 coupled to the Y-shaped optical divider portion 2, and a Y-shaped optical coupler portion 3 coupled to the two straight arm optical modulator portions 4. Optical fiber mounts 9 are provided at opposite end portions of the titanium-diffused optical waveguide so that the Y-shaped optical divider portion 2 and the Y-shaped optical coupler portion 3 are coupled via the optical fiber mounts 9 to optical fibers. The top surface of the titanium-diffused optical waveguide has the same level as the top surface of the crystal substrate 1 to form a flat surface. A dielectric buffer layer 5, for example, $SiO_2$ buffer layer is provided entirely on the flat surface so that the dielectric buffer layer 5 extends over the optical waveguide and the crystal substrate 1. The dielectric buffer layer 5 varies in thickness in the range of 1–10 micrometers. The dielectric buffer layer 5 has a dielectric constant in the range of 1.1–40.

The dielectric buffer layer 5 is discontinuously reduced in thickness to form a thin portion and a thick portion, both of which are bounded by a step. A thickness of the thin portion is a half of a thickness of the thick portion. The thick portion is selectively provided on the two straight arm optical modulator portions 4 of the titanium-diffused optical waveguide and extends over the top surface of the crystal substrate 1 between the two straight arm optical modulator portions 4. The position of the step on an X-coordinate is linearly and proportionally varied in a Y-direction. Here, a width of the thin portion of the dielectric buffer layer 5 is defined as a horizontal size of the thin portion on the X-coordinate or in the X-direction. The width of the thick portion of the dielectric buffer layer 5 is thus linearly and proportionally varied in the Y-direction.

With reference to FIGS. 25 and 26A, on the Y-coordinate at a position just inside line XXVIA—XXVIA including a boundary between the two straight arm optical modulator portions 4 and the Y-shaped optical divider portion 2, the width of the thick portion of the dielectric buffer layer 5 corresponds to the sum of widths of the two straight arm optical modulator portions 4 and the above distance between the two straight arm optical modulator portions 4. The steps between the thin portion and the thick portion are positioned at the outside edges of the two straight arm optical modulator portions 4.

With reference to FIGS. 25 and 26C, on line XXVIC—XXVIC including center positions on the Y-coordinate of the straight arm optical modulator portions 4, the width of the thick portion of the dielectric buffer layer 5 corresponds to the sum of a width of each the straight arm optical modulator portion 4 and a distance between the two straight arm optical modulator portions 4. The steps between the thick portion and the thin portion are positioned at center positions on the X-coordinate of the two straight arm optical modulator portions 4.

With reference to FIGS. 25 and 26B, on line XXVIB—XXVIB extending in parallel to line XXVIA—XXVIA and line XXVIC—XXVIC and positioned on the Y-coordinate at a center between line XXVIA—XXVIA and line XXVIC—XXVIC, the width of the thick portion of the dielectric buffer layer 5 corresponds to the sum of one and a half of a width of each the straight arm optical modulator portion 4 and the above distance between the two straight arm optical modulator portions 4. On the X-coordinate, the steps between the thin portion and the thick portion are positioned inside from the outside edges of the two straight arm optical modulator portions 4 by a quarter of the width of each the straight arm optical modulator portion 4.

As the position on the Y-coordinate moves from line XXVIA—XXVIA to line XXVIC—XXVIC, the width of the thick portion of the dielectric buffer layer 5 is linearly and proportionally decreased as well illustrated in FIG. 25. Further, as the position on the Y-coordinate moves from line XXVIC—XXVIC to the boundary between the two straight arm optical modulator portions 4 and the Y-shaped optical coupler portion 3, the width of the thin portion of the dielectric buffer layer 5 is linearly and proportionally increased to the same value as at line XXVIA—XXVIA as well illustrated in FIG. 25.

The shapes in the plane view of the thin portion and the thick portion of the dielectric buffer layer 5 are symmetrical both in the X-direction and the Y-direction. Namely, a profile of variation in the thickness of the dielectric buffer layer 5 are symmetrical both in the X-direction and the Y-direction.

In this embodiment, a coplanar waveguide type electrode structure is selectively provided on the dielectric buffer layer 5, although other electrodes structures may be provided such as asymmetric coplanar strip type electrode structure and asymmetric strip line type electrode structure. The coplanar waveguide type electrode structure comprises a signal electrode 6 and two ground electrodes 7.

Here, a first one of the two straight arm optical modulator portions 4 is defined as having a larger value on the X-coordinate, while a second one of the two straight arm optical modulator portions 4 is defined as having a smaller value on the X-coordinate.

The signal electrode 6 extends in the Y-direction and over the dielectric buffer layer 5 over the first one of the two straight arm optical modulator portions 4 so that the signal electrode 6 entirely covers in the plane view the first one of the two straight arm optical modulator portions 4. The signal electrode 6 further extends in the X-direction toward the lower position on the X-coordinate and over the Y-shaped optical divider portion 2 and the Y-shaped optical coupler portion 3 so that the signal electrode 6 is coupled with connector packages 8 at the lower position on the X-coordinate than the position of the second one of the two straight arm optical modulator portions 4. The signal electrode 6 has a width in the range of 5–20 micrometers and a length in the range of 10–70 millimeters as well as a thickness of 3–40 micrometers. Since the signal electrode 6 extends over the dielectric buffer layer 5 varying in the thickness, the signal electrode 6 also has a step. Since, however, the thickness of the signal electrode 6 is much greater than the thickness of the dielectric buffer layer 5, for which reason the step of the signal electrode 6 provides substantially no effect to the electric field applied by the signal electrode 6.

A first one of the two ground electrodes 7 extends over the dielectric buffer layer 5 over the second one of the two straight arm optical modulator portions 4 so that the first one of the two ground electrodes 7 entirely covers in the plane view the second one of the two straight arm optical modulator portions 4. The first one of the two ground electrodes 7 further extends over the dielectric buffer layer 5 over the crystal substrate 1 on lower regions on the X-coordinate than and outside the second one of the two straight arm optical modulator portions 4. The first one of the two ground electrodes 7 is separated in the plane view from the signal electrode 6 at a distance or gap in the range of 5–200 micrometers.

A second one of the two ground electrodes 7 extends over the dielectric buffer layer 5 so that the second one of the two ground electrodes 7 is positioned outside the signal electrode 6 but separated in the plane view from the signal electrode 6 at a distance or gap in the range of 5–200 micrometers. The distance of the two ground electrodes 7 from the signal electrode 6 is determined so that a ratio of the width of the signal electrode 6 to the distance is in the range of 1–0.1, wherein the width of the signal electrode 6 is in the range of 5–20 micrometers as described above.

The ground electrode 7 has a width in the range of 100–9000 micrometers, a length in the range of 10–70 millimeters and a thickness in the range of 3–40 micrometers.

A microwave is applied through the connector package 8 to the signal electrode 6.

For the above Mach-Zehnder optical modulator, it was confirmed that the effect by a thinner portion of the dielectric buffer layer 5 for increasing the overlap integral of the electric field profile and the optical mode field profile exceeds the effect by a thinner portion of the dielectric buffer layer 5 for reducing the overlap integral. Namely, the effect by the thinner portion of the dielectric buffer layer 5 for reducing the driving voltage exceeds the effect by the thinner portion thereof for increasing the driving voltage. In order to drop the driving voltage, it is more effective to very the thickness of the dielectric buffer layer than keeping the dielectric buffer layer at an averaged thickness which is calculated by averaging those varied thicknesses of the dielectric buffer layer.

It was also confirmed that the effect by the thicker portion of the dielectric buffer layer 5 for reducing the difference of the effective microwave refractive index from the optical wave refractive index exceeds the opposite effect by the thinner portion of the dielectric buffer layer for increasing the difference of the effective microwave refractive index from the optical wave refractive index. Namely, the effect by the thicker portion of the dielectric buffer layer 5 for widening the bandwidth exceeds the opposite effect by the thinner portion of the dielectric buffer layer 5 for narrowing the bandwidth. In order to widen the bandwidth, it is more effective to very the thickness of the dielectric buffer layer than keeping the dielectric buffer layer at an averaged thickness which is calculated by averaging those varied thicknesses of the dielectric buffer layer.

Consequently, in order to drop the driving voltage and widen the bandwidth concurrently, it is more effective to very the thickness of the dielectric buffer layer than keeping the dielectric buffer layer at the averaged thickness which is calculated by averaging those varied thicknesses of the dielectric buffer layer. For above Mach-Zehnder optical modulator, both the above requirements for obtaining considerable reduction in the driving voltage and keeping much wider bandwidth could be satisfied.

FIG. 14 is a diagram of driving voltage and characteristic impedance of a novel Mach-Zehnder optical modulator in accordance with the present invention as compared to the conventional Mach-Zehnder optical modulator. "Type 2" represents the novel Mach-Zehnder optical modulator having the dielectric buffer layer 5 varying in thickness while "Type 1" represents the conventional Mach-Zehnder optical modulator having the dielectric buffer layer 5 remaining unchanged in thickness. The driving voltage of the novel Mach-Zehnder optical modulator is about 2.8 V which is much lower than the driving voltage of 3.4 V of the conventional Mach-Zehnder optical modulator. Namely, the driving voltage of the novel Mach-Zehnder optical modulator is reduced by 18% from that of the conventional one. The characteristic impedance of the novel Mach-Zehnder optical modulator can be kept in the range of 46–48Ω which is lower by only 2–4Ω or about 4–8% than 50Ω of the conventional Mach-Zehnder optical modulator.

The subject matter of the present invention in the above described embodiment can be applicable to the other optical devices such as other optical modulator or optical switches utilizing the phase shift phenomenon.

The above dielectric buffer layer 5 can be prepared by optional use of selective wet and dry etching processes in combination with masking work.

Eighth Embodiment

Figure 28A:
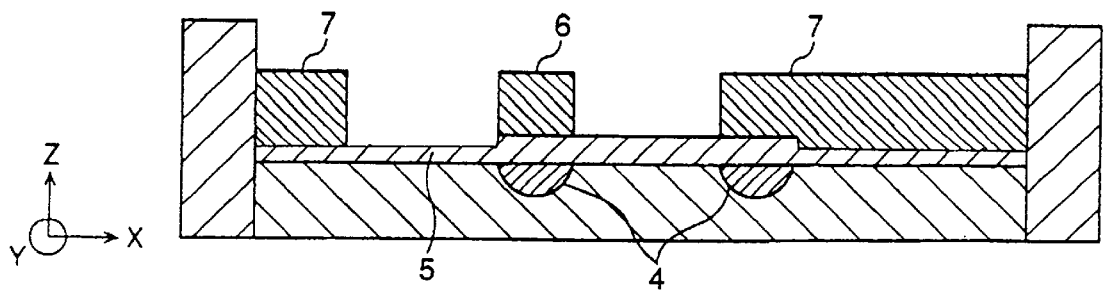
FIG. 28A is a cross sectional elevation view illustrative of a novel Mach-Zehnder optical modulator taken along XXVIIIA—XXVIIIA in FIG. 27 in an eighth embodiment in accordance with the present invention.
Figure 28B:
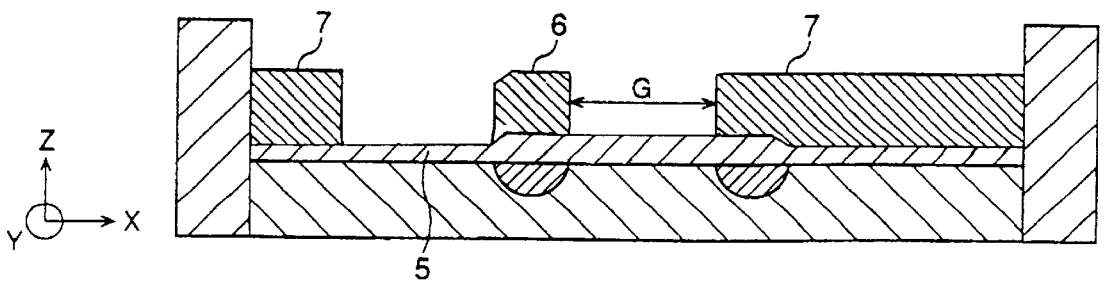
FIG. 28B is a cross sectional elevation view illustrative of a novel Mach-Zehnder optical modulator taken along XXVIIIB—XXVIIIB in FIG. 27 in an eighth embodiment in accordance with the present invention.
Figure 28C:
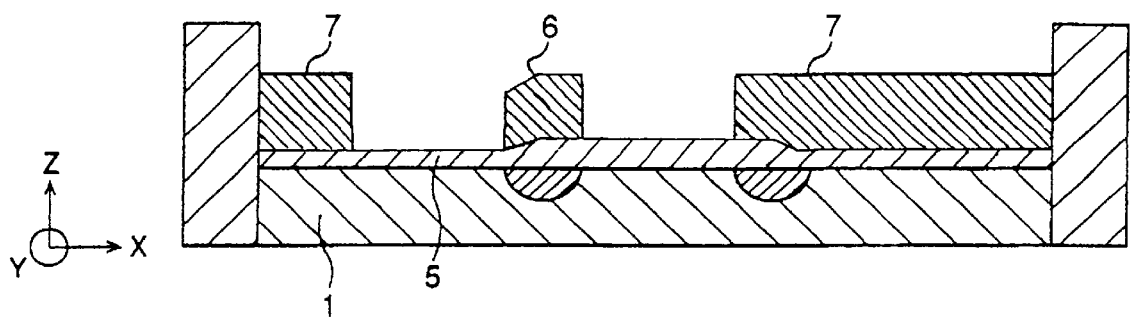
FIG. 28C is a cross sectional elevation view illustrative of a novel Mach-Zehnder optical modulator taken along XXVIIIC—XXVIIIC in FIG. 27 in an eighth embodiment in accordance with the present invention.

An eighth embodiment according to the present invention will be described in detail with reference to FIGS. 27, 28A, 28B and 28C. FIG. 27 is a plane view illustrative of a novel Mach-Zehnder optical modulator including an improved dielectric buffer layer which varies in thickness. FIG. 28A is a cross sectional elevation view illustrative of a novel Mach-Zehnder optical modulator taken along line XXVIIIA—XXVIIIA in FIG. 27. FIG. 28B is a cross sectional elevation view illustrative of a novel Mach-Zehnder optical modulator taken along line XXVIIIB—XXVIIIB in FIG. 27. FIG. 28C is a cross sectional elevation view illustrative of a novel Mach-Zehnder optical modulator taken along line XXVIIIC—XXVIIIC in FIG. 27.

A crystal substrate 1, for example, a LiNbO₃ substrate was prepared which is capable of causing electro-optical effects. A titanium film strip was formed on a top surface of the crystal substrate 1, wherein the titanium film strip comprises two straight arms and two Y-shaped portions coupled to opposite sides of the two straight arms. The titanium film strip has a width of 5–20 micrometers and a thickness of 500–1200 angstroms. The crystal substrate 1 was then subjected to a heat treatment at a temperature in the range of 900° C. to 1000° C. for 5–12 hours to cause a diffusion of titanium in the titanium film strip into an upper region of the crystal substrate 1 to form a titanium-diffused optical waveguide in the upper region of the crystal substrate 1. The titanium-diffused optical waveguide comprises a Y-shaped optical divider portion 2, two straight arm optical modulator portions 4 coupled to the Y-shaped optical divider portion 2, and a Y-shaped optical coupler portion 3 coupled to the two straight arm optical modulator portions 4. Optical fiber mounts 9 are provided at opposite end portions of the titanium-diffused optical waveguide so that the Y-shaped optical divider portion 2 and the Y-shaped optical coupler portion 3 are coupled via the optical fiber mounts 9 to optical fibers. The top surface of the titanium-diffused optical waveguide has the same level as the top surface of the crystal substrate 1 to form a flat surface. A dielectric buffer layer 5. For example, SiO₂ buffer layer is provided entirely on the flat surface so that the dielectric buffer layer 5 extends over the optical waveguide and the crystal substrate 1. The dielectric buffer layer 5 varies in thickness in the range of 1–10 micrometers. The dielectric buffer layer 5 has a dielectric constant in the range of 1.1–40.

The dielectric buffer layer 5 is continuously reduced in thickness to form a thin portion and a thick portion, both of which are bounded by a slope. A thickness of the thin portion is a half of a thickness of the thick portion. The thick portion is selectively provided on the two straight arm optical modulator portions 4 of the titanium-diffused optical waveguide and extends over the top surface of the crystal substrate 1 between the two straight arm optical modulator portions 4. The position of the slope on an X-coordinate is linearly and proportionally varied in a Y-direction. Here, a width of the thin portion of the dielectric buffer layer 5 is defined as a horizontal size of the thick portion on the X-coordinate or in the X-direction. The width of the thick portion of the dielectric buffer layer 5 is thus linearly and proportionally varied in the Y-direction.

With reference to FIGS. 27 and 28A, on the Y-coordinate at a position just inside line XXVIIIA—XXVIIIA including a boundary between the two straight arm optical modulator portions 4 and the Y-shaped optical divider portion 2, the width of the thick portion of the dielectric buffer layer 5 corresponds to the sum of widths of the two straight arm optical modulator portions 4 and the above distance between the two straight arm optical modulator portions 4. The boundaries between the slopes and the thick portion are positioned at the outside edges of the two straight arm optical modulator portions 4.

With reference to FIGS. 27 and 28C, on line XXVIIIC—XXVIIIC including center positions on the Y-coordinate of the straight arm optical modulator portions 4, the width of the thick portion of the dielectric buffer layer 5 corresponds to the sum of a width of each the straight arm optical modulator portion 4 and a distance between the two straight arm optical modulator portions 4. The boundaries between the thick portion and the slopes are positioned at center positions on the X-coordinate of the two straight arm optical modulator portions 4.

With reference to FIGS. 27 and 28B, on line XXVIIIB—XXVIIIB extending in parallel to line XXVIIIA—XXVIIIA and line XXVIIIC—XXVIIIC and positioned on the Y-coordinate at a center between line XXVIIIA—XXVIIIA and line XXVIIIC—XXVIIIC, the width of the thick portion of the dielectric buffer layer 5 corresponds to the sum of one and a half of a width of each the straight arm optical modulator portion 4 and the above distance between the two straight arm optical modulator portions 4. On the X-coordinate, the slopes between the thin portion and the thick portion are positioned inside from the outside edges of the two straight arm optical modulator portions 4 by a quarter of the width of each the straight arm optical modulator portion 4.

As the position on the Y-coordinate moves from line XXVIIIA—XXVIIIA to line XXVIIIC—XXVIIIC, the width of the thick portion of the dielectric buffer layer 5 is linearly and proportionally decreased as well illustrated in FIG. 27. Further, as the position on the Y-coordinate moves from line XXVIIIC—XXVIIIC to the boundary between the two straight arm optical modulator portions 4 and the Y-shaped optical coupler portion 3, the width of the thin portion of the dielectric buffer layer 5 is linearly and proportionally increased to the same value as at line XXVIIIA—XXVIIIA as well illustrated in FIG. 27.

The shapes in the plane view of the thin portion and the thick portion of the dielectric buffer layer 5 are symmetrical both in the X-direction and the Y-direction. Namely, a profile of variation in the thickness of the dielectric buffer layer 5 are symmetrical both in the X-direction and the Y-direction.

In this embodiment, a coplanar waveguide type electrode structure is selectively provided on the dielectric buffer layer 5, although other electrodes structures may be provided such as asymmetric coplanar strip type electrode structure and asymmetric strip line type electrode structure. The coplanar waveguide type electrode structure comprises a signal electrode 6 and two ground electrodes 7.

Here, a first one of the two straight arm optical modulator portions 4 is defined as having a larger value on the X-coordinate, while a second one of the two straight arm optical modulator portions 4 is defined as having a smaller value on the X-coordinate.

The signal electrode 6 extends in the Y-direction and over the dielectric buffer layer 5 over the first one of the two straight arm optical modulator portions 4 so that the signal electrode 6 entirely covers in the plane view the first one of the two straight arm optical modulator portions 4. The signal electrode 6 further extends in the X-direction toward the lower position on the X-coordinate and over the Y-shaped optical divider portion 2 and the Y-shaped optical coupler portion 3 so that the signal electrode 6 is coupled with connector packages 8 at the lower position on the X-coordinate than the position of the second one of the two straight arm optical modulator portions 4. The signal electrode 6 has a width in the range of 5–20 micrometers and a length in the range of 10–70 millimeters as well as a thickness of 3–40 micrometers. Since the signal electrode 6 extends over the dielectric buffer layer 5 varying in the thickness, the signal electrode 6 also has a slope. Since, however, the thickness of the signal electrode 6 is much greater than the thickness of the dielectric buffer layer 5, for which reason the slope of the signal electrode 6 provides substantially no effect to the electric field applied by the signal electrode 6.

A first one of the two ground electrodes 7 extends over the dielectric buffer layer 5 over the second one of the two straight arm optical modulator portions 4 so that the first one of the two ground electrodes 7 entirely covers in the plane view the second one of the two straight arm optical modulator portions 4. The first one of the two ground electrodes 7 further extends over the dielectric buffer layer 5 over the crystal substrate 1 on lower regions on the X-coordinate than and outside the second one of the two straight arm optical modulator portions 4. The first one of the two ground electrodes 7 is separated in the plane view from the signal electrode 6 at a distance or gap in the range of 5–200 micrometers.

A second one of the two ground electrodes 7 extends over the dielectric buffer layer 5 so that the second one of the two ground electrodes 7 is positioned outside the signal electrode 6 but separated in the plane view from the signal electrode 6 at a distance or gap in the range of 5–200 micrometers. The distance of the two ground electrodes 7 from the signal electrode 6 is determined so that a ratio of the width of the signal electrode 6 to the distance is in the range of 1–0.1, wherein the width of the signal electrode 6 is in the range of 5–20 micrometers as described above.

The ground electrode 7 has a width in the range of 100–9000 micrometers, a length in the range of 10–70 millimeters and a thickness in the range of 3–40 micrometers.

A microwave is applied through the connector package 8 to the signal electrode 6.

For the above Mach-Zehnder optical modulator, it was confirmed that the effect by a thinner portion of the dielectric buffer layer 5 for increasing the overlap integral of the electric field profile and the optical mode field profile exceeds the effect by a thinner portion of the dielectric buffer layer 5 for reducing the overlap integral. Namely, the effect by the thinner portion of the dielectric buffer layer 5 for reducing the driving voltage exceeds the effect by the thinner portion thereof for increasing the driving voltage. In order to drop the driving voltage, it is more effective to very the thickness of the dielectric buffer layer than keeping the dielectric buffer layer at an averaged thickness which is calculated by averaging those varied thicknesses of the dielectric buffer layer.

It was also confirmed that the effect by the thicker portion of the dielectric buffer layer 5 for reducing the difference of the effective microwave refractive index from the optical wave refractive index exceeds the opposite effect by the thinner portion of the dielectric buffer layer for increasing the difference of the effective microwave refractive index from the optical wave refractive index. Namely, the effect by the thicker portion of the dielectric buffer layer 5 for widening the bandwidth exceeds the opposite effect by the thinner portion of the dielectric buffer layer 5 for narrowing the bandwidth. In order to widen the bandwidth, it is more effective to very the thickness of the dielectric buffer layer than keeping the dielectric buffer layer at an averaged thickness which is calculated by averaging those varied thicknesses of the dielectric buffer layer.

Consequently, in order to drop the driving voltage and widen the bandwidth concurrently, it is more effective to very the thickness of the dielectric buffer layer than keeping the dielectric buffer layer at the averaged thickness which is calculated by averaging those varied thicknesses of the dielectric buffer layer. For above Mach-Zehnder optical modulator, both the above requirements for obtaining considerable reduction in the driving voltage and keeping much wider bandwidth could be satisfied.

FIG. 14 is a diagram of driving voltage and characteristic impedance of a novel Mach-Zehnder optical modulator in accordance with the present invention as compared to the conventional Mach-Zehnder optical modulator. "Type 2" represents the novel Mach-Zehnder optical modulator having the dielectric buffer layer 5 varying in thickness while "Type 1" represents the conventional Mach-Zehnder optical modulator having the dielectric buffer layer 5 remaining unchanged in thickness. The driving voltage of the novel Mach-Zehnder optical modulator is about 2.8 V which is much lower than the driving voltage of 3.4 V of the conventional Mach-Zehnder optical modulator. Namely, the driving voltage of the novel Mach-Zehnder optical modulator is reduced by 18% from that of the conventional one. The characteristic impedance of the novel Mach-Zehnder optical modulator can be kept in the range of 46–48Ω which is lower by only 2–4Ω or about 4–8% than 50Ω of the conventional Mach-Zehnder optical modulator.

The subject matter of the present invention in the above described embodiment can be applicable to the other optical devices such as other optical modulator or optical switches utilizing the phase shift phenomenon.

The above dielectric buffer layer 5 can be prepared by optional use of selective wet and dry etching processes in combination with masking work.

Ninth Embodiment

Figure 30A:
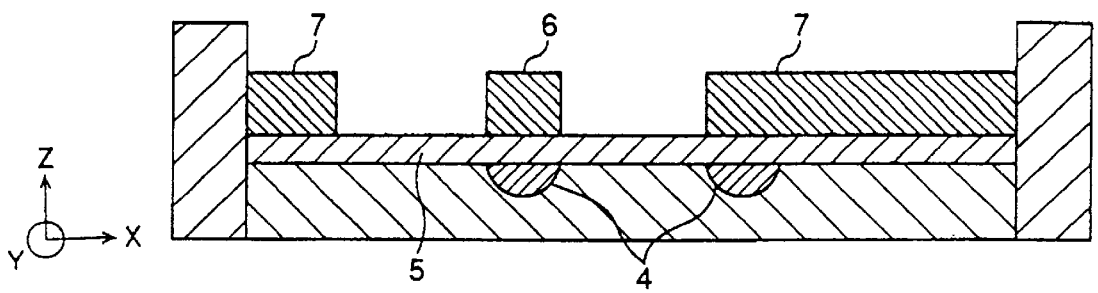
FIG. 30A is a cross sectional elevation view illustrative of a novel Mach-Zehnder optical modulator taken along XXXA—XXXA in FIG. 29 in a ninth embodiment in accordance with the present invention.
Figure 30B:
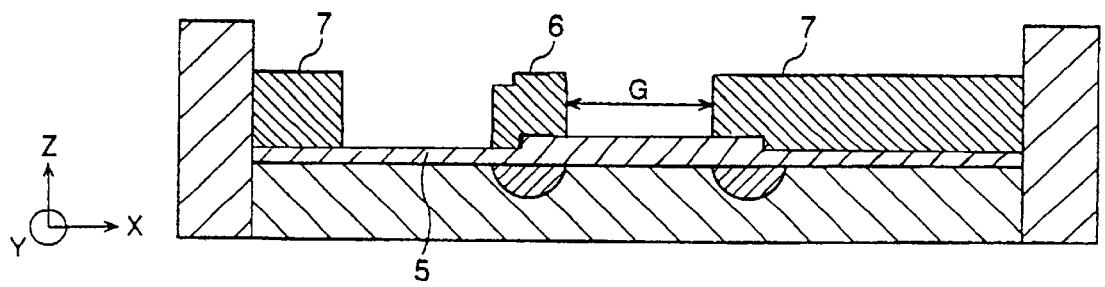
FIG. 30B is a cross sectional elevation view illustrative of a novel Mach-Zehnder optical modulator taken along XXXB—XXXB in FIG. 29 in a ninth embodiment in accordance with the present invention.
Figure 30C:
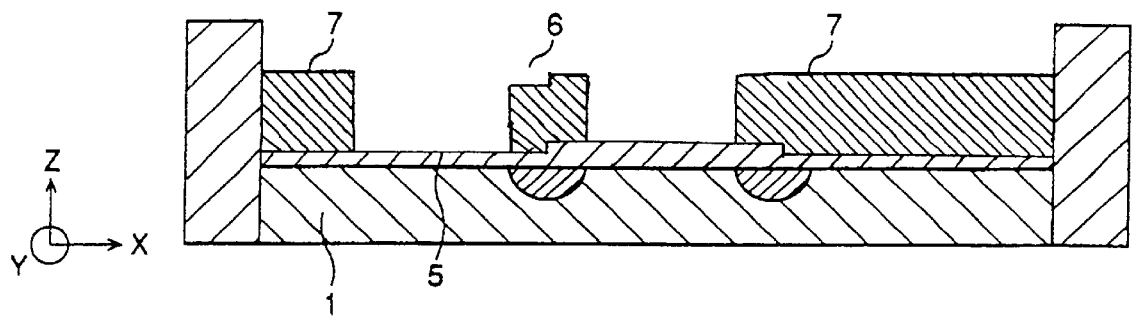
FIG. 30C is a cross sectional elevation view illustrative of a novel Mach-Zehnder optical modulator taken along XXXC—XXXC in FIG. 29 in a ninth embodiment in accordance with the present invention.

A ninth embodiment according to the present invention will be described in detail with reference to FIGS. 29, 30A, 30B and 30C. FIG. 29 is a plane view illustrative of a novel Mach-Zehnder optical modulator including an improved dielectric buffer layer which varies in thickness. FIG. 30A is a cross sectional elevation view illustrative of a novel Mach-Zehnder optical modulator taken along line XXXA—XXXA in FIG. 295. FIG. 30B is a cross sectional elevation view illustrative of a novel Mach-Zehnder optical modulator taken along line XXXB—XXXB in FIG. 29. FIG. 30C is a cross sectional elevation view illustrative of a novel Mach-Zehnder optical modulator taken along line XXXC—XXXC in FIG. 29.

A crystal substrate 1, for example, a LiNbO$_3$ substrate was prepared which is capable of causing electro-optical effects. A titanium film strip was formed on a top surface of the crystal substrate 1, wherein the titanium film strip comprises two straight arms and two Y-shaped portions coupled to opposite sides of the two straight arms. The titanium film strip has a width of 5–20 micrometers and a thickness of 500–1200 angstroms. The crystal substrate 1 was then subjected to a heat treatment at a temperature in the range of 900° C. to 1000° C. for 5–12 hours to cause a diffusion of titanium in the titanium film strip into an upper region of the crystal substrate 1 to form a titanium-diffused optical waveguide in the upper region of the crystal substrate 1. The titanium-diffused optical waveguide comprises a Y-shaped optical divider portion 2, two straight arm optical modulator portions 4 coupled to the Y-shaped optical divider portion 2, and a Y-shaped optical coupler portion 3 coupled to the two straight arm optical modulator portions 4. Optical fiber mounts 9 are provided at opposite end portions of the titanium-diffused optical waveguide so that the Y-shaped optic-al divider portion 2 and the Y-shaped optical coupler portion 3 are coupled via the optical fiber mounts 9 to optical fibers. The top surface of the titanium-diffused optical waveguide has the same level as the top surface of the crystal substrate 1 to form a flat surface. A dielectric buffer layer 5, for example, SiO$_2$ buffer layer is provided entirely on the flat surface so that the dielectric buffer layer 5 extends over the optical waveguide and the crystal substrate 1. The dielectric buffer layer 5 varies in thickness in the range of 1–10 micrometers. The dielectric buffer layer 5 has a dielectric constant in the range of 1.1–40.

The dielectric buffer layer 5 is discontinuously reduced in thickness to form a thin portion and a thick portion, both of which are bounded by a step. A thickness of the thin portion is a half of a thickness of the thick portion. The thick portion is selectively provided on the two straight arm optical modulator portions 4 of the titanium-diffused optical waveguide and extends over the top surface of the crystal substrate 1 between the two straight arm optical modulator portions 4. The position of the step on an X-coordinate remains unchanged in a Y-direction. Here, a width of the thin portion of the dielectric buffer layer 5 is defined as a horizontal size of the thin portion on the X-coordinate or in the X-direction. The width of the thick portion of the dielectric buffer layer 5 remains unchanged in the Y-direction.

With reference to FIGS. 29 and 30A, on the Y-coordinate at a position just inside line XXXA—XXXA including a boundary between the two straight arm optical modulator portions 4 and the Y-shaped optical divider portion 2, no thin portion of the dielectric buffer layer 5 exists. No step between the thin portion and the thick portion is then formed.

With reference to FIGS. 29 and 30C, on line XXXC—XXXC including center positions on the Y-coordinate of the straight arm optical modulator portions 4, the width of the thick portion of the dielectric buffer layer 5 corresponds to the sum of a width of each the straight arm optical modulator portion 4 and a distance between the two straight arm optical modulator portions 4. The steps between the thick portion and the thin portion are positioned at center positions on the X-coordinate of the two straight arm optical modulator portions 4.

With reference to FIGS. 29 and 30B, on line XXXB—XXXB extending in parallel to line XXXA—XXXA and line XXXC—XXXC and positioned on the Y-coordinate at a center between line XXXA—XXXA and line XXXC—XXXC, the width of the thick portion of the dielectric buffer layer 5 corresponds to the sum of a width of each the straight arm optical modulator portion 4 and a distance between the two straight arm optical modulator portions 4. The steps between the thick portion and the thin portion are positioned at center positions on the X-coordinate of the two straight arm optical modulator portions 4.

The width of the thick portion of the dielectric buffer layer 5 remains unchanged as well illustrated in FIG. 29.

The shapes in the plane view of the thin portion and the thick portion of the dielectric buffer layer 5 are symmetrical both in the X-direction and the Y-direction. Namely, a profile of variation in the thickness of the dielectric buffer layer 5 are symmetrical both in the X-direction and the Y-direction.

In this embodiment, a coplanar waveguide type electrode structure is selectively provided on the dielectric buffer layer 5, although other electrodes structures may be provided such as asymmetric coplanar strip type electrode structure and asymmetric strip line type electrode structure. The coplanar waveguide type electrode structure comprises a signal electrode 6 and two ground electrodes 7.

Here, a first one of the two straight arm optical modulator portions 4 is defined as having a larger value on the X-coordinate, while a second one of the two straight arm optical modulator portions 4 is defined as having a smaller value on the X-coordinate.

The signal electrode 6 extends in the Y-direction and over the dielectric buffer layer 5 over the first one of the two straight arm optical modulator portions 4 so that the signal electrode 6 entirely covers in the plane view the first one of the two straight arm optical modulator portions 4. The signal electrode 6 further extends in the X-direction toward the lower position on the X-coordinate and over the Y-shaped optical divider portion 2 and the Y-shaped optical coupler portion 3 so that the signal electrode 6 is coupled with connector packages 8 at the lower position on the X-coordinate than the position of the second one of the two straight arm optical modulator portions 4. The signal electrode 6 has a width in the range of 5–20 micrometers and a length in the range of 10–70 millimeters as well as a thickness of 3–40 micrometers. Since the signal electrode 6 extends over the dielectric buffer layer 5 varying in the thickness, the signal electrode 6 also has a step. Since, however, the thickness of the signal electrode 6 is much greater than the thickness of the dielectric buffer layer 5, for which reason the step of the signal electrode 6 provides substantially no effect to the electric field applied by the signal electrode 6.

A first one of the two ground electrodes 7 extends over the dielectric buffer layer 5 over the second one of the two straight arm optical modulator portions 4 so that the first one of the two ground electrodes 7 entirely covers in the plane view the second one of the two straight arm optical modulator portions 4. The first one of the two ground electrodes 7 further extends over the dielectric buffer layer 5 over the crystal substrate 1 on lower regions on the X-coordinate than and outside the second one of the two straight arm optical modulator portions 4. The first one of the two ground electrodes 7 is separated in the plane view from the signal electrode 6 at a distance or gap in the range of 5–200 micrometers.

A second one of the two ground electrodes 7 extends over the dielectric buffer layer 5 so that the second one of the two ground electrodes 7 is positioned outside the signal electrode 6 but separated in the plane view from the signal electrode 6 at a distance or gap in the range of 5–200 micrometers. The distance of the two ground electrodes 7 from the signal electrode 6 is determined so that a ratio of the width of the signal electrode 6 to the distance is in the range of 1–0.1, wherein the width of the signal electrode 6 is in the range of 5–20 micrometers as described above.

The ground electrode 7 has a width in the range of 100–9000 micrometers, a length in the range of 10–70 millimeters and a thickness in the range of 3–40 micrometers.

A microwave is applied through the connector package 8 to the signal electrode 6.

For the above Mach-Zehnder optical modulator, it was confirmed that the effect by a thinner portion of the dielectric buffer layer 5 for increasing the overlap integral of the electric field profile and the optical mode field profile exceeds the effect by a thinner portion of the dielectric buffer layer 5 for reducing the overlap integral. Namely, the effect by the thinner portion of the dielectric buffer layer 5 for reducing the driving voltage exceeds the effect by the thinner portion thereof for increasing the driving voltage. In order to drop the driving voltage, it is more effective to very the thickness of the dielectric buffer layer than keeping the dielectric buffer layer at an averaged thickness which is calculated by averaging those varied thicknesses of the dielectric buffer layer.

It was also confirmed that the effect by the thicker portion of the dielectric buffer layer 5 for reducing the difference of the effective microwave refractive index from the optical wave refractive index exceeds the opposite effect by the thinner portion of the dielectric buffer layer for increasing the difference of the effective microwave refractive index from the optical wave refractive index. Namely, the effect by the thicker portion of the dielectric buffer layer 5 for widening the bandwidth exceeds the opposite effect by the thinner portion of the dielectric buffer layer 5 for narrowing the bandwidth. In order to widen the bandwidth, it is more effective to very the thickness of that dielectric buffer layer than keeping the dielectric buffer layer at an averaged thickness which is calculated by averaging those varied thicknesses of the dielectric buffer layer.

Consequently, in order to drop the driving voltage and widen the bandwidth concurrently, it is more effective to very the thickness of the dielectric buffer layer than keeping the dielectric buffer layer at the averaged thickness which is calculated by averaging those varied thicknesses of the dielectric buffer layer. For above Mach-Zehnder optical modulator, both the above requirements for obtaining considerable reduction in the driving voltage and keeping much wider bandwidth could be satisfied.

The subject matter of the present invention in the above described embodiment can be applicable to the other optical devices such as other optical modulator or optical switches utilizing the phase shift phenomenon.

The above dielectric buffer layer 5 can be prepared by optional use of selective wet and dry etching processes in combination with masking work.

Tenth Embodiment

Figure 32A:
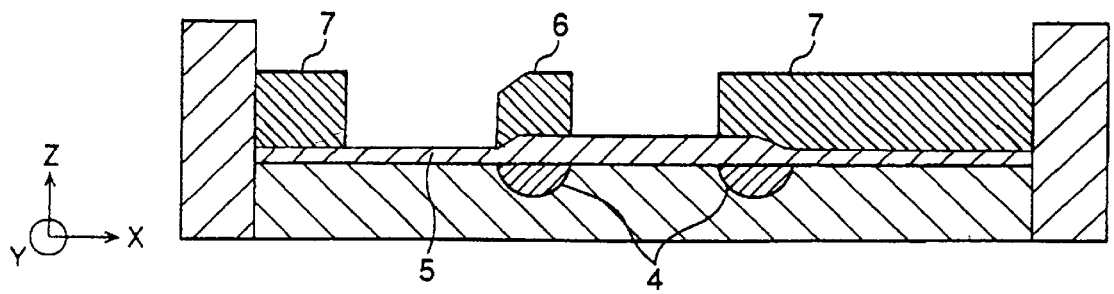
FIG. 32A is a cross sectional elevation view illustrative of a novel Mach-Zehnder optical modulator taken along XXXIIA—XXXIIA in FIG. 31 in a tenth embodiment in accordance with the present invention.
Figure 32B:
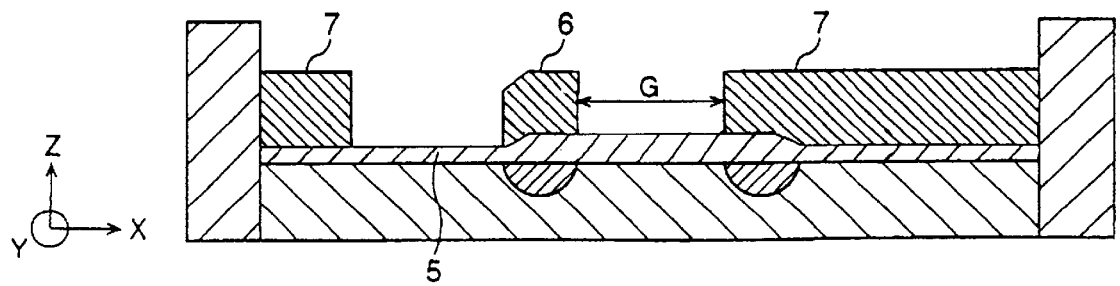
FIG. 32B is a cross sectional elevation view illustrative of a novel Mach-Zehnder optical modulator taken along XXXIIB—XXXIIB in FIG. 31 in a tenth embodiment in accordance with the present invention.
Figure 32C:
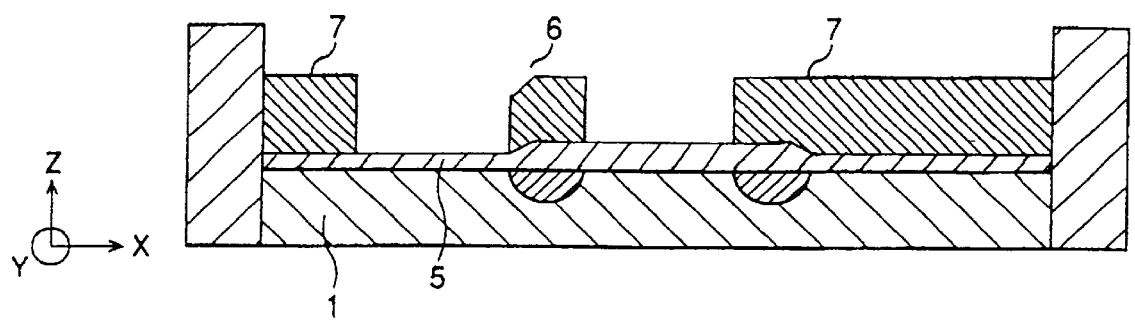
FIG. 32C is a cross sectional elevation view illustrative of a novel Mach-Zehnder optical modulator taken along XXXIIC—XXXIIC in FIG. 31 in a tenth embodiment in accordance with the present invention.

A tenth embodiment according to the present invention will be described in detail with reference to FIGS. 31, 32A, 32B and 32C. FIG. 31 is a plane view illustrative of a novel Mach-Zehnder optical modulator including an improved dielectric buffer layer which varies in thickness. FIG. 32A is a cross sectional elevation view illustrative of a novel Mach-Zehnder optical modulator taken along line XXXIIA—XXXIIA in FIG. 31. FIG. 32B is a cross sectional elevation view illustrative of a novel Mach-Zehnder optical modulator taken along line XXXIIB—XXXIIB in FIG. 31. FIG. 32C is a cross sectional elevation view illustrative of a novel Mach-Zehnder optical modulator taken along line XXXIIC—XXXIIC in FIG. 31.

A crystal substrate 1, for example, a $LiNbO_3$ substrate was prepared which is capable of causing electro-optical effects. A titanium film strip was formed on a top surface of the crystal substrate 1, wherein the titanium film strip comprises two straight arms and two Y-shaped portions coupled to opposite sides of the two straight arms. The titanium film strip has a width of 5–20 micrometers and a thickness of 500–1200 angstroms. The crystal substrate 1 was then subjected to a heat treatment at a temperature in the range of 900° C. to 1000° C. for 5–12 hours to cause a diffusion of titanium in the titanium film strip into an upper region of the crystal substrate 1 to form a titanium-diffused optical waveguide in the upper region of the crystal substrate 1. The titanium-diffused optical waveguide comprises a Y-shaped optical divider portion 2, two straight arm optical modulator portions 4 coupled to the Y-shaped optical divider portion 2, and a Y-shaped optical coupler portion 3 coupled to the two straight arm optical modulator portions 4. Optical fiber mounts 9 are provided at opposite end portions of the titanium-diffused optical waveguide so that the Y-shaped optical divider portion 2 and the Y-shaped optical coupler portion 3 are coupled via the optical fiber mounts 9 to optical fibers. The top surface of the titanium-diffused optical waveguide has the same level as the top surface of the crystal substrate 1 to form a flat surface. A dielectric buffer layer 5. For example, $SiO_2$ buffer layer is provided entirely on the flat surface so that the dielectric buffer layer 5 extends over the optical waveguide and the crystal substrate 1. The dielectric buffer layer 5 varies in thickness in the range of 1–10 micrometers. The dielectric buffer layer 5 has a dielectric constant in the range of 1.1–40.

The dielectric buffer layer 5 is continuously reduced in thickness to form a thin portion and a thick portion, both of which are bounded by a slope. A thickness of the thin portion is a half of a thickness of the thick portion. The thick portion is selectively provided on the two straight arm optical modulator portions 4 of the titanium-diffused optical waveguide and extends over the top surface of the crystal substrate 1 between the two straight arm optical modulator portions 4. The position of the slope on an X-coordinate remains unchanged in a Y-direction. Here, a width of the thin portion of the dielectric buffer layer 5 is defined as a horizontal size of the thick portion on the X-coordinate or in the X-direction. The width of the thick portion of the dielectric buffer layer 5 remains unchanged in the Y-direction.

With reference to FIGS. 31 and 32A, on the Y-coordinate at a position just inside line XXXIIA—XXXIIA including a boundary between the two straight arm optical modulator portions 4 and the Y-shaped optical divider portion 2, the width of the thick portion of the dielectric buffer layer 5 corresponds to the sum of a width of each the straight arm optical modulator portion 4 and the above distance between the two straight arm optical modulator portions 4. The boundaries between the slopes and the thick portion are positioned at center positions on the X-coordinate of the two straight arm optical modulator portions 4.

With reference to FIGS. 31 and 32C, on line XXXIIC—XXXIIC including center positions on the Y-coordinate of the straight arm optical modulator portions 4, the width of the thick portion of the dielectric buffer layer 5 corresponds to the sum of a width of each the straight arm optical modulator portion 4 and a distance between the two straight arm optical modulator portions 4. The boundaries between the thick portion and the slopes are positioned at center positions on the X-coordinate of the two straight arm optical modulator portions 4.

With reference to FIGS. 31 and 32B, on line XXXIIB—XXXIIB extending in parallel to line XXXIIA—XXXIIA and line XXXIIC—XXXIIC and positioned on the Y-coordinate at a center between line XXXIIA—XXXIIA and line XXXIIC—XXXIIC, the width of the thick portion of the dielectric buffer layer 5 corresponds to the sum of a width of each the straight arm optical modulator portion 4 and a distance between the two straight arm optical modulator portions 4. The boundaries between the thick portion and the slopes are positioned at center positions on the X-coordinate of the two straight arm optical modulator portions 4.

As the position on the Y-coordinate moves from line XXXIIA—XXXIIA to line XXXIIC—XXXIIC, the width of the thick portion of the dielectric buffer layer 5 remains unchanged as well illustrated in FIG. 31. Further, as the position on the Y-coordinate moves from line XXXIIC—XXXIIC to the boundary between the two straight arm optical modulator portions 4 and the Y-shaped optical coupler portion 3, the width of the thin portion of the dielectric buffer layer 5 also remains unchanged.

The shapes in the plane view of the thin portion and the thick portion of the dielectric buffer layer 5 are symmetrical both in the X-direction and the Y-direction. Namely, a profile of variation in the thickness of the dielectric buffer layer 5 are symmetrical both in the X-direction and the Y-direction.

In this embodiment, a coplanar waveguide type electrode structure is selectively provided on the dielectric buffer layer 5, although other electrodes structures may be provided such as asymmetric coplanar strip type electrode structure and asymmetric strip line type electrode structure. The coplanar waveguide type electrode structure comprises a signal electrode 6 and two ground electrodes 7.

Here, a first one of the two straight arm optical modulator portions 4 is defined as having a larger value on the X-coordinate, while a second one of the two straight arm optical modulator portions 4 is defined as having a smaller value on the X-coordinate.

The signal electrode 6 extends in the Y-direction and over the dielectric buffer layer 5 over the first one of the two straight arm optical modulator portions 4 so that the signal electrode 6 entirely covers in the plane view the first one of the two straight arm optical modulator portions 4. The signal electrode 6 further extends in the X-direction toward the lower position on the X-coordinate and over the Y-shaped optical divider portion 2 and the Y-shaped optical coupler portion 3 so that the signal electrode 6 is coupled with connector packages 8 at the lower position on the X-coordinate than the position of the second one of the two straight arm optical modulator portions 4. The signal electrode 6 has a width in the range of 5–20 micrometers and a length in the range of 10–70 millimeters as well as a thickness of 3–40 micrometers. Since the signal electrode 6 extends over the dielectric buffer layer 5 varying in the thickness, the signal electrode 6 also has a slope. Since, however, the thickness of the signal electrode 6 is much greater than the thickness of the dielectric buffer layer 5, for which reason the slope of the signal electrode 6 provides substantially no effect to the electric field applied by the signal electrode 6.

A first one of the two ground electrodes 7 extends over the dielectric buffer layer 5 over the second one of the two straight arm optical modulator portions 4 so that the first one of the two ground electrodes 7 entirely covers in the plane view the second one of the two straight arm optical modulator portions 4. The first one of the two ground electrodes 7 further extends over the dielectric buffer layer 5 over the crystal substrate 1 on lower regions on the X-coordinate than and outside the second one of the two straight arm optical modulator portions 4. The first one of the two ground electrodes 7 is separated in the plane view from the signal electrode 6 at a distance or gap in the range of 5–200 micrometers.

A second one of the two ground electrodes 7 extends over the dielectric buffer layer 5 so that the second one of the two ground electrodes 7 is positioned outside the signal electrode 6 but separated in the plane view from the signal electrode 6 at a distance or gap in the range of 5–200 micrometers. The distance of the two ground electrodes 7 from the signal electrode 6 is determined so that a ratio of the width of the signal electrode 6 to the distance is in the range of 1–0.1, wherein the width of the signal electrode 6 is in the range of 5–20 micrometers as described above.

The ground electrode 7 has a width in the range of 100–9000 micrometers, a length in the range of 10–70 millimeters and a thickness in the range of 3–40 micrometers.

A microwave is applied through the connector package 8 to the signal electrode 6.

For the above Mach-Zehnder optical modulator, it was confirmed that the effect by a thinner portion of the dielectric buffer layer 5 for increasing the overlap integral of the electric field profile and the optical mode field profile exceeds the effect by a thinner portion of the dielectric buffer layer 5 for reducing the overlap integral. Namely, the effect by the thinner portion of the dielectric buffer layer 5 for reducing the driving voltage exceeds the effect by the thinner portion thereof for increasing the driving voltage. In order to drop the driving voltage, it is more effective to very the thickness of the dielectric buffer layer than keeping the dielectric buffer layer at an averaged thickness which is calculated by averaging those varied thicknesses of the dielectric buffer layer.

It was also confirmed that the effect by the thicker portion of the dielectric buffer layer 5 for reducing the difference of the effective microwave refractive index from the optical wave refractive index exceeds the opposite effect by the thinner portion of the dielectric buffer layer for increasing the difference of the effective microwave refractive index from the optical wave refractive index. Namely, the effect by the thicker portion of the dielectric buffer layer 5 for widening the bandwidth exceeds the opposite effect by the thinner portion of the dielectric buffer layer 5 for narrowing the bandwidth. In order to widen the bandwidth, it is more effective to very the thickness of the dielectric buffer layer than keeping the dielectric buffer layer at an averaged thickness which is calculated by averaging those varied thicknesses of the dielectric buffer layer.

Consequently, in order to drop the driving voltage and widen the bandwidth concurrently, it is more effective to very the thickness of the dielectric buffer layer than keeping the dielectric buffer layer at the averaged thickness which is calculated by averaging those varied thicknesses of the dielectric buffer layer. For above Mach-Zehnder optical modulator, both the above requirements for obtaining considerable reduction in the driving voltage and keeping much wider bandwidth could be satisfied.

FIG. 14 is a diagram of driving voltage and characteristic impedance of a novel Mach-Zehnder optical modulator in accordance with the present invention as compared to the conventional Mach-Zehnder optical modulator. "Type 2" represents the novel Mach-Zehnder optical modulator having the dielectric buffer layer 5 varying in thickness while "Type 1" represents the conventional Mach-Zehnder optical modulator having the dielectric buffer layer 5 remaining unchanged in thickness. The driving voltage of the novel Mach-Zehnder optical modulator is about 2.8 V which is much lower than the driving voltage of 3.4 V of the conventional Mach-Zehnder optical modulator. Namely, the driving voltage of the novel Mach-Zehnder optical modulator is reduced by 18% from that of the conventional one. The characteristic impedance of the novel Mach-Zehnder optical modulator can be kept in the range of 46–48Ω which is lower by only 2–4Ω or about 4–8% than 50Ω of the conventional Mach-Zehnder optical modulator.

The subject matter of the present invention in the above described embodiment can be applicable to the other optical devices such as other optical modulator or optical switches utilizing the phase shift phenomenon.

The above dielectric buffer layer 5 can be prepared by optional use of selective wet and dry etching processes in combination with masking work.

Eleventh Embodiment

Figure 33:
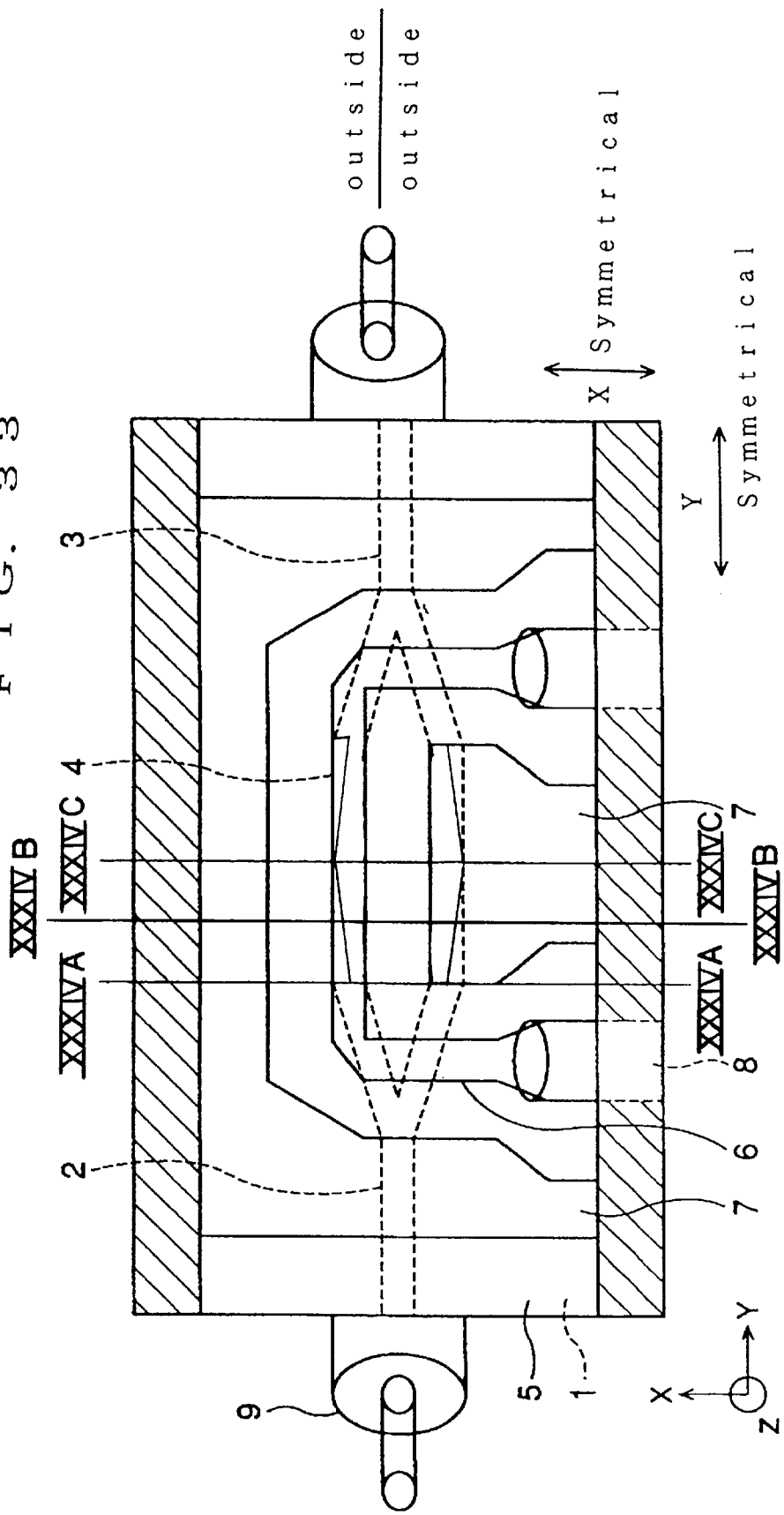
FIG. 33 is a plane view illustrative of a novel Mach-Zehnder optical modulator including an improved dielectric buffer layer which varies in thickness in an eleventh embodiment in accordance with the present invention.
Figure 34A:
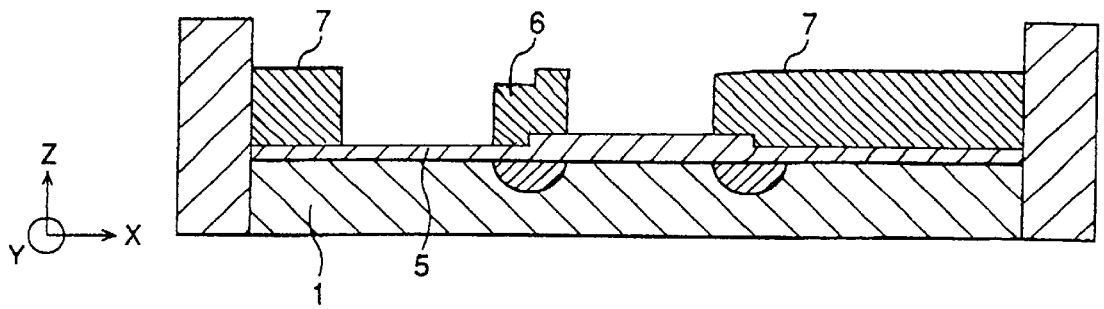
FIG. 34A is a cross sectional elevation view illustrative of a novel Mach-Zehnder optical modulator taken along XXXIVA—XXXIVA in FIG. 33 in an eleventh embodiment in accordance with the present invention.
Figure 34B:
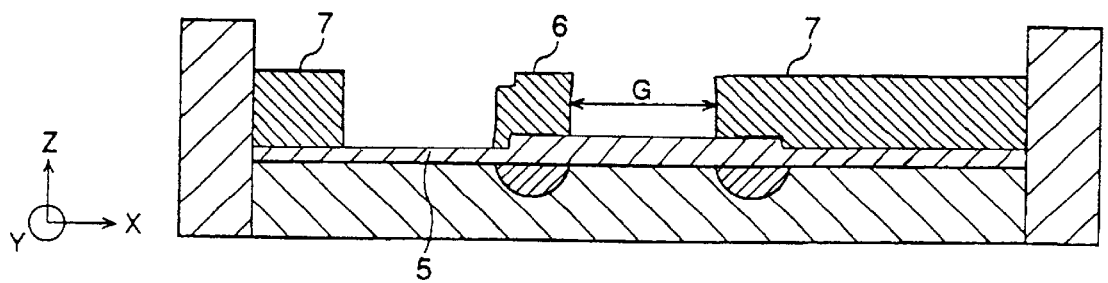
FIG. 34B is a cross sectional elevation view illustrative of a novel Mach-Zehnder optical modulator taken along XXXIVB—XXXIVB in FIG. 33 in an eleventh embodiment in accordance with the present invention.

An eleventh embodiment according to the present invention will be described in detail with reference to FIGS. 33, 34A, 34B and 34C. FIG. 33 is a plane view illustrative of a novel Mach-Zehnder optical modulator including an improved dielectric buffer layer which varies in thickness. FIG. 34A is a cross sectional elevation view illustrative of a novel Mach-Zehnder optical modulator taken along line XXXIVA—XXXIVA in FIG. 33. FIG. 34B is a cross sectional elevation view illustrative of a novel Mach-Zehnder optical modulator taken along line XXXIVB—XXXIVB in FIG. 33. FIG. 34C is a cross sectional elevation view illustrative of a novel Mach-Zehnder optical modulator taken along line XXXIVC—XXXIVC in FIG. 33.

A crystal substrate 1, for example, a LiNbO$_3$ substrate was prepared which is capable of causing electro-optical effects. A titanium film strip was formed on a top surface of the crystal substrate 1, wherein the titanium film strip comprises two straight arms and two Y-shaped portions coupled to opposite sides of the two straight arms. The titanium film strip has a width of 5–20 micrometers and a thickness of 500–1200 angstroms. The crystal substrate 1 was then subjected to a heat treatment at a temperature in the range of 900° C. to 1000° C. for 5–12 hours to cause a diffusion of titanium in the titanium film strip into an upper region of the crystal substrate 1 to form a titanium-diffused optical waveguide in the upper region of the crystal substrate 1. The titanium-diffused optical waveguide comprises a Y-shaped optical divider portion 2, two straight arm optical modulator portions 4 coupled to the Y-shaped optical divider portion 2, and a Y-shaped optical coupler portion 3 coupled to the two straight arm optical modulator portions 4. Optical fiber mounts 9 are provided at opposite end portions of the titanium-diffused optical waveguide so that the Y-shaped optical divider portion 2 and the Y-shaped optical coupler portion 3 are coupled via the optical fiber mounts 9 to optical fibers. The top surface of the titanium-diffused optical waveguide has the same level as the top surface of the crystal substrate 1 to form a flat surface. A dielectric buffer layer 5, for example, SiO$_2$ buffer layer is provided entirely on the flat surface so that the dielectric buffer layer 5 extends over the optical waveguide and the crystal substrate 1. The dielectric buffer layer 5 varies in thickness in the range of 1–10 micrometers. The dielectric buffer layer 5 has a dielectric constant in the range of 1.1–40.

The dielectric buffer layer 5 is discontinuously reduced in thickness to form a thin portion and a thick portion, both of which are bounded by a step. A thickness of the thin portion is a half of a thickness of the thick portion. The thick portion is selectively provided on the two straight arm optical modulator portions 4 of the titanium-diffused optical waveguide and extends over the top surface of the crystal substrate 1 between the two straight arm optical modulator portions 4. The position of the step on an X-coordinate is linearly and proportionally varied in a Y-direction. Here, a width of the thin portion of the dielectric buffer layer 5 is defined as a horizontal size of the thin portion on the X-coordinate or in the X-direction. The width of the thick portion of the dielectric buffer layer 5 is thus linearly and proportionally varied in the Y-direction.

With reference to FIGS. 33 and 34A, on the Y-coordinate at a position just inside line XXXIVA—XXXIVA including a boundary between the two straight arm optical modulator portions 4 and the Y-shaped optical divider portion 2, the width of the thick portion of the dielectric buffer layer 5 corresponds to the sum of a width of each the straight arm optical modulator portion 4 and a distance between the two straight arm optical modulator portions 4. The steps between the thick portion and the thin portion are positioned at center positions on the X-coordinate of the two straight arm optical modulator portions 4.

With reference to FIGS. 33 and 34C, on line XXXIVC—XXXIVC including center positions on the Y-coordinate of the straight arm optical modulator portions 4, the width of the thick portion of the dielectric buffer layer 5 corresponds to the sum of widths of the two straight arm optical modulator portions 4 and the above distance between the two straight arm optical modulator portions 4. The steps between the thin portion and the thick portion are positioned at the outside edges of the two straight arm optical modulator portions 4.

With reference to FIGS. 33 and 34B, on line XXXIVB—XXXIVB extending in parallel to line XXXIVA—XXXIVA and line XXXIVC—XXXIVC and positioned on the Y-coordinate at a center between line XXXIVA—XXXIVA and line XXXIVC—XXXIVC, the width of the thick portion of the dielectric buffer layer 5 corresponds to the sum of one and a half of a width of each the straight arm optical modulator portion 4 and the above distance between the two straight arm optical modulator portions 4. On the X-coordinate, the steps between the thin portion and the thick portion are positioned inside from the outside edges of the two straight arm optical modulator portions 4 by a quarter of the width of each the straight arm optical modulator portion 4.

As the position on the Y-coordinate moves from line XXXIVA—XXXIVA to line XXXIVC—XXXIVC, the width of the thick portion of the dielectric buffer layer 5 is linearly and proportionally increased as well illustrated in FIG. 33. Further, as the position on the Y-coordinate moves from line XXXIVC—XXXIVC to the boundary between the two straight arm optical modulator portions 4 and the Y-shaped optical coupler portion 3, the width of the thin portion of the dielectric buffer layer 5 is linearly and proportionally decreased to the same value as at line XXXIVA—XXXIVA as well illustrated in FIG. 33.

The shapes in the plane view of the thin portion and the thick portion of the dielectric buffer layer 5 are symmetrical both in the X-direction and the Y-direction. Namely, a profile of variation in the thickness of the dielectric buffer layer 5 are symmetrical both in the X-direction and the Y-direction.

In this embodiment, a coplanar waveguide type electrode structure is selectively provided on the dielectric buffer layer 5, although other electrodes structures may be provided such as asymmetric coplanar strip type electrode structure and asymmetric strip line type electrode structure. The coplanar waveguide type electrode structure comprises a signal electrode 6 and two ground electrodes 7.

Here, a first one of the two straight arm optical modulator portions 4 is defined as having a larger value on the X-coordinate, while a second one of the two straight arm optical modulator portions 4 is defined as having a smaller value on the X-coordinate.

The signal electrode 6 extends in the Y-direction and over the dielectric buffer layer 5 over the first one of the two straight arm optical modulator portions 4 so that the signal electrode 6 entirely covers in the plane view the first one of the two straight arm optical modulator portions 4. The signal electrode 6 further extends in the X-direction toward the lower position on the X-coordinate and over the Y-shaped optical divider portion 2 and the Y-shaped optical coupler portion 3 so that the signal electrode 6 is coupled with connector packages 8 at the lower position on the X-coordinate than the position of the second one of the two straight arm optical modulator portions 4. The signal electrode 6 has a width in the range of 5–20 micrometers and a length in the range of 10–70 millimeters as well as a thickness of 3–40 micrometers. Since the signal electrode 6 extends over the dielectric buffer layer 5 varying in the thickness, the signal electrode 6 also has a step. Since, however, the thickness of the signal electrode 6 is much greater than the thickness of the dielectric buffer layer 5, for which reason the step of the signal electrode 6 provides substantially no effect to the electric field applied by the signal electrode 6.

A first one of the two ground electrodes 7 extends over the dielectric buffer layer 5 over the second one of the two straight arm optical modulator portions 4 so that the first one of the two ground electrodes 7 entirely covers in the plane view the second one of the two straight arm optical modulator portions 4. The first one of the two ground electrodes 7 further extends over the dielectric buffer layer 5 over the crystal substrate 1 on lower regions on the X-coordinate than and outside the second one of the two straight arm optical modulator portions 4. The first one of the two ground electrodes 7 is separated in the plane view from the signal electrode 6 at a distance or gap in the range of 5–200 micrometers.

A second one of the two ground electrodes 7 extends over the dielectric buffer layer 5 so that the second one of the two ground electrodes 7 is positioned outside the signal electrode 6 but separated in the plane view from the signal electrode 6 at a distance or gap in the range of 5–200 micrometers. The distance of the two ground electrodes 7 from the signal electrode 6 is determined so that a ratio of the width of the signal electrode 6 to the distance is in the range of 1–0.1, wherein the width of the signal electrode 6 is in the range of 5–20 micrometers as described above.

The ground electrode 7 has a width in the range of 100–9000 micrometers, a length in the range of 10–70 millimeters and a thickness in the range of 3–40 micrometers.

A microwave is applied through the connector package 8 to the signal electrode 6.

For the above Mach-Zehnder optical modulator, it was confirmed that the effect by a thinner portion of the dielectric buffer layer 5 for increasing the overlap integral of the electric field profile and the optical mode field profile exceeds the effect by a thinner portion of the dielectric buffer layer 5 for reducing the overlap integral. Namely, the effect by the thinner portion of the dielectric buffer layer 5 for reducing the driving voltage exceeds the effect by the thinner portion thereof for increasing the driving voltage. In order to drop the driving voltage, it is more effective to very the thickness of the dielectric buffer layer than keeping the dielectric buffer layer at an averaged thickness which is calculated by averaging those varied thicknesses of the dielectric buffer layer.

It was also confirmed that the effect by the thicker portion of the dielectric buffer layer 5 for reducing the difference of the effective microwave refractive index from the optical wave refractive index exceeds the opposite effect by the thinner portion of the dielectric buffer layer for increasing the difference of the effective microwave refractive index from the optical wave refractive index. Namely, the effect by the thicker portion of the dielectric buffer layer 5 for widening the bandwidth exceeds the opposite effect by the thinner portion of the dielectric buffer layer 5 for narrowing the bandwidth. In order to widen the bandwidth, it is more effective to very the thickness of the dielectric buffer layer than keeping the dielectric buffer layer at an averaged thickness which is calculated by averaging those varied thicknesses of the dielectric buffer layer.

Consequently, in order to drop the driving voltage and widen the bandwidth concurrently, it is more effective to very the thickness of the dielectric buffer layer than keeping the dielectric buffer layer at the averaged thickness which is calculated by averaging those varied thicknesses of the dielectric buffer layer. For above Mach-Zehnder optical modulator, both the above requirements for obtaining considerable reduction in the driving voltage and keeping much wider bandwidth could be satisfied.

FIG. 14 is a diagram of driving voltage and characteristic impedance of a novel Mach-Zehnder optical modulator in accordance with the present invention as compared to the conventional Mach-Zehnder optical modulator. "Type 2" represents the novel Mach-Zehnder optical modulator having the dielectric buffer layer 5 varying in thickness while "Type 1" represents the conventional Mach-Zehnder optical modulator having the dielectric buffer layer 5 remaining unchanged in thickness. The driving voltage of the novel Mach-Zehnder optical modulator is about 2.8 V which is much lower than the driving voltage of 3.4 V of the conventional Mach-Zehnder optical modulator. Namely, the driving voltage of the novel Mach-Zehnder optical modulator is reduced by 18% from that of the conventional one. The characteristic impedance of the novel Mach-Zehnder optical modulator can be kept in the range of 46–48Ω which is lower by only 2–4Ω or about 4–8% than 50Ω of the conventional Mach-Zehnder optical modulator.

The subject matter of the present invention in the above described embodiment can be applicable to the other optical devices such as other optical modulator or optical switches utilizing the phase shift phenomenon.

The above dielectric buffer layer 5 can be prepared by optional use of selective wet and dry etching processes in combination with masking work.

Twelfth Embodiment

Figure 36A:
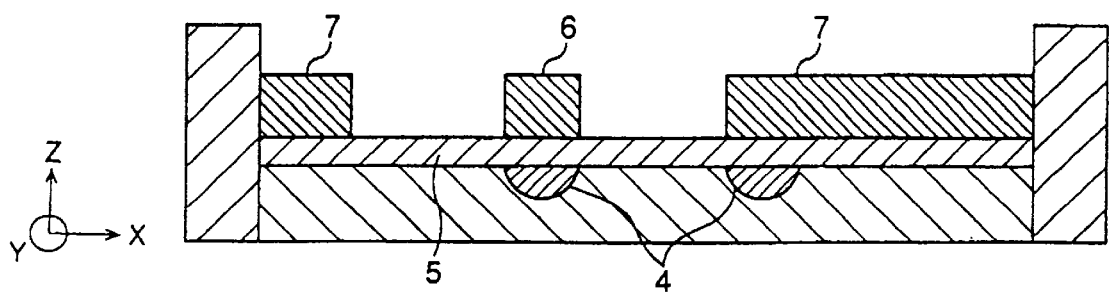
FIG. 36A is a cross sectional elevation view illustrative of a novel Mach-Zehnder optical modulator taken along XXXVIA—XXXVIA in FIG. 35 in a twelfth embodiment in accordance with the present invention.
Figure 36B:
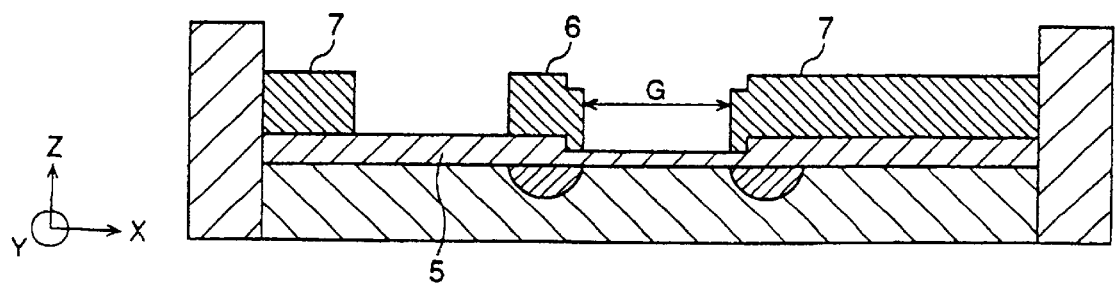
FIG. 36B is a cross sectional elevation view illustrative of a novel Mach-Zehnder optical modulator taken along XXXVIB—XXXVIB in FIG. 35 in a twelfth embodiment in accordance with the present invention.
Figure 36C:
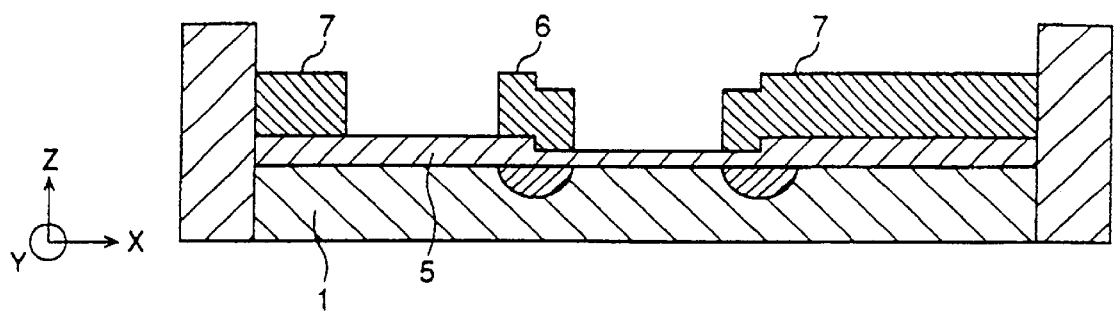
FIG. 36C is a cross sectional elevation view illustrative of a novel Mach-Zehnder optical modulator taken along XXXVIC—XXXVIC in FIG. 35 in a twelfth embodiment in accordance with the present invention.

A twelfth embodiment according to the present invention will be described in detail with reference to FIGS. 35, 36A, 36B and 36C. FIG. 35 is a plane view illustrative of a novel Mach-Zehnder optical modulator including an improved dielectric buffer layer which varies in thickness. FIG. 36A is a cross sectional elevation view illustrative of a novel Mach-Zehnder optical modulator taken along line XXXVIA—XXXVIA in FIG. 35. FIG. 36B is a cross sectional elevation view illustrative of a novel Mach- Zehnder optical modulator taken along line XXXVIB—XXXVIB in FIG. 35. FIG. 36C is a cross sectional elevation view illustrative of a novel Mach-Zehnder optical modulator taken along line XXXVIC—XXXVIC in FIG. 35.

A crystal substrate 1, for example, a $LiNbO_3$ substrate was prepared which is capable of causing electro-optical effects. A titanium film strip was formed on a top surface of the crystal substrate 1, wherein the titanium film strip comprises two straight arms and two Y-shaped portions coupled to opposite sides of the two straight arms. The titanium film strip has a width of 5–20 micrometers and a thickness of 500–1200 angstroms. The crystal substrate 1 was then subjected to a heat treatment at a temperature in the range of 900° C. to 1000° C. for 5–12 hours to cause a diffusion of titanium in the titanium film strip into an upper region of the crystal substrate 1 to form a titanium-diffused optical waveguide in the upper region of the crystal substrate 1. The titanium-diffused optical waveguide comprises a Y-shaped optical divider portion 2, two straight arm optical modulator portions 4 coupled to the Y-shaped optical divider portion 2, and a Y-shaped optical coupler portion 3 coupled to the two straight arm optical modulator portions 4. Optical fiber mounts 9 are provided at opposite end portions of the titanium-diffused optical waveguide so that the Y-shaped optical divider portion 2 and the Y-shaped optical coupler portion 3 are coupled via the optical fiber mounts 9 to optical fibers. The top surface of the, titanium-diffused optical waveguide has the same level as the top surface of the crystal substrate 1 to form a flat surface. A dielectric buffer layer 5, for example, $SiO_2$ buffer layer is provided entirely on the flat surface so that the dielectric buffer layer 5 extends over the optical waveguide and the crystal substrate 1. The dielectric buffer layer 5 varies in thickness in the range of 1–10 micrometers. The dielectric buffer layer 5 has a dielectric constant in the range of 1.1–40.

The dielectric buffer layer 5 is discontinuously reduced in thickness to form a thin portion and a thick portion, both of which are bounded by a step. A thickness of the thin portion is a half of a thickness of the thick portion. The thin portion is selectively provided in inner half regions of the two straight arm optical modulator portions 4 of the titanium-diffused optical waveguide and extends over the top surface of the crystal substrate 1 between the two straight arm optical modulator portions 4. The position of the step on an X-coordinate is linearly and proportionally varied in a Y-direction. Here, a width of the thin portion of the dielectric buffer layer 5 is defined as a horizontal size of the thin portion on the X-coordinate or in the X-direction. The width of the thin portion of the dielectric buffer layer 5 is thus linearly and proportionally varied in the Y-direction.

With reference to FIGS. 35 and 36A, on the Y-coordinate at a position just inside line XXXVIA—XXXVIA including a boundary between the two straight arm optical modulator portions 4 and the Y-shaped optical divider portion 2, the width of the thin portion of the dielectric buffer layer 5 corresponds to a distance between the two straight arm optical modulator portions 4. The steps between the thin portion and the thick portion are positioned at the inside edges of the two straight arm optical modulator portions 4.

With reference to FIGS. 35 and 36C, on line XXXVIC—XXXVIC including a boundary between the two straight arm optical modulator portions 4 and the Y-shaped optical coupler portion 3, the width of the thin portion of the dielectric buffer layer 5 corresponds to the sum of a width of each the straight arm optical modulator portion 4 and the above distance between the two straight arm optical modulator portions 4. The steps between the thin portion and the thick portion are positioned at center positions on the X-coordinate of the two straight arm optical modulator portions 4.

With reference to FIGS. 35 and 36B, on line XXXVIB—XXXVIB extending in parallel to line XXXVIA—XXXVIA and line XXXVIC—XXXVIC and including center positions on the Y-coordinate of the straight arm optical modulator portions 4, the width of the thin portion of the dielectric buffer layer 5 corresponds to the sum of a half width of each the straight arm optical modulator portion 4 and the above distance between the two straight arm optical modulator portions 4. On the X-coordinate, the steps between the thin portion and the thick portion are positioned outside from the inside edges of the two straight arm optical modulator portions 4 by a quarter of the width of each the straight arm optical modulator portion 4.

As the position on the Y-coordinate moves from line XXXVIA—XXXVIA to line XXXVIC—XXXVIC, the width of the thin portion of the dielectric buffer layer 5 is linearly and proportionally increased as well illustrated in FIGS. 35 and 36.

The shapes in the plane view of the thin portion and the thick portion of the dielectric buffer layer 5 are symmetrical in the X-direction but asymmetrical in the Y-direction. Namely, a profile of variation in the thickness of the dielectric buffer layer 5 are symmetrical in the X-direction but asymmetrical in the Y-direction.

In this embodiment, a coplanar waveguide type electrode structure is selectively provided on the dielectric buffer layer 5, although other electrodes structures may be provided such as asymmetric coplanar strip type electrode structure and asymmetric strip line type electrode structure. The coplanar waveguide type electrode structure comprises a signal electrode 6 and two ground electrodes 7.

Here, a first one of the two straight arm optical modulator portions 4 is defined as having a larger value on the X-coordinate, while a second one of the two straight arm optical modulator portions 4 is defined as having a smaller value on the X-coordinate.

The signal electrode 6 extends in the Y-direction and over the dielectric buffer layer 5 over the first one of the two straight arm optical modulator portions 4 so that the signal electrode 6 entirely covers in the plane view the first one of the two straight arm optical modulator portions 4. The signal electrode 6 further extends in the X-direction toward the lower position on the X-coordinate and over the Y-shaped optical divider portion 2 and the Y-shaped optical coupler portion 3 so that the signal electrode 6 is coupled with connector packages 8 at the lower position on the X-coordinate than the position of the second one of the two straight arm optical modulator portions 4. The signal electrode 6 has a width in the range of 5–20 micrometers and a length in the range of 10–70 millimeters as well as a thickness of 3–40 micrometers. Since the signal electrode 6 extends over the dielectric buffer layer 5 varying in the thickness, the signal electrode 6 also has a step. Since, however, the thickness of the signal electrode 6 is much greater than the thickness of the dielectric buffer layer 5, for which reason the step of the signal electrode 6 provides substantially no effect to the electric field applied by the signal electrode 6.

A first one of the two ground electrodes 7 extends over the dielectric buffer layer 5 over the second one of the two straight arm optical modulator portions 4 so that the first one of the two ground electrodes 7 entirely covers in the plane view the second one of the two straight arm optical modulator portions 4. The first one of the two ground electrodes 7 further extends over the dielectric buffer layer 5 over the crystal substrate 1 on lower regions on the X-coordinate than and outside the second one of the two straight arm optical modulator portions 4. The first one of the two ground electrodes 7 is separated in the plane view from the signal electrode 6 at a distance or gap in the range of 5–200 micrometers.

A second one of the two ground electrodes 7 extends over the dielectric buffer layer 5 so that the second one of the two ground electrodes 7 is positioned outside the signal electrode 6 but separated in the plane view from the signal electrode 6 at a distance or gap in the range of 5–200 micrometers. The distance of the two ground electrodes 7 from the signal electrode 6 is determined so that a ratio of the width of the signal electrode 6 to the distance is in the range of 1–0.1, wherein the width of the signal electrode 6 is in the range of 5–20 micrometers as described above.

The ground electrode 7 has a width in the range of 100–9000 micrometers, a length in the range of 10–70 millimeters and a thickness in the range of 3–40 micrometers.

A microwave is applied through the connector package 8 to the signal electrode 6.

For the above Mach-Zehnder optical modulator, it was confirmed that the effect by a thinner portion of the dielectric buffer layer 5 for increasing the overlap integral of the electric field profile and the optical mode field profile exceeds the effect by a thinner portion of the dielectric buffer layer 5 for reducing the overlap integral. Namely, the effect by the thinner portion of the dielectric buffer layer 5 for reducing the driving voltage exceeds the effect by the thinner portion thereof for increasing the driving voltage. In order to drop the driving voltage, it is more effective to very the thickness of the dielectric buffer layer than keeping the dielectric buffer layer at an averaged thickness which is calculated by averaging those varied thicknesses of the dielectric buffer layer.

It was also confirmed that the effect by the thicker portion of the dielectric buffer layer 5 for reducing the difference of the effective microwave refractive index from the optical wave refractive index exceeds the opposite effect by the thinner portion of the dielectric buffer layer for increasing the difference of the effective microwave refractive index from the optical wave refractive index. Namely, the effect by the thicker portion of the dielectric buffer layer 5 for widening the bandwidth exceeds the opposite effect by the thinner portion of the dielectric buffer layer 5 for narrowing the bandwidth. In order to widen the bandwidth, it is more effective to very the thickness of the dielectric buffer layer than keeping the dielectric buffer layer at an averaged thickness which is calculated by averaging those varied thicknesses of the dielectric buffer layer.

Consequently, in order to drop the driving voltage and widen the bandwidth concurrently, it is more effective to very the thickness of the dielectric buffer layer than keeping the dielectric buffer layer at the averaged thickness which is calculated by averaging those varied thicknesses of the dielectric buffer layer. For above Mach-Zehnder optical modulator, both the above requirements for obtaining considerable reduction in the driving voltage and keeping much wider bandwidth could be satisfied.

FIG. 14 is a diagram of driving voltage and characteristic impedance of a novel Mach-Zehnder optical modulator in accordance with the present invention as compared to the conventional Mach-Zehnder optical modulator. "Type 2" represents the novel Mach-Zehnder optical modulator having the dielectric buffer layer 5 varying in thickness while "Type 1" represents the conventional Mach-Zehnder optical modulator having the dielectric buffer layer 5 remaining unchanged in thickness. The driving voltage of the novel, Mach-Zehnder optical modulator is about 2.8 V which is much lower than the driving voltage of 3.4 V of the conventional Mach-Zehnder optical modulator. Namely, the driving voltage of the novel Mach-Zehnder optical modulator is reduced by 18% from that of the conventional one. The characteristic impedance of the novel Mach-Zehnder optical modulator can be kept in the range of 46–48Ω which is lower by only 2–4Ω or about 4–8% than 50Ω of the conventional Mach-Zehnder optical modulator.

The subject matter of the present invention in the above described embodiment can be applicable to the other optical devices such as other optical modulator or optical switches utilizing the phase shift phenomenon.

The above dielectric buffer layer 5 can be prepared by optional use of selective wet and dry etching processes in combination with masking work.

Thirteenth Embodiment

Figure 38A:
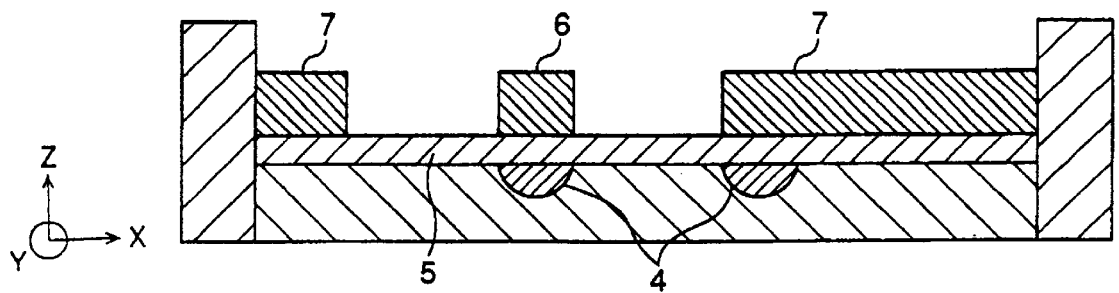
FIG. 38A is a cross sectional elevation view illustrative of a novel Mach-Zehnder optical modulator taken along XXXVIIIA—XXXVIIIA in FIG. 37 in a thirteenth embodiment in accordance with the present invention.
Figure 38B:
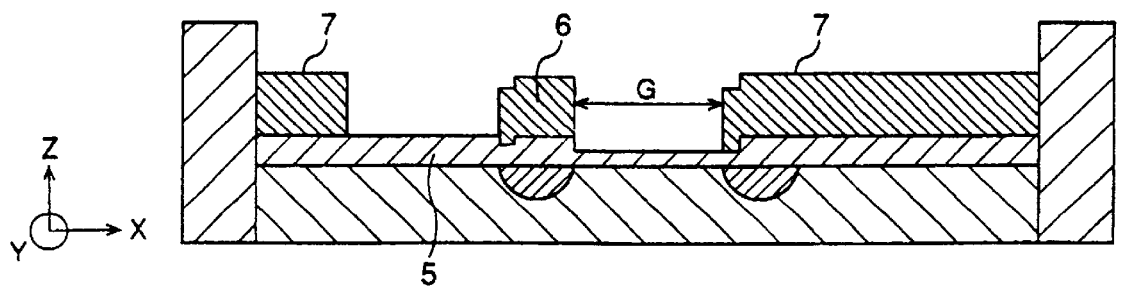
FIG. 38B is a cross sectional elevation view illustrative of a novel Mach-Zehnder optical modulator taken along XXXVIIIB—XXXVIIIB in FIG. 37 in a thirteenth embodiment in accordance with the present invention.
Figure 38C:
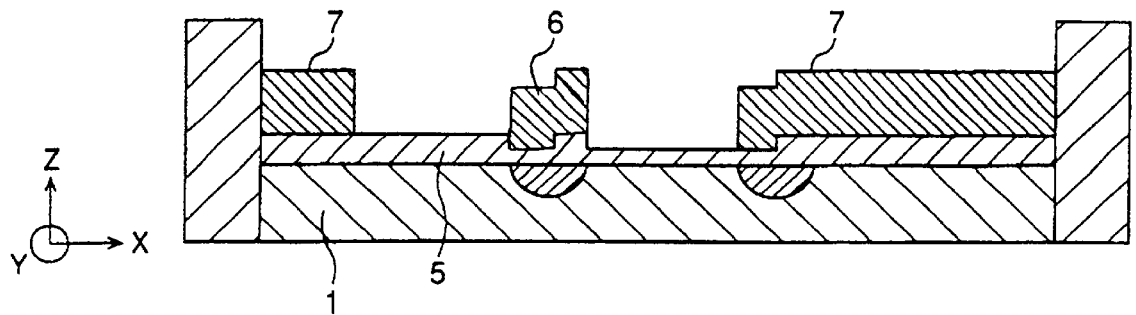
FIG. 38C is a cross sectional elevation view illustrative of a novel Mach-Zehnder optical modulator taken along XXXVIIIC—XXXVIIIC in FIG. 37 in a thirteenth embodiment in accordance with the present invention.

A thirteenth embodiment according to the present invention will be described in detail with reference to FIGS. 37, 38A, 38B and 38C. FIG. 37 is a plane view illustrative of a novel Mach-Zehnder optical modulator including an improved dielectric buffer layer which varies in thickness. FIG. 38A is a cross sectional elevation view illustrative of a novel Mach-Zehnder optical modulator taken along line XXXVIIIA—XXXVIIIA in FIG. 37. FIG. 38B is a cross sectional elevation view illustrative of a novel Mach-Zehnder optical modulator taken along line XXXVIIIB—XXXVIIIB in FIG. 37. FIG. 38C is a cross sectional elevation view illustrative of a novel Mach-Zehnder optical modulator taken along line XXXVIIIC—XXXVIIIC in FIG. 37.

A crystal substrate 1, for example, a $LiNbO_3$ substrate was prepared which is capable of causing electro-optical effects. A titanium film strip was formed on a top surface of the crystal substrate 1, wherein the titanium film strip comprises two straight arms and two Y-shaped portions coupled to opposite sides of the two straight arms. The titanium film strip has a width of 5–20 micrometers and a thickness of 500–1200 angstroms. The crystal substrate 1 was then subjected to a heat treatment at a temperature in the range of 900° C. to 1000° C. for 5–12 hours to cause a diffusion of titanium in the titanium film strip into an upper region of the crystal substrate 1 to form a titanium-diffused optical waveguide in the upper region of the crystal substrate 1. The titanium-diffused optical waveguide comprises a Y-shaped optical divider portion 2, two straight arm optical modulator portions 4 coupled to the Y-shaped optical divider portion 2, and a Y-shaped optical coupler portion 3 coupled to the two straight arm optical modulator portions 4. Optical fiber mounts 9 are provided at opposite end portions of the titanium-diffused optical waveguide so that the Y-shaped optical divider portion 2 and the Y-shaped optical coupler portion 3 are coupled via the optical fiber mounts 9 to optical fibers. The top surface of the titanium-diffused optical waveguide has the same level as the top surface of the crystal substrate 1 to form a flat surface. A dielectric buffer layer 5. For example, $SiO_2$ buffer layer is provided entirely on the flat surface so that the dielectric buffer layer 5 extends over the optical waveguide and the crystal substrate 1. The dielectric buffer layer 5 varies in thickness in the range of 1–10 micrometers. The dielectric buffer layer 5 has a dielectric constant in the range of 1.1–40.

Here, a first one of the two straight arm optical modulator portions 4 is defined as having a larger value on the X-coordinate, while a second one of the two straight arm optical modulator portions 4 is defined as having a smaller value on the X-coordinate.

The dielectric buffer layer 5 is discontinuously reduced in thickness to form first and second thin portions and a thick portion. Each of the first and second thin portions and the thick portion are bounded by a step. A thickness of the thin portion is a half of a thickness of the thick portion. The first thin portion is selectively provided in outer half region of the first one of the two straight arm optical modulator portions 4 of the titanium-diffused optical waveguide. The second thin portion is selectively provided in inner half regions of the second one of the two straight arm optical modulator portions 4 of the titanium-diffused optical waveguide and extends over the top surface of the crystal substrate 1 between the two straight arm optical modulator portions 4. The position of the step on an X-coordinate is linearly and proportionally varied in a Y-direction. Here, a first width of the first thin portion of the dielectric buffer layer 5 is defined as a horizontal size of the first thin portion on the X-coordinate or in the X-direction, while a second width of the second thin portion of the dielectric buffer layer 5 is defined as a horizontal size of the second thin portion on the X-coordinate or in the X-direction. The first width of the first thin portion of the dielectric buffer layer 5 is thus linearly and proportionally varied in the Y-direction. The second width of the second thin portion of the dielectric buffer layer 5 is also linearly and proportionally varied in the Y-direction.

With reference to FIGS. 37 and 38A, on the Y-coordinate at a position just inside line XXXVIIIA—XXXVIIIA including a boundary between the two straight arm optical modulator portions 4 and the Y-shaped optical divider portion 2, the first width of the first thin portion of the dielectric buffer layer 5 corresponds to nearly equal to zero. The step between the first thin portion and the thick portion is positioned at the outside edge of the first one of the two straight arm optical modulator portions 4. The second width of the second thin portion of the dielectric buffer layer 5 corresponds to the above distance between the two straight arm optical modulator portions 4. The step between the second thin portion and the thick portion is positioned at the inside edge of the second one of the two straight arm optical modulator portions 4.

With reference to FIGS. 37 and 38C, on line XXXVIIIC—XXXVIIIC including center positions on the Y-coordinate of the straight arm optical modulator portions 4, the first width of the first thin portion of the dielectric buffer layer 5 corresponds to a half of the width of the first one of the two straight arm optical modulator portions 4. The steps between the first thin portion and the thick portion are positioned at the outside edge and the center of the first one of the two straight arm optical modulator portions 4. The second width of the second thin portion of the dielectric buffer layer 5 corresponds to the sum of a half of the width of the second one of the straight arm optical modulator portions 4 and the above distance between the two straight arm optical modulator portions 4. The step between the second thin portion and the thick portion is positioned at the center of the second one of the two straight arm optical modulator portions 4.

With reference to FIGS. 37 and 38B, on line XXXVIIIB—XXXVIIIB extending in parallel to line XXXVIIIA—XXXVIIIA and line XXXVIIIC—XXXVIIIC and positioned on the Y-coordinate at a center between line XXXVIIIA—XXXVIIIA and line XXXVIIIC—XXXVIIIC, the first width of the first thin portion of the dielectric buffer layer 5 corresponds to a quarter of the width of the first one of the two straight arm optical modulator portions 4. The steps between the first thin portion and the thick portion are positioned at the outside edge of the first one of the two straight arm optical modulator portions 4 and inside by a quarter of the width thereof from the outside edge of the first one of the two straight arm optical modulator portions 4. The second width of the second thin portion of the dielectric buffer layer 5 corresponds to the sum of a quarter of the width of the second one of the straight arm optical modulator portions 4 and the above distance between the two straight arm optical modulator portions 4. The step between the second thin portion and the thick portion is positioned outside by the one quarter width from the inside edge of the second one of the two straight arm optical modulator portions 4.

As the position on the Y-coordinate moves from line XXXVIIIA—XXXVIIIA to line XXXVIIIC—XXXVIIIC, the first width of the first thin portion and the second width of the second thin portion of the dielectric buffer layer 5 are linearly and proportionally increased as well illustrated in FIG. 37. Further, as the position on the Y-coordinate moves from line XXXVIIIC—XXXVIIIC to the boundary between the two straight arm optical modulator portions 4 and the Y-shaped optical coupler portion 3, the first width of the first thin portion and the second width of the second thin portion of the dielectric buffer layer 5 are linearly and proportionally decreased to the same value as at the A-B line as well illustrated in FIG. 37.

The shapes in the plane view of the thin portion and the thick portion of the dielectric buffer layer 5 are symmetrical in the Y-direction but asymmetrical in the X-direction. Namely, a profile of variation in the thickness of the dielectric buffer layer 5 are symmetrical in the Y-direction but asymmetrical in the X-direction.

In this embodiment, a coplanar waveguide type electrode structure is selectively provided on the dielectric buffer layer 5, although other electrodes structures may be provided such as asymmetric coplanar strip type electrode structure and asymmetric strip line type electrode structure. The coplanar waveguide type electrode structure comprises a signal electrode 6 and two ground electrodes 7.

The signal electrode 6 extends in the Y-direction and over the dielectric buffer layer 5 over the first one of the two straight arm optical modulator portions 4 so that the signal electrode 6 entirely covers in the plane view the first one of the two straight arm optical modulator portions 4. The signal electrode 6 further extends in the X-direction toward the lower position on the X-coordinate and over the Y-shaped optical divider portion 2 and the Y-shaped optical coupler portion 3 so that the signal electrode 6 is coupled with connector packages 8 at the lower position on the X-coordinate than the position of the second one of the two straight arm optical modulator portions 4. The signal electrode 6 has a width in the range of 5–20 micrometers and a length in the range of 10–70 millimeters as well as a thickness of 3–40 micrometers. Since the signal electrode 6 extends over the dielectric buffer layer 5 varying in the thickness, the signal electrode 6 also has a step. Since, however, the thickness of the signal electrode 6 is much greater that the thickness of the dielectric buffer layer 5, for which reason the step of the signal electrode 6 provides substantially no effect to the electric field applied by the signal electrode 6.

A first one of the two ground electrodes 7 extends over the dielectric buffer layer 5 over the second one of the two straight arm optical modulator portions 4 so that the first one of the two ground electrodes 7 entirely covers in the plane view the second one of the two straight arm optical modulator portions 4. The first one of the two ground electrodes 7 further extends over the dielectric buffer layer 5 over the crystal substrate 1 on lower regions on the X-coordinate than and outside the second one of the two straight arm optical modulator portions 4. The first one of the two ground electrodes 7 is separated in the plane view from the signal electrode 6 at a distance or gap in the range of 5–200 micrometers.

A second one of the two ground electrodes 7 extends over the dielectric buffer layer 5 so that the second one of the two ground electrodes 7 is positioned outside the signal electrode 6 but separated in the plane view from the signal electrode 6 at a distance or gap in the range of 5–200 micrometers. The distance of the two ground electrodes 7 from the signal electrode 6 is determined so that a ratio of the width of the signal electrode 6 to the distance is in the range of 1–0.1, wherein the width of the signal electrode 6 is in the range of 5–20 micrometers as described above.

The ground electrode 7 has a width in the range of 100–9000 micrometers, a length in the range of 10–70 millimeters and a thickness in the range of 3–40 micrometers.

A microwave is applied through the connector package 8 to the signal electrode 6.

For the above Mach-Zehnder optical modulator, it was confirmed that the effect by a thinner portion of the dielectric buffer layer 5 for increasing the overlap integral of the electric field profile and the optical mode field profile exceeds the effect by a thinner portion of the dielectric buffer layer 5 for reducing the overlap integral. Namely, the effect by the thinner portion of the dielectric buffer layer 5 for reducing the driving voltage exceeds the effect by the thinner portion thereof for increasing the driving voltage. In order to drop the driving voltage, it is more effective to very the thickness of the dielectric buffer layer than keeping the dielectric buffer layer at an averaged thickness which is calculated by averaging those varied thicknesses of the dielectric buffer layer.

It was also confirmed that the effect by the thicker portion of the dielectric buffer layer 5 for reducing the difference of the effective microwave refractive index from the optical wave refractive index exceeds the opposite effect by the thinner portion of the dielectric buffer layer for increasing the difference of the effective microwave refractive index from the optical wave refractive index. Namely, the effect by the thicker portion of the dielectric buffer layer 5 for widening the bandwidth exceeds the opposite effect by the thinner portion of the dielectric buffer layer 5 for narrowing the bandwidth. In order to widen the bandwidth, it is more effective to very the thickness of the dielectric buffer layer than keeping the dielectric buffer layer at an averaged thickness which is calculated by averaging those varied thicknesses of the dielectric buffer layer.

Consequently, in order to drop the driving voltage and widen the bandwidth concurrently, it is more effective to very the thickness of the dielectric buffer layer than keeping the dielectric buffer layer at the averaged thickness which is calculated by averaging those varied thicknesses of the dielectric buffer layer. For above Mach-Zehnder optical modulator, both the above requirements for obtaining considerable reduction in the driving voltage and keeping much wider bandwidth could be satisfied.

FIG. 14 is a diagram of driving voltage and characteristic impedance of a novel Mach-Zehnder optical modulator in accordance with the present invention as compared to the conventional Mach-Zehnder optical modulator. "Type 2" represents the novel Mach-Zehnder optical modulator having the dielectric buffer layer 5 varying in thickness while "Type 1" represents the conventional Mach-Zehnder optical modulator having the dielectric buffer layer 5 remaining unchanged in thickness. The driving voltage of the novel Mach-Zehnder optical modulator is about 2.8 V which is much lower than the driving voltage of 3.4 V of the conventional Mach-Zehnder optical modulator. Namely, the driving voltage of the novel Mach-Zehnder optical modulator is reduced by 18% from that of the conventional one. The characteristic impedance of the novel Mach-Zehnder optical modulator can be kept in the range of 46–48Ω which is lower by only 2–4Ω or about 4–8% than 50Ω of the conventional Mach-Zehnder optical modulator.

The subject matter of the present invention in the above described embodiment can be applicable to the other optical devices such as other optical modulator or optical switches utilizing the phase shift phenomenon.

The above dielectric buffer layer 5 can be prepared by optional use of selective wet and dry etching processes in combination with masking work.

Fourteenth Embodiment

Figure 40A:
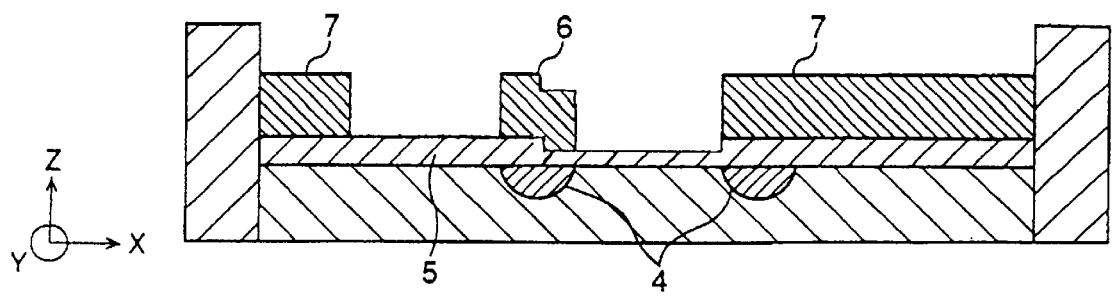
FIG. 40A is a cross sectional elevation view illustrative of a novel Mach-Zehnder optical modulator taken along XLA—XLA in FIG. 39 in a fourteenth embodiment in accordance with the present invention.
Figure 40B:
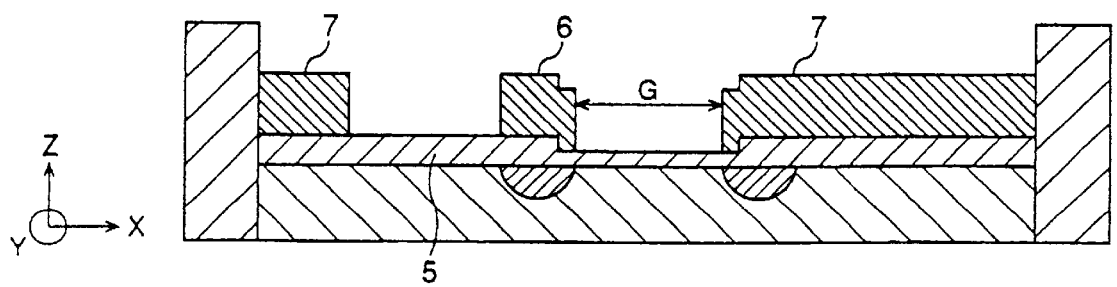
FIG. 40B is a cross sectional elevation view illustrative of a novel Mach-Zehnder optical modulator taken along XLB—XLB in FIG. 39 in a fourteenth embodiment in accordance with the present invention.

A fourteenth embodiment according to the present invention will be described in detail with reference to FIGS. 39, 40A, 40B and 40C. FIG. 39 is a plane view illustrative of a novel Mach-Zehnder optical modulator including an improved dielectric buffer layer which varies in thickness. FIG. 40A is a cross sectional elevation view illustrative of a novel Mach-Zehnder optical modulator taken along line XLA—XLA in FIG. 39. FIG. 40B is a cross sectional elevation view illustrative of a novel Mach-Zehnder optical modulator taken along line XLB—XLB in FIG. 39. FIG. 40C is a cross sectional elevation view illustrative of a novel Mach-Zehnder optical modulator taken along line XLC—XLC in FIG. 39.

A crystal substrate 1, for example, a $LiNbO_3$ substrate was prepared which is capable of causing electro-optical effects. A titanium film strip was formed on a top surface of the crystal substrate 1, wherein the titanium film strip comprises two straight arms and two Y-shaped portions coupled to opposite sides of the two straight arms. The titanium film strip has a width of 5–20 micrometers and a thickness of 500–1200 angstroms. The crystal substrate 1 was then subjected to a heat treatment at a temperature in the range of 900° C. to 1000° C. for 5–12 hours to cause a diffusion of titanium in the titanium film strip into an upper region of the crystal substrate 1 to form a titanium-diffused optical waveguide in the upper region of the crystal substrate 1. The titanium-diffused optical waveguide comprises a Y-shaped optical divider portion 2, two straight arm optical modulator portions 4 coupled to the Y-shaped optical divider portion 2, and a Y-shaped optical coupler portion 3 coupled to the two straight arm optical modulator portions 4. Optical fiber mounts 9 are provided at opposite end portions of the titanium-diffused optical waveguide so that the Y-shaped optical divider portion 2 and the Y-shaped optical coupler portion 3 are coupled via the optical fiber mounts 9 to optical fibers. The top surface of the titanium-diffused optical waveguide has the same level as the top surface of the crystal substrate 1 to form a flat surface. A dielectric buffer layer 5, for example, $SiO_2$ buffer layer is provided entirely on the flat surface so that the dielectric buffer layer 5 extends over the optical waveguide and the crystal substrate 1. The dielectric buffer layer 5 varies in thickness in the range of 1–10 micrometers. The dielectric buffer layer 5 has a dielectric constant in the range of 1.1–40.

The dielectric buffer layer 5 is discontinuously reduced in thickness to form a thin portion and a thick portion, both of which are bounded by a step. A thickness of the thin portion is a half of a thickness of the thick portion, The thin portion is selectively provided in inner half regions of the two straight arm optical modulator portions 4 of the titanium-diffused optical waveguide and extends over the top surface of the crystal substrate 1 between the two straight arm optical modulator portions 4. The position of the step on an X-coordinate is linearly and proportionally varied in a Y-direction. Here, a width of the thin portion of the dielectric buffer layer 5 is defined as a horizontal size of the thin portion on the X-coordinate or in the X-direction. Notwithstanding, the width of the thin portion of the dielectric buffer layer 5 remains unchanged in the Y-direction.

Here, a first one of the two straight arm optical modulator portions 4 is defined as having a larger value on the X-coordinate, while a second one of the two straight arm optical modulator portions 4 is defined as having a smaller value on the X-coordinate.

With reference to FIGS. 39 and 40A, on the Y-coordinate at a position just inside line XLA—XLA including a boundary between the two straight arm optical modulator portions 4 and the Y-shaped optical divider portion 2, the width of the thin portion of the dielectric buffer layer 5 corresponds to the sum of a half of the width of each the straight arm optical modulator portion 4 and the above distance between the two straight arm optical modulator portions 4. The steps between the thin portion and the thick portion are positioned at the center of the first one of the two straight arm optical modulator portions 4 and at the inside edges of the second one of the two straight arm optical modulator portions 4.

With reference to FIGS. 39 and 40C, on line XLC—XLC including a boundary between the two straight arm optical modulator portions 4 and the Y-shaped optical coupler portion 3, the width of the thin portion of the dielectric buffer layer 5 corresponds to the sum of a half of the width of each the straight arm optical modulator portion 4 and the above distance between the two straight arm optical modulator portions 4. The steps between the thin portion and the thick portion are positioned at the inside edges of the first one of the two straight arm optical modulator portions 4 and at the center of the second one of the two straight arm optical modulator portions 4.

With reference to FIGS. 39 and 40B, on line XLB—XLB extending in parallel to line XLA—XLA and line XLC—XLC and including center positions on the Y-coordinate of the straight arm optical modulator portions 4, the width of the thin portion of the dielectric buffer layer 5 corresponds to the sum of a half of the width of each the straight arm optical modulator portion 4 and the above distance between the two straight arm optical modulator portions 4. On the X-coordinate, the steps between the thin portion and the thick portion are positioned outside from the inside edges of the two straight arm optical modulator portions 4 by a quarter of the width of each the straight arm optical modulator portion 4.

As the position on the Y-coordinate moves from line XLA—XLA to line XLC—XLC, the width of the thin portion of the dielectric buffer layer 5 remains unchanged as well illustrated in FIG. 39.

The shapes in the plane view of the thin portion and the thick portion of the dielectric buffer layer 5 are asymmetrical in the X-direction but asymmetrical in the Y-direction. Namely, a profile of variation in the thickness of the dielectric buffer layer 5 are asymmetrical in the X-direction but asymmetrical in the Y-direction.

In this embodiment, a coplanar waveguide type electrode structure is selectively provided on the dielectric buffer layer 5, although other electrodes structures may be provided such as asymmetric coplanar strip type electrode structure and asymmetric strip line type electrode structure. The coplanar waveguide type electrode structure comprises a signal electrode 6 and two ground electrodes 7.

The signal electrode 6 extends in the Y-direction and over the dielectric buffer layer 5 over the first one of the two straight arm optical modulator portions 4 so that the signal electrode 6 entirely covers in the plane view the first one of the two straight arm optical modulator portions 4. The signal electrode 6 further extends in the X-direction toward the lower position on the X-coordinate and over the Y-shaped optical divider portion 2 and the Y-shaped optical coupler portion 3 so that the signal electrode 6 is coupled with connector packages 8 at the lower position on the X-coordinate than the position of the second one of the two straight arm optical modulator portions 4. The signal electrode 6 has a width in the range of 5–20 micrometers and a length in the range of 10–70 millimeters as well as a thickness of 3–40 micrometers. Since the signal electrode 6 extends over the dielectric buffer layer 5 varying in the thickness, the signal electrode 6 also has a step. Since, however, the thickness of the signal electrode 6 is much greater that the thickness of the dielectric buffer layer 5, for which reason the step of the signal electrode 6 provides substantially no effect to the electric field applied by the signal electrode 6.

A first one of the two ground electrodes 7 extends over the dielectric buffer layer 5 over the second one of the two straight arm optical modulator portions 4 so that the first one of the two ground electrodes 7 entirely covers in the plane view the second one of the two straight arm optical modulator portions 4. The first one of the two ground electrodes 7 further extends over the dielectric buffer layer 5 over the crystal substrate 1 on lower regions on the X-coordinate than and outside the second one of the two straight arm optical modulator portions 4. The first one of the two ground electrodes 7 is separated in the plane view from the signal electrode 6 at a distance or gap in the range of 5–200 micrometers.

A second one of the two ground electrodes 7 extends over the dielectric buffer layer 5 so that the second one of the two ground electrodes 7 is positioned outside the signal electrode 6 but separated in the plane view from the signal electrode 6 at a distance or gap in the range of 5–200 micrometers. The distance of the two ground electrodes 7 from the signal electrode 6 is determined so that a ratio of the width of the signal electrode 6 to the distance is in the range of 1–0.1, wherein the width of the signal electrode 6 is in the range of 5–20 micrometers as described above.

The ground electrode 7 has a width in the range of 100–9000 micrometers, a length in the range of 10–70 millimeters and a thickness in the range of 3–40 micrometers.

A microwave is applied through the connector package 8 to the signal electrode 6.

For the above Mach-Zehnder optical modulator, it was confirmed that the effect by a thinner portion of the dielectric buffer layer 5 for increasing the overlap integral of the electric field profile and the optical mode field profile exceeds the effect by a thinner portion of the dielectric buffer layer 5 for reducing the overlap integral. Namely, the effect by the thinner portion of the dielectric buffer layer 5 for reducing the driving voltage exceeds the effect by the thinner portion thereof for increasing the driving voltage. In order to drop the driving voltage, it is more effective to very the thickness of the dielectric buffer layer than keeping the dielectric buffer layer at an averaged thickness which is calculated by averaging those varied thicknesses of the dielectric buffer layer.

It was also confirmed that the effect by the thicker portion of the dielectric buffer layer 5 for reducing the difference of the effective microwave refractive index from the optical wave refractive index exceeds the opposite effect by the thinner portion of the dielectric buffer layer for increasing the difference of the effective microwave refractive index from the optical wave refractive index. Namely, the effect by the thicker portion of the dielectric buffer layer 5 for widening the bandwidth exceeds the opposite effect by the thinner portion of the dielectric buffer layer 5 for narrowing the bandwidth. In order to widen the bandwidth, it is more effective to very the thickness of the dielectric buffer layer than keeping the dielectric buffer layer at an averaged thickness which is calculated by averaging those varied thicknesses of the dielectric buffer layer.

Consequently, in order to drop the driving voltage and widen the bandwidth concurrently, it is more effective to very the thickness of the dielectric buffer layer than keeping the dielectric buffer layer at the averaged thickness which is calculated by averaging those varied thicknesses of the dielectric buffer layer. For above Mach-Zehnder optical modulator, both the above requirements for obtaining considerable reduction in the driving voltage and keeping much wider bandwidth could be satisfied.

FIG. 14 is a diagram of driving voltage and characteristic impedance of a novel Mach-Zehnder optical modulator in accordance with the present invention as compared to the conventional Mach-Zehnder optical modulator. "Type 2" represents the novel Mach-Zehnder optical modulator having the dielectric buffer layer 5 varying in thickness while "Type 1" represents the conventional Mach-Zehnder optical modulator having the dielectric buffer layer 5 remaining unchanged in thickness. The driving voltage of the novel Mach-Zehnder optical modulator is about 2.8 V which is much lower than the driving voltage of 3.4 V of the conventional Mach-Zehnder optical modulator. Namely, the driving voltage of the novel Mach-Zehnder optical modulator is reduced by 18% from that of the conventional one. The characteristic impedance of the novel Mach-Zehnder optical modulator can be kept in the range of 46–48Ω which is lower by only 2–4Ω or about 4–8% than 50Ω of the conventional Mach-Zehnder optical modulator.

As a modification of the above present invention, it is possible to have the dielectric buffer layer vary in thickness. Which is, however, positioned only over the signal electrode because the modulation is mainly caused in the optical waveguide applied with the electric field by the signal electrode.

The subject matter of the present invention in the above described embodiment can be applicable to the other optical devices such as other optical modulator or optical switches utilizing the phase shift phenomenon.

The above dielectric buffer layer 5 can be prepared by optional use of selective wet and dry etching processes in combination with masking work.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims any modifications of the present invention which fall within the spirit and scope of the present invention.

What is claimed is:

1. A dielectric buffer layer extending over an optical waveguide and extending under an electrode which applies an electric field through said dielectric buffer layer to said optical waveguide for causing said optical waveguide to vary in refractive index profile in linear-proportion to an intensity of said electric field thereby causing a phase shift of a light which is on propagation in said optical waveguide, wherein said dielectric buffer layer varies in thickness whereby an overlap integral of a profile of said electric field and an optical mode field profile at a thinner portion of said dielectric buffer layer is larger than that at a thicker portion of said dielectric buffer layer, and whereby a difference of an effective microwave refractive index from an optical refractive index at said thicker portion is smaller than that at said thinner portion.

2. The dielectric buffer layer as claimed in claim 1, wherein said dielectric buffer layer varies in thickness in two dimensional directions so that variation in thickness of said dielectric buffer layer appears continuously and gradually at least in a direction, along which said light is propagating.

3. The dielectric buffer layer as claimed in claim 1, wherein said dielectric buffer layer varies in thickness discontinuously in two dimensional directions to form a thin portion and a thick portion, both of which are bounded by a step so that said step varies continuously and gradually in position on a first coordinate vertical to a direction, along which said light is propagating.

4. The dielectric buffer layer as claimed in claim 1, wherein said dielectric buffer layer varies in thickness continuously in two dimensional directions to form a thin portion and a thick portion, both of which are bounded by a slope so that said slope varies continuously and gradually in position on a first coordinate vertical to a direction, along which said light is propagating.

5. The dielectric buffer layer as claimed in claim 1, wherein said dielectric buffer layer varies in thickness continuously in two dimensional directions to form a sloped portion and a thick portion so that a boundary between said sloped portion and said thick portion varies continuously and gradually in position on a first coordinate vertical to a direction, along which said light is propagating.

6. The dielectric buffer layer as claimed in claim 1, wherein said dielectric buffer layer varies in thickness discontinuously in two dimensional directions to form a thin portion and a thick portion, both of which are bounded by a step so that said step varies discontinuously in position on a first coordinate vertical to a direction, along which said light is propagating.

7. The dielectric buffer layer as claimed in claim 1, wherein said dielectric buffer layer varies in thickness continuously in two dimensional directions to form a thin portion and a thick portion, both of which are bounded by a slope so that said slope varies discontinuously in position on a first coordinate vertical to a horizontal direction, along which said light is propagating.

8. The dielectric buffer layer as claimed in claim 1, wherein said dielectric buffer layer varies in thickness continuously and gradually in two dimensional directions to form a sloped portion and a thick portion so that a boundary between said sloped portion and said thick portion varies discontinuously in position on a first coordinate in parallel to a first horizontal direction, along which said light is propagating.

9. The dielectric buffer layer as claimed in claim 1, wherein said dielectric buffer layer varies in thickness in one dimensional direction vertical to a direction, along which said light is propagating, so that variation in thickness of said dielectric buffer layer appears continuously and gradually.

10. The dielectric buffer layer as claimed in claim 1, wherein said dielectric buffer layer varies in thickness in one dimensional direction vertical to a direction, along which said light is propagating, so that variation in thickness of said dielectric buffer layer appears discontinuously to form a thin portion and a thick portion, both of which are bounded by a step whereby said step remains in position on a first coordinate vertical to said direction, along which said light is propagating.

11. The dielectric buffer layer as claimed in claim 1, wherein said dielectric buffer layer varies in thickness in one dimensional direction vertical to a direction, along which said light is propagating, so that variation in thickness of said dielectric buffer layer appears continuously to form a thin portion and a thick portion, both of which are bounded by a slope whereby said slope remains in position on a first coordinate vertical to said direction, along which said light is propagating.

12. The dielectric buffer layer as claimed in claim 1, wherein said dielectric buffer layer varies in thickness in one dimensional direction vertical to a direction, along which said light is propagating, so that variation in thickness of said dielectric buffer layer appears discontinuously to form a sloped portion and a thick portion whereby a boundary between said sloped portion and said thick portion remains in position on a first coordinate vertical to said direction, along which said light is propagating.

13. The dielectric buffer layer as claimed in claim 1, wherein said dielectric buffer layer varies in thickness symmetrically both in vertical and parallel to a direction, along which said light is propagating.

14. The dielectric buffer layer as claimed in claim 1, wherein said dielectric buffer layer varies in thickness symmetrically in two-dimensional directions.

15. The dielectric buffer layer as claimed in claim 1, wherein said dielectric buffer layer varies in thickness symmetrically in a first direction parallel to a direction, along which said light is propagating, and asymmetrically in a second direction vertical to said first direction.

16. The dielectric buffer layer as claimed in claim 1, wherein said dielectric buffer layer varies in thickness asymmetrically in a first direction parallel to a direction, along which said light is propagating, and symmetrically in a second direction vertical to said first direction.

17. The dielectric buffer layer as claimed in claim 1, wherein said dielectric buffer layer varies in thickness asymmetrically in two-dimensional directions.

18. The dielectric buffer layer as claimed in claim 1, wherein said dielectric buffer layer is made of a dielectric material having a dielectric constant in the range of 1.1 to 40.

19. The dielectric buffer layer as claimed in claim 1, further comprising first and second optical connectors coupled to opposite ends of said optical waveguide.

20. The dielectric buffer layer as claimed in claim 1, wherein a driving voltage to be applied to said electrode is approximately 2.8 V and a characteristic impedance is in the range of 46–48Ω.

21. An optical device comprising:
 a crystal substrate provided with at least an optical waveguide;
 a dielectric buffer layer provided on said optical waveguide; and
 at least an electrode selectively provided on said dielectric buffer layer for applying an electric field through at least a part of said dielectric buffer layer to at least a part of said optical waveguide for causing said at least part of said optical waveguide to vary in refractive index profile in linear-proportion to an intensity of said electric field thereby causing a phase shift of a light which is on propagation in said at least part of said optical waveguide,
 wherein said at least part of said dielectric buffer layer, which extends on said at least part of said optical waveguide, varies in thickness whereby an overlap integral of a profile of said electric field and an optical mode field profile at a thinner portion of said dielectric buffer layer is larger than that at a thicker portion of said dielectric buffer layer, and whereby a difference of an effective microwave refractive index from an optical refractive index at said thicker portion is smaller than that at said thinner portion.

22. The optical device as claimed in claim 21, wherein said at least part of said dielectric buffer layer varies in thickness in two dimensional directions so that variation in thickness of said dielectric buffer layer appears continuously and gradually at least in a direction, along which said light is propagating.

23. The optical device as claimed in claim 21, wherein said at least part of said dielectric buffer layer varies in thickness discontinuously in two dimensional directions to form a thin portion and a thick portion, both of which are bounded by a step so that said step varies continuously and gradually in position on a first coordinate vertical to a direction, along which said light is propagating.

24. The optical device as claimed in claim 21, wherein said at least part of said dielectric buffer layer varies in thickness continuously in two dimensional directions to form a thin portion and a thick portion, both of which are bounded by a slope so that said slope varies continuously and gradually in position on a first coordinate vertical to a direction, along which said light is propagating.

25. The optical device as claimed in claim 21, wherein said at least part of said dielectric buffer layer varies in thickness continuously in two dimensional directions to form a sloped portion and a thick portion so that a boundary between said sloped portion and said thick portion varies continuously and gradually in position on a first coordinate vertical to a direction, along which said light is propagating.

26. The optical device as claimed in claim 21, wherein said at least part of said dielectric buffer layer varies in thickness discontinuously in two dimensional directions to form a thin portion and a thick portion, both of which are bounded by a step so that said step varies discontinuously in position on a first coordinate vertical to a direction, along which said light is propagating.

27. The optical device as claimed in claim 21, wherein said at least part of said dielectric buffer layer varies in thickness continuously in two dimensional directions to form a thin portion and a thick portion, both of which are bounded by a slope so that said slope varies discontinuously in position on a first coordinate vertical to a horizontal direction, along which said light is propagating.

28. The optical device as claimed in claim 21, wherein said at least part of said dielectric buffer layer varies in thickness continuously and gradually in two dimensional directions to form a sloped portion and a thick portion so that a boundary between said sloped portion and said thick portion varies discontinuously in position on a first coordinate in parallel to a first horizontal direction, along which said light is propagating.

29. The optical device as claimed in claim 21, wherein said at least part of said dielectric buffer layer varies in thickness in one dimensional direction vertical to a direction, along which said light is propagating, so that variation in thickness of said dielectric buffer layer appears continuously and gradually.

30. The optical device as claimed in claim 21, wherein said at least part of said dielectric buffer layer varies in thickness in one dimensional direction vertical to a direction, along which said light is propagating, so that variation in thickness of said dielectric buffer layer appears discontinuously to form a thin portion and a thick portion, both of which are bounded by a step whereby said step remains in position on a first coordinate vertical to said direction, along which said light is propagating.

31. The optical device as claimed in claim 21, wherein said at least part of said dielectric buffer layer varies in thickness in one dimensional direction vertical to a direction, along which said light is propagating, so that variation in thickness of said dielectric buffer layer appears continuously to form a thin portion and a thick portion, both of which are bounded by a slope whereby said slope remains in position on a first coordinate vertical to said direction, along which said light is propagating.

32. The optical device as claimed in claim 21, wherein said at least part of said dielectric buffer layer varies in thickness in one dimensional direction vertical to a direction, along which said light is propagating, so that variation in thickness of said dielectric buffer layer appears discontinuously to form a sloped portion and a thick portion whereby a boundary between said sloped portion and said thick portion remains in position on a first coordinate vertical to said direction, along which said light is propagating.

33. The optical device as claimed in claim 21, wherein said at least part of said dielectric buffer layer varies in thickness symmetrically both in vertical and parallel to a direction, along which said light is propagating.

34. The optical device as claimed in claim 21, wherein said at least part of said dielectric buffer layer varies in thickness symmetrically in two-dimensional directions.

35. The optical device as claimed in claim 21, wherein said at least part of said dielectric buffer layer varies in thickness symmetrically in a first direction parallel to a direction, along which said light is propagating, and asymmetrically in a second direction vertical to said first direction.

36. The optical device as claimed in claim 21, wherein said at least part of said dielectric buffer layer varies in thickness asymmetrically in a first direction parallel to a direction, along which said light is propagating, and symmetrically in a second direction vertical to said first direction.

37. The optical device as claimed in claim 21, wherein said at least part of said dielectric buffer layer varies in thickness asymmetrically in two-dimensional directions.

38. The optical device as claimed in claim 21, wherein said dielectric buffer layer is made of a dielectric material having a dielectric constant in the range of 1.1 to 40.

39. The optical device as claimed in claim 21, further comprising first and second optical connectors coupled to opposite ends of said optical waveguide.

40. The optical device as claimed in claim 21, wherein a driving voltage to be applied to said electrode is approximately 2.8 V and a characteristic impedance is in the range of 46–48Ω.

41. An optical modulator comprising:

a crystal substrate capable of causing an electro-optical effect, said crystal substrate comprising an active region, a first passive region in directly contact with a first side of said active region and a second passive region in directly contact with a second side opposite to said first side of said active region;

an optical waveguide extending over said active region and said first and second passive regions of said crystal substrate, said optical waveguide comprising an optical divider portion provided in said first passive region, a plurality of phase modulator portions provided in said active region and coupled to said optical divider portion, and an optical coupler portion provided in said second passive region and coupled to said phase modulator portions, and a top surface of said optical waveguide and a surface of said crystal substrate forming a flat surface;

a dielectric buffer layer extending over said flat surface; and a plurality of electrodes selectively provided on said buffer layer for applying an electric field through at least part of said dielectric layer to at least one of said phase modulator portions for causing said at least one of said phase modulator portions to vary in refractive index profile in linear-proportion to an intensity of said electric field thereby causing phase shift of a light which is on propagation in said at least one of said phase modulator portions, wherein said at least part of said dielectric buffer layer, which extends on said at least part of said optical waveguide, varies in thickness whereby an overlap integral of a profile of said electric field and an optical mode field profile at a thinner portion of said dielectric buffer layer is larger than that at a thicker portion of said dielectric buffer layer, and whereby a difference of an effective microwave refractive index from an optical refractive index at said thicker portion is smaller than that at said thinner portion.

42. The optical modulator as claimed in claim 41, wherein said at least part of said dielectric buffer layer varies in thickness in two dimensional directions so that variation in thickness of said dielectric buffer layer appears continuously and gradually at least in a direction, along which said light is propagating.

43. The optical modulator as claimed in claim 41, wherein said at least part of said dielectric buffer layer varies in thickness discontinuously in two dimensional directions to form a thin portion and a thick portion, both of which are bounded by a step so that said step varies continuously and gradually in position on a first coordinate vertical to a direction, along which said light is propagating.

44. The optical modulator as claimed in claim 41, wherein said at least part of said dielectric buffer layer varies in thickness continuously in two dimensional directions to form a thin portion and a thick portion, both of which are bounded by a slope so that said slope varies continuously and gradually in position on a first coordinate vertical to a direction, along which said light is propagating.

45. The optical modulator as claimed in claim 41, wherein said at least part of said dielectric buffer layer varies in thickness continuously in two dimensional directions to form a sloped portion and a thick portion so that a boundary between said sloped portion and said thick portion varies continuously and gradually in position on a first coordinate vertical to a direction, along which said light is propagating.

46. The optical modulator as claimed in claim 41, wherein said at least part of said dielectric buffer layer varies in thickness discontinuously in two dimensional directions to form a thin portion and a thick portion, both of which are bounded by a step so that said step varies discontinuously in position on a first coordinate vertical to a direction, along which said light is propagating.

47. The optical modulator as claimed in claim 41, wherein said at least part of said dielectric buffer layer varies in thickness continuously in two dimensional directions to form a thin portion and a thick portion, both of which are bounded by a slope so that said slope varies discontinuously in position on a first coordinate, vertical to a horizontal direction, along which said light is propagating.

48. The optical modulator as claimed in claim 41, wherein said at least part of said dielectric buffer layer varies in thickness continuously and gradually in two dimensional directions to form a sloped portion and a thick portion so that a boundary between said sloped portion and said thick portion varies discontinuously in position on a first coordinate in parallel to a first horizontal direction, along which said light is propagating.

49. The optical modulator as claimed in claim 41, wherein said at least part of said dielectric buffer layer varies in thickness in one dimensional direction vertical to a direction, along which said light is propagating, so that variation in thickness of said dielectric buffer layer appears continuously and gradually.

50. The optical modulator as claimed in claim 41, wherein said at least part of said dielectric buffer layer varies in thickness in one dimensional direction vertical to a direction, along which said light is propagating, so that variation in thickness of said dielectric buffer layer appears discontinuously to form a thin portion and a thick portion, both of which are bounded by a step whereby said step remains in position on a first coordinate vertical to said direction, along which said light is propagating.

51. The optical modulator as claimed in claim 41, wherein said at least part of said dielectric buffet layer varies in thickness in one dimensional direction vertical to a direction, along which said light is propagating, so that variation in thickness of said dielectric buffer layer appears continuously to form a thin portion and a thick portion, both of which are bounded by a slope whereby said slope remains in position on a first coordinate vertical to said direction, along which said light is propagating.

52. The optical modulator as claimed in claim 41, wherein said at least part of said dielectric buffer layer varies in thickness in one dimensional direction vertical to a direction, along which said light is propagating, so that variation in thickness of said dielectric buffer layer appears discontinuously to form a sloped portion and a thick portion whereby a boundary between said sloped portion and said thick portion remains in position on a first coordinate vertical to said direction, along which said light is propagating.

53. The optical modulator as claimed in claim 41, wherein said at least part of said dielectric buffer layer varies in thickness symmetrically both in vertical and parallel to a direction, along which said light is propagating.

54. The optical modulator as claimed in claim 41, wherein said at least part of said dielectric buffer layer varies in thickness symmetrically in two-dimensional directions.

55. The optical modulator as claimed in claim 41, wherein said at least part of said dielectric buffer layer varies in thickness symmetrically in a first direction parallel to a direction, along which said light is propagating, and asymmetrically in a second direction vertical to said first direction.

56. The optical modulator as claimed in claim 41, wherein said at least part of said dielectric buffer layer varies in thickness asymmetrically in a first direction parallel to a direction, along which said light is propagating, and symmetrically in a second direction vertical to said first direction.

57. The optical modulator as claimed in claim 41, wherein said at least part of said dielectric buffer layer varies in thickness asymmetrically in two-dimensional directions.

58. The optical modulator as claimed in claim 41, wherein said dielectric buffer layer is made of a dielectric material having a dielectric constant in the range of 1.1 to 40.

59. The optical modulator as claimed in claim 41, further comprising first and second optical connectors coupled to opposite ends of said optical waveguide.

60. The optical modulator as claimed in claim 41, wherein a driving voltage to be applied to said electrode is approximately 2.8 V and a characteristic impedance is in the range of 46–48Ω.

61. A Mach-Zehnder optical modulator comprising:
a crystal substrate capable of causing an electro-optical effect, said crystal substrate comprising an active region, a first passive region in directly contact with a first side of said active region and a second passive region in directly contact with a second side opposite to said first side of said active region;
an optical waveguide extending over said active region and said first and second passive regions of said crystal substrate, said optical waveguide comprising a Y-shaped optical divider portion provided on said first passive region, first and second straight arm portions provided in parallel to each other on said active region and coupled to said Y-shaped optical divider portion, and a Y-shaped optical coupler portion provided on said second passive region and coupled to said first and second straight arm portions, and a top surface of said optical waveguide and a surface of said crystal substrate forming a flat surface;
a dielectric buffer layer extending over said flat surface;
a signal electrode selectively provided on said buffer layer over said first straight arm portion for applying an electric field through said dielectric layer to said first straight arm portion for causing said first straight arm portion to vary in refractive index profile in linear-proportion to an intensity of said electric field thereby causing phase shift of a light which is on propagation in said first straight arm portion; and
a ground electrode selectively provided on said buffer layer over said second straight arm portion,
wherein at least a part of said dielectric buffer layer, which extends on said first straight arm portion, varies in thickness whereby an overlap integral of a profile of said electric field and an optical mode field profile at a thinner portion of said dielectric buffer layer is larger than that at a thicker portion of said dielectric buffer layer, and whereby a difference of an effective microwave refractive index from an optical refractive index at said thicker portion is smaller than that at said thinner portion.

62. The Mach-Zehnder optical modulator as claimed in claim 61, wherein said at least part of said dielectric buffer layer varies in thickness in two dimensional directions so that variation in thickness of said dielectric buffer layer appears continuously and gradually at least in a direction, along which said light is propagating.

63. The Mach-Zehnder optical modulator as claimed in claim 61, wherein said at least part of said dielectric buffer layer varies in thickness discontinuously in two dimensional directions to form a thin portion and a thick portion, both of which are bounded by a step so that said step varies continuously and gradually in position on a first coordinate vertical to a direction, along which said light is propagating.

64. The Mach-Zehnder optical modulator as claimed in claim 61, wherein said at least part of said dielectric buffer layer varies in thickness continuously in two dimensional directions to form a thin portion and a thick portion, both of which are bounded by a slope so that said slope varies continuously and gradually in position on a first coordinate vertical to a direction, along which said light is propagating.

65. The Mach-Zehnder optical modulator as claimed in claim 61, wherein said at least part of said dielectric buffer layer varies in thickness continuously in two dimensional directions to form a sloped portion and a thick portion so that a boundary between said sloped portion and said thick portion varies continuously and gradually in position on a first coordinate vertical to a direction, along which said light is propagating.

66. The Mach-Zehnder optical modulator as claimed in claim 61, wherein said at least part of said dielectric buffer layer varies in thickness discontinuously in two dimensional directions to form a thin portion and a thick portion, both of which are bounded by a step so that said step varies discontinuously in position on a first coordinate vertical to a direction, along which said light is propagating.

67. The Mach-Zehnder optical modulator as claimed in claim 61, wherein said at least part of said dielectric buffer layer varies in thickness continuously in two dimensional directions to form a thin portion and a thick portion, both of which are bounded by a slope so that said slope varies discontinuously in position on a first coordinate vertical to a horizontal direction, along which said light is propagating.

68. The Mach-Zehnder optical modulator as claimed in claim 61, wherein said at least part of said dielectric buffer layer varies in thickness continuously and gradually in two dimensional directions to form a sloped portion and a thick portion so that a boundary between said sloped portion and said thick portion varies discontinuously in position on a first coordinate in parallel to a first horizontal direction, along which said light is propagating.

69. The Mach-Zehnder optical modulator as claimed in claim 61, wherein said at least part of said dielectric buffer layer varies in thickness in one dimensional direction vertical to a direction, along which said light is propagating, so that variation in thickness of said dielectric buffer layer appears continuously and gradually.

70. The Mach-Zehnder optical modulator as claimed in claim 61, wherein said at least part of said dielectric buffer layer varies in thickness in one dimensional direction vertical to a direction, along which said light is propagating, so that variation in thickness of said dielectric buffer layer appears discontinuously to form a thin portion and a thick portion, both of which are bounded by a step whereby said step remains in position on a first coordinate vertical to said direction, along which said light is propagating.

71. The Mach-Zehnder optical modulator as claimed in claim 61, wherein said at least part of said dielectric buffer layer varies in thickness in one dimensional direction vertical to a direction, along which said light is propagating, so that variation in thickness of said dielectric buffer layer appears continuously to form a thin portion and a thick portion, both of which are bounded by a slope whereby said slope remains in position on a first coordinate vertical to said direction, along which said light is propagating.

72. The Mach-Zehnder optical modulator as claimed in claim 61, wherein said at least part of said dielectric buffer layer varies in thickness in one dimensional direction vertical to a direction, along which said light is propagating, so that variation in thickness of said dielectric buffer layer appears discontinuously to form a sloped portion and a thick portion whereby a boundary between said sloped portion and said thick portion remains in position on a first coordinate vertical to said direction, along which said light is propagating.

73. The Mach-Zehnder optical modulator as claimed in claim 61, wherein said at least part of said dielectric buffer layer varies in thickness symmetrically both in vertical and parallel to a direction, along which said light is propagating.

74. The Mach-Zehnder optical modulator as claimed in claim 61, wherein said at least part of said dielectric buffer layer varies in thickness symmetrically in two-dimensional directions.

75. The Mach-Zehnder optical modulator as claimed in claim 61, wherein said at least part of said dielectric buffer layer varies in thickness symmetrically in a first direction parallel to a direction, along which said light is propagating, and asymmetrically in a second direction vertical to said first direction.

76. The Mach-Zehnder optical modulator as claimed in claim 61, wherein said at least part of said dielectric buffer layer varies in thickness asymmetrically in a first direction parallel to a direction, along which said light is propagating, and symmetrically in a second direction vertical to said first direction.

77. The Mach-Zehnder optical modulator as claimed in claim 61, wherein said at least part of said dielectric buffer layer varies in thickness asymmetrically in two-dimensional directions.

78. The Mach-Zehnder optical modulator as claimed in claim 61, wherein said dielectric buffer layer is made of a dielectric material having a dielectric constant in the range of 1.1 to 40.

79. The Mach-Zehnder optical modulator as claimed in claim 61, further comprising first and second optical connectors coupled to opposite ends of said optical waveguide.

80. The Mach-Zehnder optical modulator as claimed in claim 61, wherein a driving voltage to be applied to said signal electrode is approximately 2.8 V and a characteristic impedance is in the range of 46–48Ω.

* * * * *